United States Patent
Guo et al.

(10) Patent No.: US 11,134,492 B2
(45) Date of Patent: Sep. 28, 2021

(54) METHOD AND APPARATUS FOR BEAM RECOVERY IN NEXT GENERATION WIRELESS SYSTEMS

(71) Applicant: Samsung Electronics Co., Ltd., Gyeonggi-do (KR)

(72) Inventors: Li Guo, Allen, TX (US); Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/945,589

(22) Filed: Apr. 4, 2018

(65) Prior Publication Data

US 2018/0302889 A1 Oct. 18, 2018

Related U.S. Application Data

(60) Provisional application No. 62/484,653, filed on Apr. 12, 2017, provisional application No. 62/487,235, (Continued)

(51) Int. Cl.
*H04W 72/04* (2009.01)
*H04B 17/309* (2015.01)
(Continued)

(52) U.S. Cl.
CPC ........ *H04W 72/046* (2013.01); *H04B 7/0617* (2013.01); *H04B 7/0695* (2013.01);
(Continued)

(58) Field of Classification Search
CPC .... H04B 7/0695; H04B 7/088; H04B 7/0617; H04B 7/0408; H04B 7/0626;
(Continued)

(56) References Cited

U.S. PATENT DOCUMENTS

2017/0302414 A1* 10/2017 Islam .................... H04L 5/0048
2018/0049116 A1* 2/2018 Islam. ................ H04W 72/085
(Continued)

FOREIGN PATENT DOCUMENTS

WO 2017/024516 A1 2/2017
WO 2017022902 A1 2/2017

OTHER PUBLICATIONS

"3rd Generation Partnership Project; Technical Specification Group Services and System Aspects; Feasibility Study on New Services and Markets Technology Enablers; Stage 1 (Release 14)," 3GPP TR 22.891, V1.2.0, Nov. 2015, 96 pages.
(Continued)

*Primary Examiner* — Jeffrey M Rutkowski
*Assistant Examiner* — Sudesh M Patidar

(57) ABSTRACT

A method of a user equipment (UE) for a beam failure recovery procedure in a wireless communication system is provided. The method comprises receiving, from a base station (BS), at least one beam failure detection reference signal (RS) and at least one new candidate beam RS over a downlink channel; identifying a set of RS resources including an index for the at least one beam failure detection RS; identifying a set of RS resources including an index for the at least one new candidate beam RS; identifying a dedicated control-resource set (CORESET) received from the BS for a beam failure recovery request; transmitting, to the BS, the beam failure recovery request associated with a quality measurement of the at least one beam failure detection RS over a physical random access channel (PRACH); and receiving, from the BS, a beam failure response in response to the beam failure recovery request based on the dedicated CORESET indicated to the UE.

21 Claims, 21 Drawing Sheets

Related U.S. Application Data filed on Apr. 19, 2017, provisional application No. 62/504,902, filed on May 11, 2017, provisional application No. 62/513,083, filed on May 31, 2017, provisional application No. 62/522,349, filed on Jun. 20, 2017, provisional application No. 62/529,918, filed on Jul. 7, 2017, provisional application No. 62/533,823, filed on Jul. 18, 2017, provisional application No. 62/543,596, filed on Aug. 10, 2017, provisional application No. 62/561,003, filed on Sep. 20, 2017, provisional application No. 62/563,987, filed on Sep. 27, 2017, provisional application No. 62/572,890, filed on Oct. 16, 2017, provisional application No. 62/587,210, filed on Nov. 16, 2017, provisional application No. 62/607,714, filed on Dec. 19, 2017.

(51) Int. Cl.

| | | |
|---|---|---|
| *H04B 7/08* | (2006.01) | |
| *H04B 7/06* | (2006.01) | |
| *H04L 5/00* | (2006.01) | |
| *H04W 84/04* | (2009.01) | |
| *H04W 52/14* | (2009.01) | |
| *H04W 52/24* | (2009.01) | |
| *H04W 52/42* | (2009.01) | |

(52) U.S. Cl.
CPC ........... *H04B 7/088* (2013.01); *H04B 17/309* (2015.01); *H04L 5/0051* (2013.01); *H04L 5/0053* (2013.01); *H04L 5/0085* (2013.01); *H04W 72/042* (2013.01); *H04W 52/146* (2013.01); *H04W 52/242* (2013.01); *H04W 52/42* (2013.01); *H04W 84/042* (2013.01)

(58) Field of Classification Search
CPC .. H04B 17/318; H04B 17/309; H04B 7/0632; H04W 74/0833; H04W 72/046; H04W 16/28
USPC ........................................................ 370/329
See application file for complete search history.

(56) References Cited

U.S. PATENT DOCUMENTS

| | | | | |
|---|---|---|---|---|
| 2018/0199226 | A1* | 7/2018 | Tsai | H04W 24/10 |
| 2018/0227899 | A1* | 8/2018 | Yu | H04B 7/0695 |
| 2019/0104549 | A1* | 4/2019 | Deng | H04B 7/0617 |
| 2019/0387440 | A1* | 12/2019 | Yiu | H04W 36/0072 |

OTHER PUBLICATIONS

"3rd Generation Partnership Project; Technical Specification Group Radio Access Network; Evolved Universal Terrestrial Radio Access (E-UTRA); Physical Channels and Modulation (Release 14)," 3GPP TS 36.211, V14.2.0, Mar. 2017, 194 pages.

"3rd Generation Partnership Project; Technical Specification Group Radio Access Network; Evolved Universal Terrestrial Radio Access (E-UTRA); Multiplexing and Channel Coding (Release 14)," 3GPP TS 36.212, V14.2.0, Mar. 2017, 197 pages.

"3rd Generation Partnership Project; Technical Specification Group Radio Access Network; Evolved Universal Terrestrial Radio Access (E-UTRA); Physical Layer Procedures (Release 14)," 3GPP TS 36.213, V14.2.0, Mar. 2017, 454 pages.

"3rd Generation Partnership Project; Technical Specification Group Radio Access Network; Evolved Universal Terrestrial Radio Access (E-UTRA); Medium Access Control (MAC) Protocol Specification (Release 14)," 3GPP TS 36.321, V14.2.0, Mar. 2017, 106 pages.

International Search Report dated Jul. 24, 2018 in connection with International patent Application No. PCT/KR2018/004198.

Written Opinion of the International Searching Authority dated Jul. 24, 2018 in connection with International patent Application No. PCT/KR2018/004198.

MediaTek et al., "WF on Beam Failure Recovery", 3GPP TSG RAN WG1 Meeting #88b, Apr. 3-7, 2017, 6 pages, R1-1706633.

MediaTek, "Summary of Views on beam failure recovery", 3GPP TSG RAN WG1 Meeting #88b, Apr. 8, 2017, 2 pages, R1-1706654.

Ericsson, "Summary of e-mail discussions on downlink control signaling", TSG-RAN WG1 NR AdHoc, Jan. 16-20, 2017, 18 pages, R1-1701036.

Guangdong OPPO Mobile Telecom, "On Beam Recovery Mechanism", 3GPP TSG RAN WG1 Meeting #88, Feb. 13-17, 2017, 4 pages, R1-1701944.

InterDigital Communications, "RLM for NR", 3GPP TSG-RAN WG2 #97bis, Apr. 3-7, 2017, R2-1702875, 4 pages.

NTT Docomo, Inc., "Further views on mechanism to recover from beam failure", 3GPP TSG RAN WG1 Meeting #88bis, Apr. 3-7, 2017, R1-1705719, 5 pages.

ZTE, et al., "Discussion on beam recovery mechanism", 3GPP TSG RAN WG1 Meeting #88bis, Apr. 3-7, 2017, R1-1704400, 6 pages.

Supplementary European Search Report dated Dec. 20, 2019 in connection with European Patent Application No. 18 78 4850, 12 pages.

Communication pursuant to Article 94(3) EPC dated Feb. 16, 2021 in connection with European Application No. 18784850.2, 9 pages.

* cited by examiner $M_{sc}^{PSSCH} \times 12 - 1$

METHOD AND APPARATUS FOR BEAM RECOVERY IN NEXT GENERATION WIRELESS SYSTEMS

CROSS-REFERENCE TO RELATED APPLICATION(S) AND CLAIM OF PRIORITY

The present application claims priority to:
U.S. Provisional Patent Application Ser. No. 62/484,653, filed on Apr. 12, 2017;
U.S. Provisional Patent Application Ser. No. 62/487,235, filed on Apr. 19, 2017;
U.S. Provisional Patent Application Ser. No. 62/504,902, filed on May 11, 2017;
U.S. Provisional Patent Application Ser. No. 62/513,083, filed on May 31, 2017;
U.S. Provisional Patent Application Ser. No. 62/522,349, filed on Jun. 20, 2017;
U.S. Provisional Patent Application Ser. No. 62/529,918, filed on Jul. 7, 2017;
U.S. Provisional Patent Application Ser. No. 62/533,823, filed on Jul. 18, 2017;
U.S. Provisional Patent Application Ser. No. 62/543,596, filed on Aug. 10, 2017;
U.S. Provisional Patent Application Ser. No. 62/561,003, filed on Sep. 20, 2017;
U.S. Provisional Patent Application Ser. No. 62/563,987, filed on Sep. 27, 2017;
U.S. Provisional Patent Application Ser. No. 62/572,890, filed on Oct. 16, 2017;
U.S. Provisional Patent Application Ser. No. 62/587,210, filed on Nov. 16, 2017; and
U.S. Provisional Patent Application Ser. No. 62/607,714, filed on Dec. 19, 2017.
The content of the above-identified patent documents are incorporated herein by reference.

TECHNICAL FIELD

The present application relates generally to beam management. More specifically, this disclosure relates to beam recovery scheme in an advanced wireless communication system.

BACKGROUND

In a wireless communication network, a network access and a radio resource management (RRM) are enabled by physical layer synchronization signals and higher (MAC) layer procedures. In particular, a user equipment (UE) attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable.

SUMMARY

Embodiments of the present disclosure provide beam recovery scheme in an advanced wireless communication system.

In one embodiment, a UE for a beam failure recovery in a wireless communication system is provided. The UE includes a transceiver configured to receive, from a base station (BS), at least one beam failure detection reference signal (RS) and at least one new candidate beam RS over a downlink channel. The UE further includes a processor operably connected to the transceiver, the processor configured to identify a set of RS resources including an index for the at least one beam failure detection RS, identify a set of RS resources including an index for the at least one new candidate beam RS; and identify a dedicated control-resource set (CORESET) received from the BS for a beam failure recovery request. The transceiver is further configured to transmit, to the BS, the beam failure recovery request associated with a quality measurement of the at least one beam failure detection RS over a physical random access channel (PRACH) and receive, from the BS, a beam failure response in response to the beam failure recovery request based on the dedicated CORESET indicated to the UE.

In another embodiment, a BS for a beam failure recovery in a wireless communication system is provided. The BS includes a processor configured to identify a set of reference signal (RS) resources including an index for at least one beam failure detection RS and identify a set of RS resources including an index for at least one new candidate beam RS. The BS further includes a transceiver operably connected to the processor, the transceiver configured to transmit, to a UE, the at least one beam failure detection RS and the at least one new candidate beam RS over a downlink channel, receive, from the UE, a beam failure recovery request associated with a quality measurement of the at least one beam failure detection RS over a PRACH, wherein the processor is further configured to identify a dedicated CORESET for the beam failure recovery request, and transmit, to the UE, a beam failure response in response to the beam failure recovery request based on the dedicated CORESET indicated to the UE.

In yet another embodiment, a method of a UE for a beam failure recovery in a wireless communication system is provided. The method comprises receiving, from a BS, at least one beam failure detection reference signal (RS) and at least one new candidate beam RS over a downlink channel, identifying a set of RS resources including an index for the at least one beam failure detection RS, identifying a set of RS resources including an index for the at least one new candidate beam RS; identifying a dedicated CORESET received from the BS for a beam failure recovery request, transmitting, to the BS, the beam failure recovery request associated with a quality measurement of the at least one beam failure detection RS over a PRACH, and receiving, from the BS, a beam failure response in response to the beam failure recovery request based on the dedicated CORESET indicated to the UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 21C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v14.2.0, "E-UTRA, Physical channels and modulation;" 3GPP TS 36.212 v14.2.0, "E-UTRA, Multiplexing and Channel coding;" 3GPP TS 36.213 v14.2.0, "E-UTRA, Physical Layer Procedures;" 3GPP TS 36.321 v14.2.0, "E-UTRA, Medium Access Control (MAC) protocol specification;" and 3GPP TS 36.331 v14.2.1, "E-UTRA, Radio Resource Control (RRC) protocol specification," 3GPP TR 22.891 v1.2.0, "Feasibility Study on New Services and Markets Technology Enablers."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
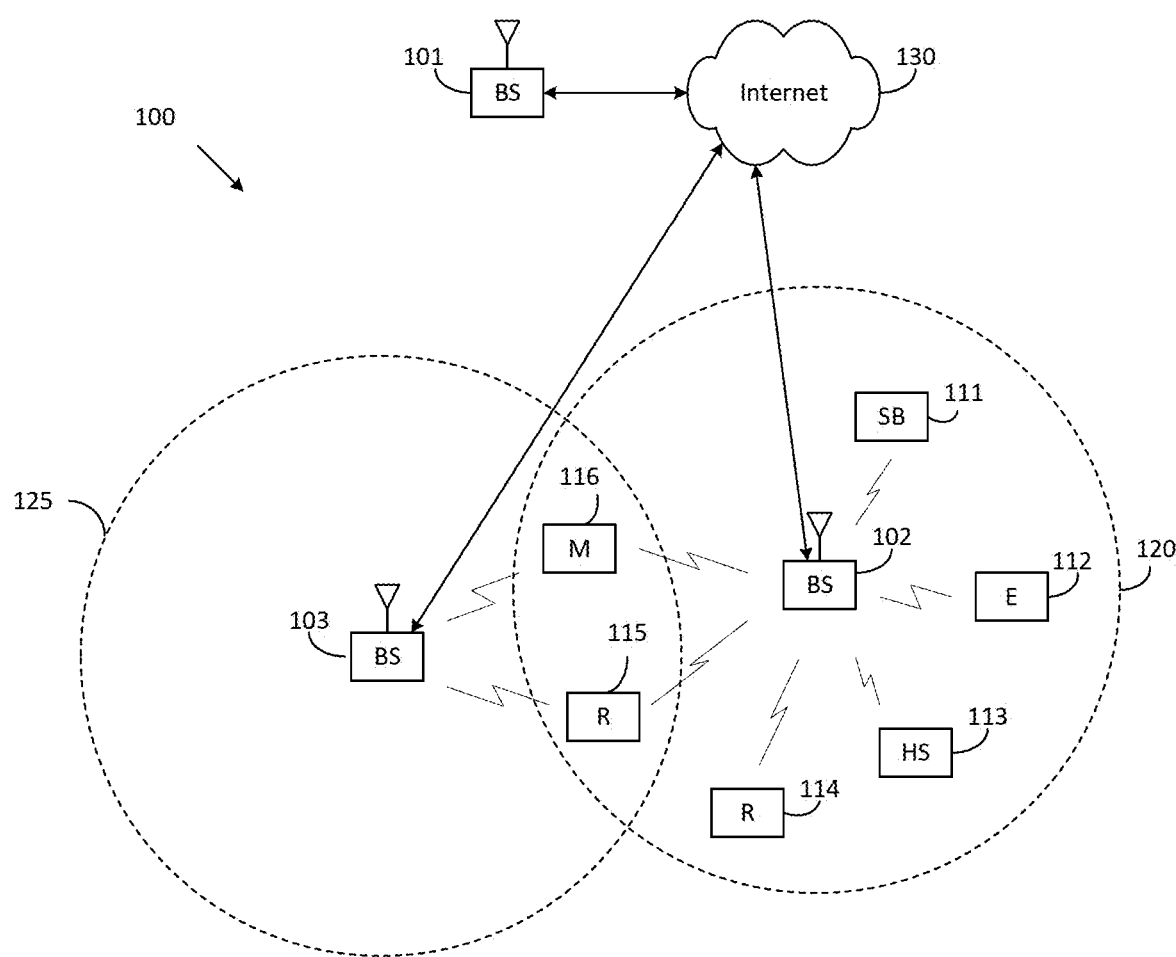
FIG. 1 illustrates an example wireless network according to embodiments of the present disclosure.
Figure 2:
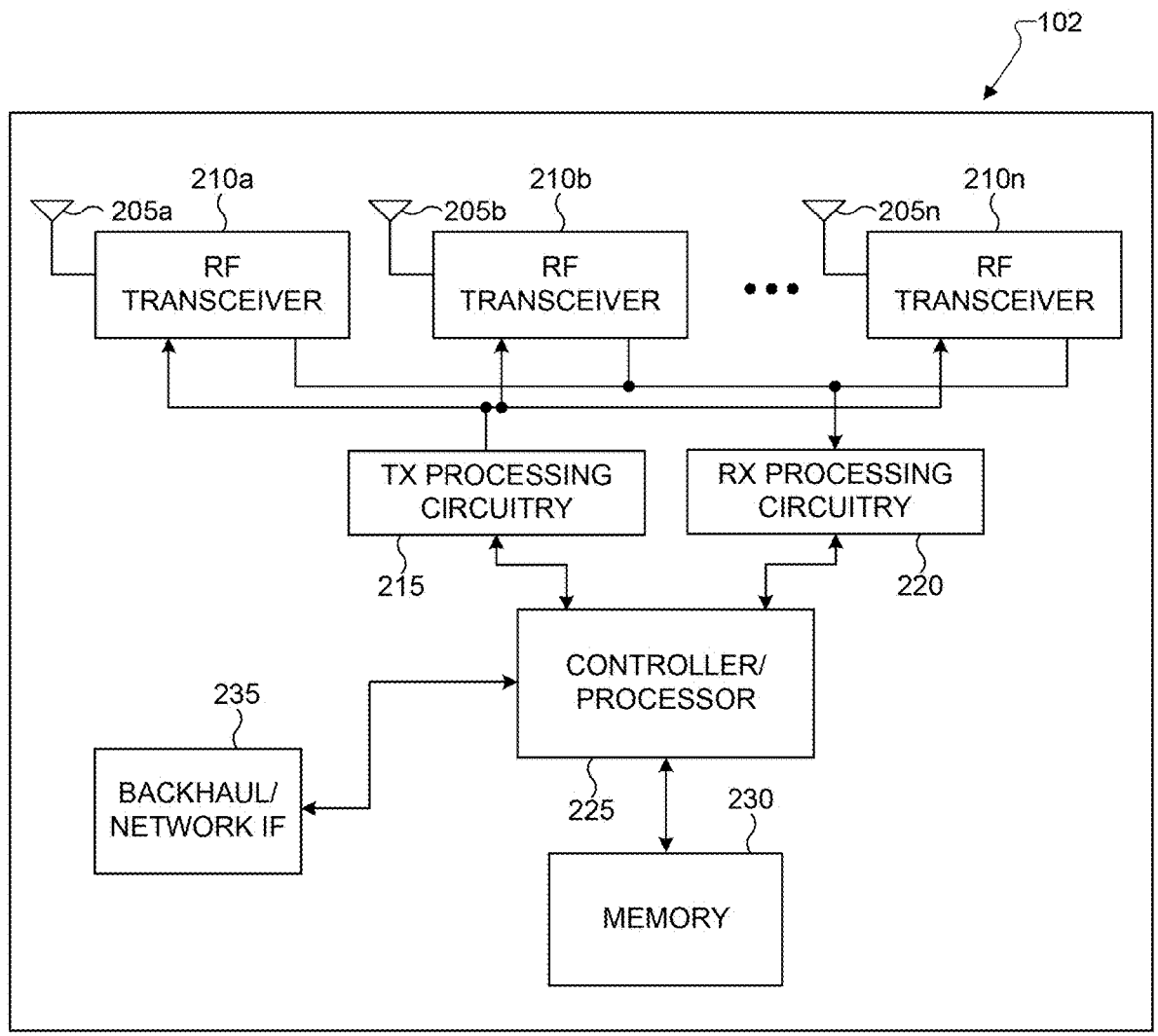
FIG. 2 illustrates an example eNB according to embodiments of the present disclosure.
Figure 3:
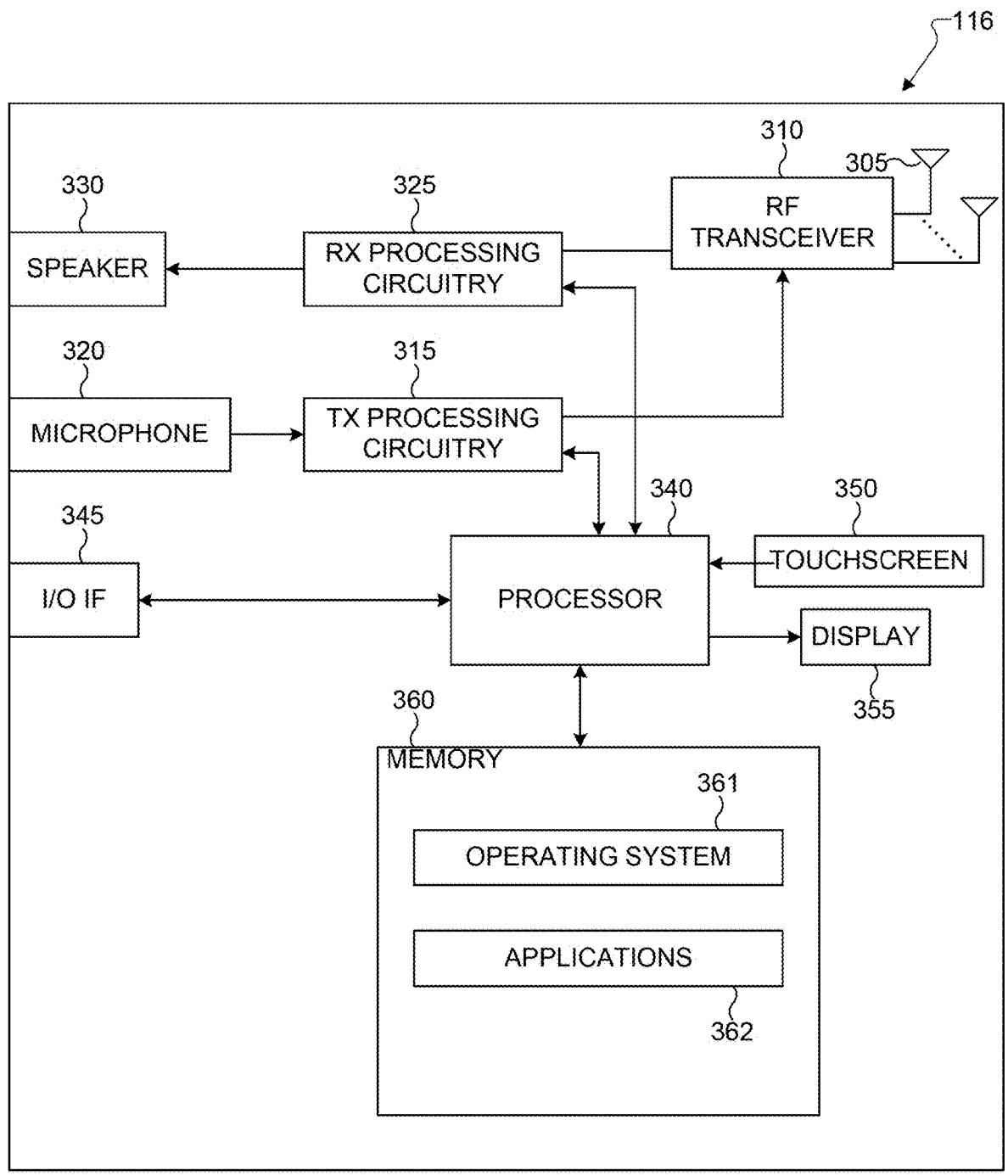
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient beam recovery in an advanced wireless communication system. In certain embodiments, and one or more of the eNBs 101-103 includes circuitry, programming, or a combination thereof, for receiving efficient beam recovery in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
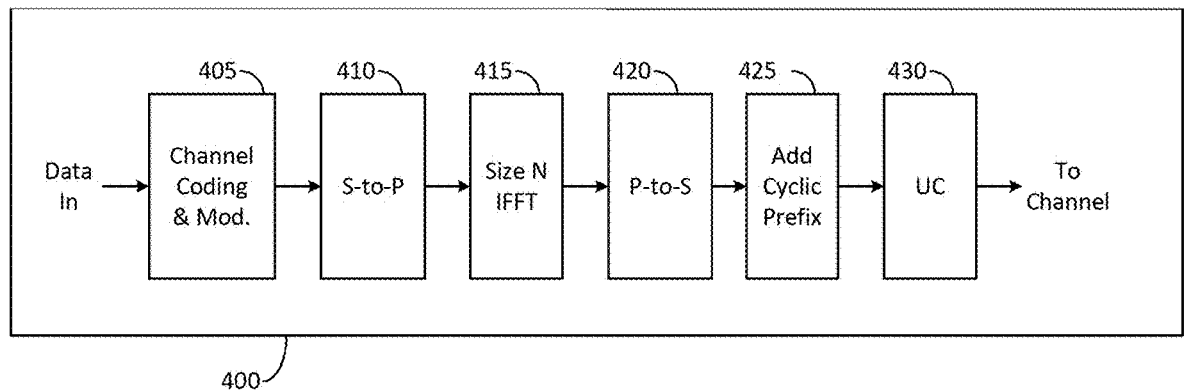
FIG. 4A illustrates a high-level diagram of an orthogonal frequency division multiple access transmit path according to embodiments of the present disclosure.
Figure 4B:
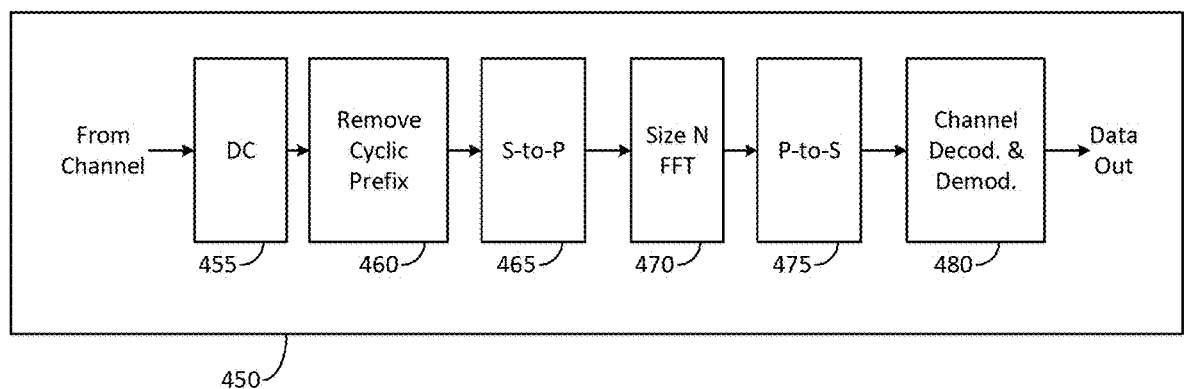
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a Downlink (DL) that conveys signals from transmission points such as Base Stations (BSs) or NodeBs to User Equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the BCCH conveys a master information block (MIB) or to a DL shared channel (DL-SCH) when the BCCH conveys a system information block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSC}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$ where $N_{SRS}=1$ if a last subframe symbol is used to transmit SRS and $N_{SRS}$ otherwise.

Figure 5:
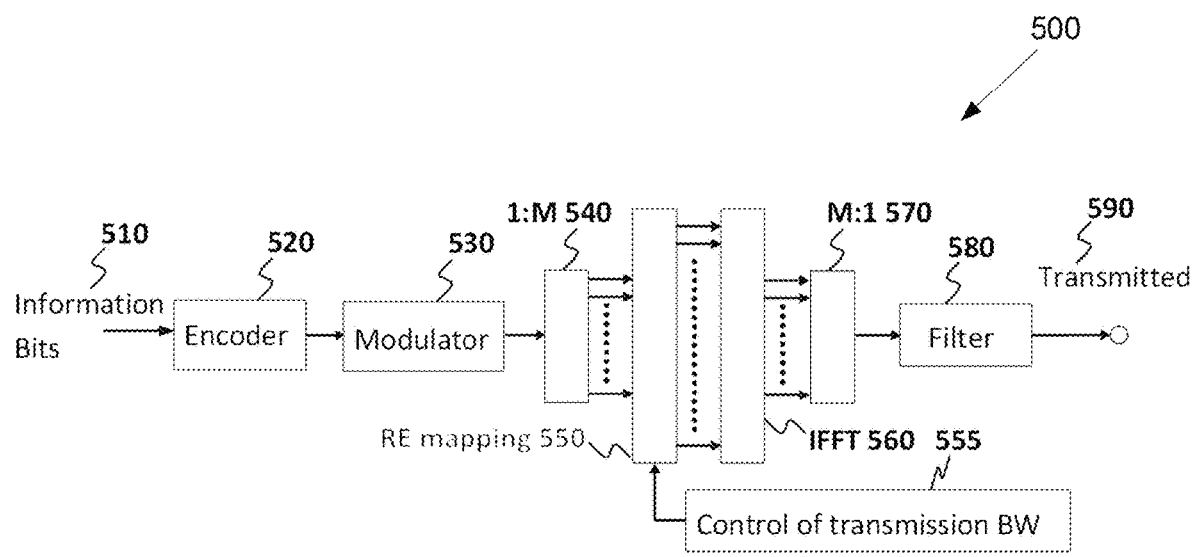
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
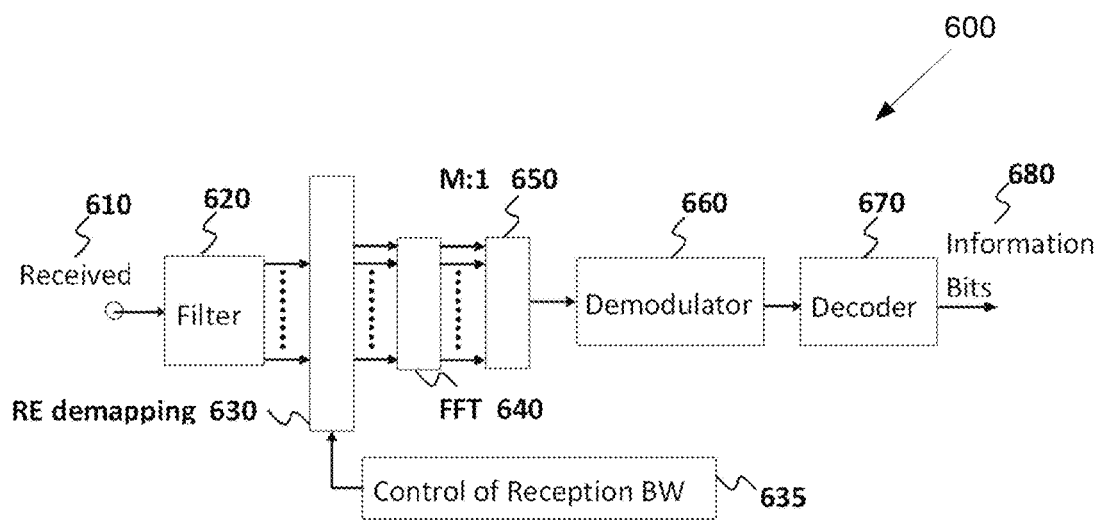
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
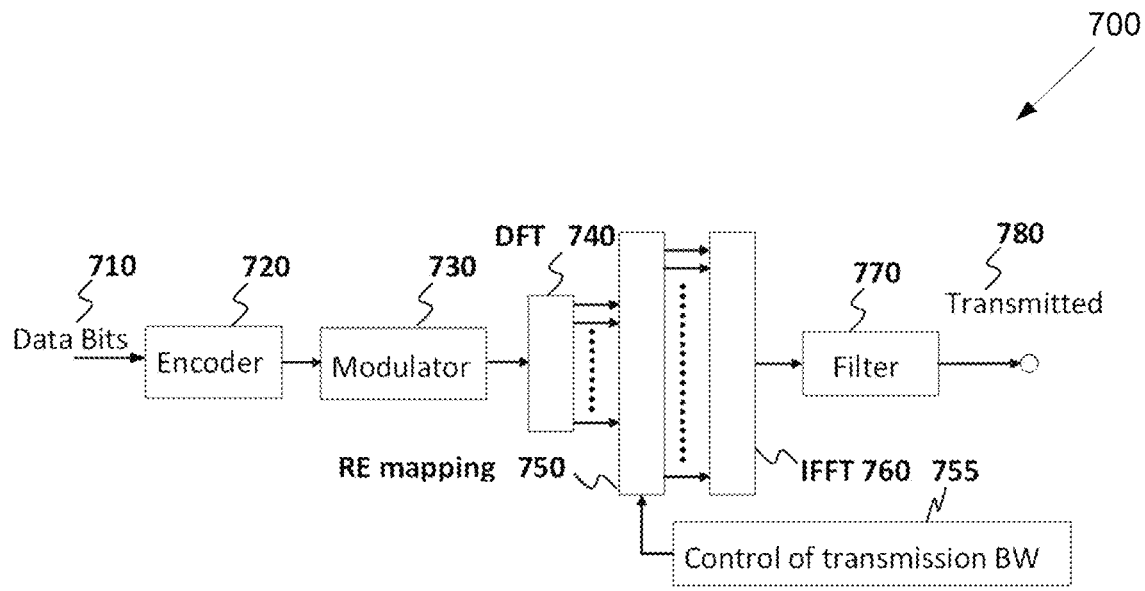
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
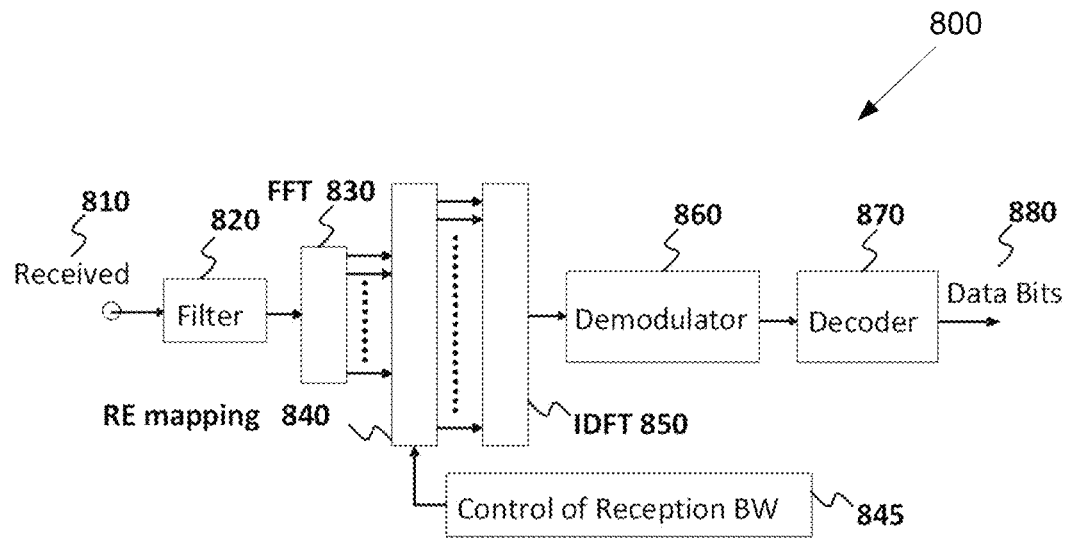
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
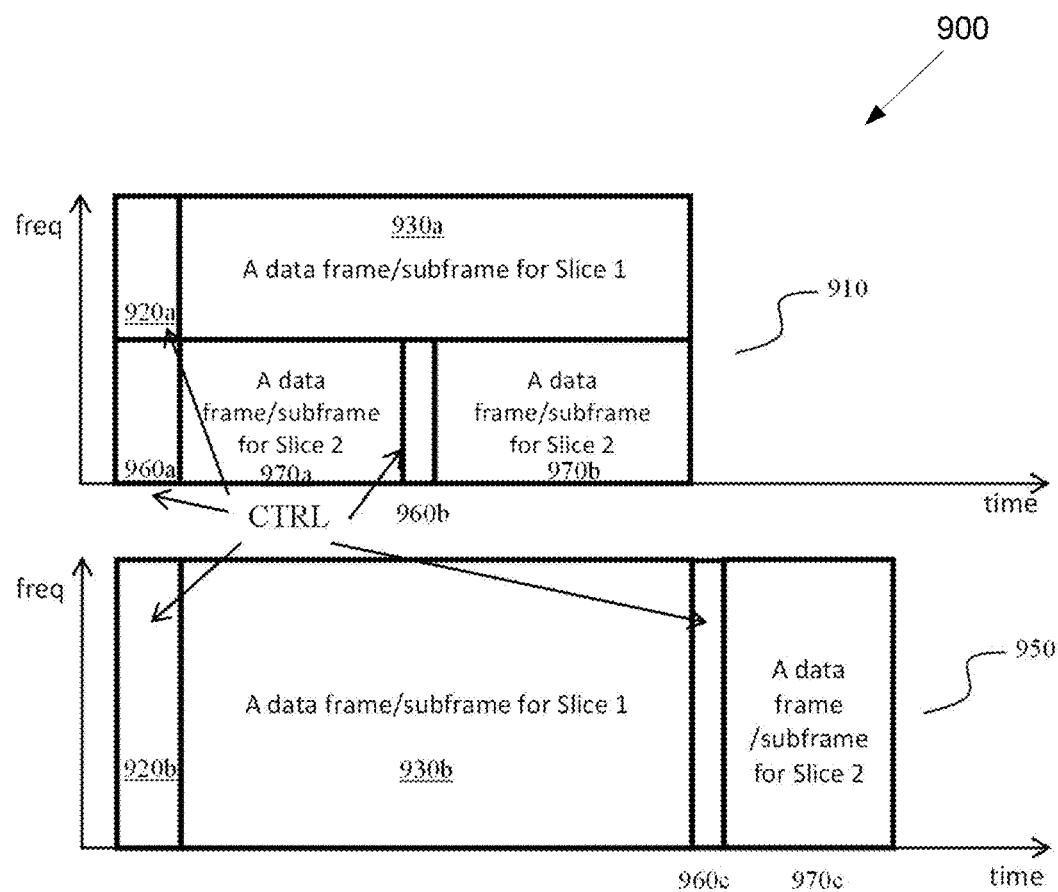
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
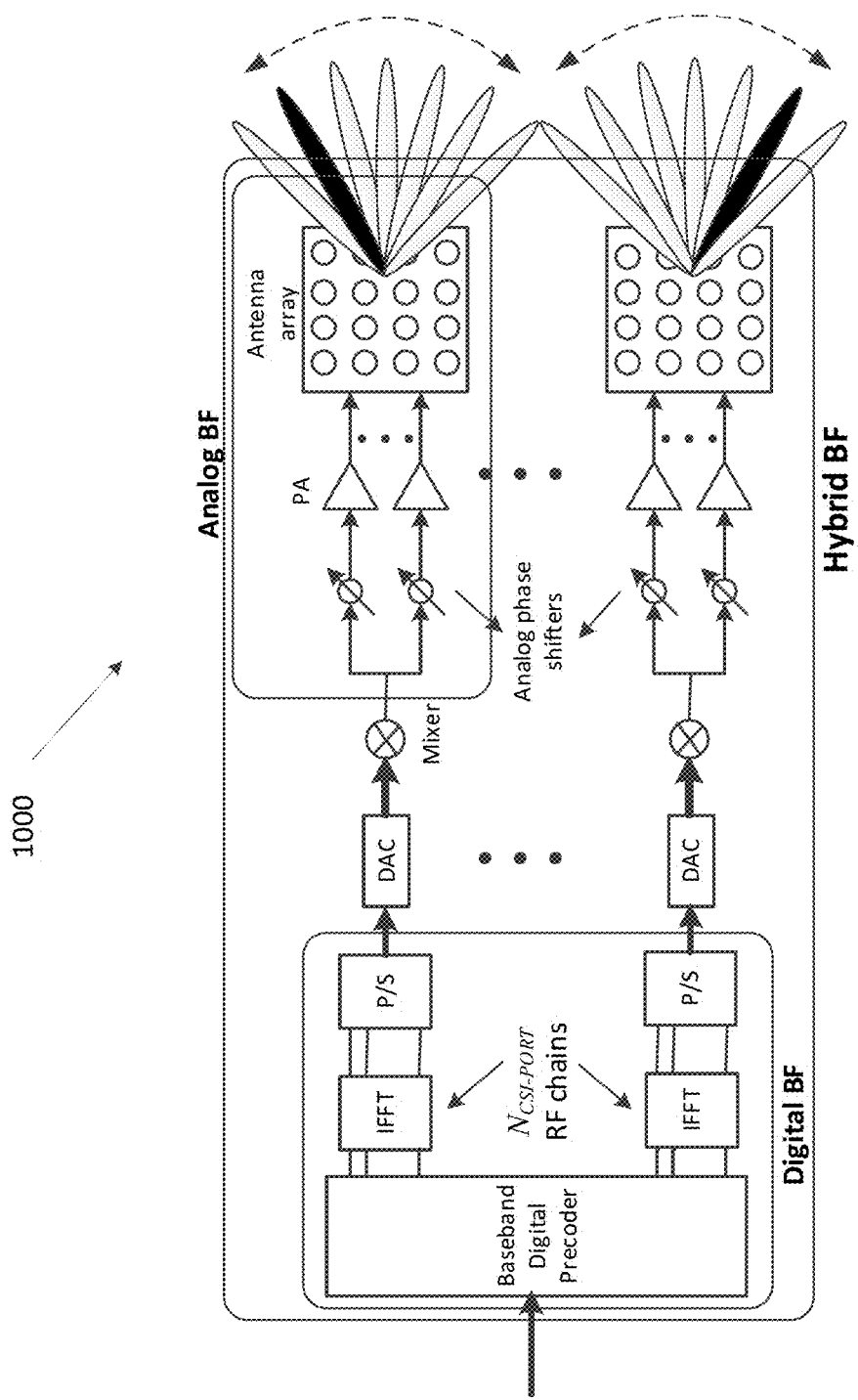
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

In a 3GPP LTE communication system, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems such as 3GPP NR (new radio access or interface), efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE specification. In this case, seamless mobility is a desirable feature.

Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable.

Figure 11:
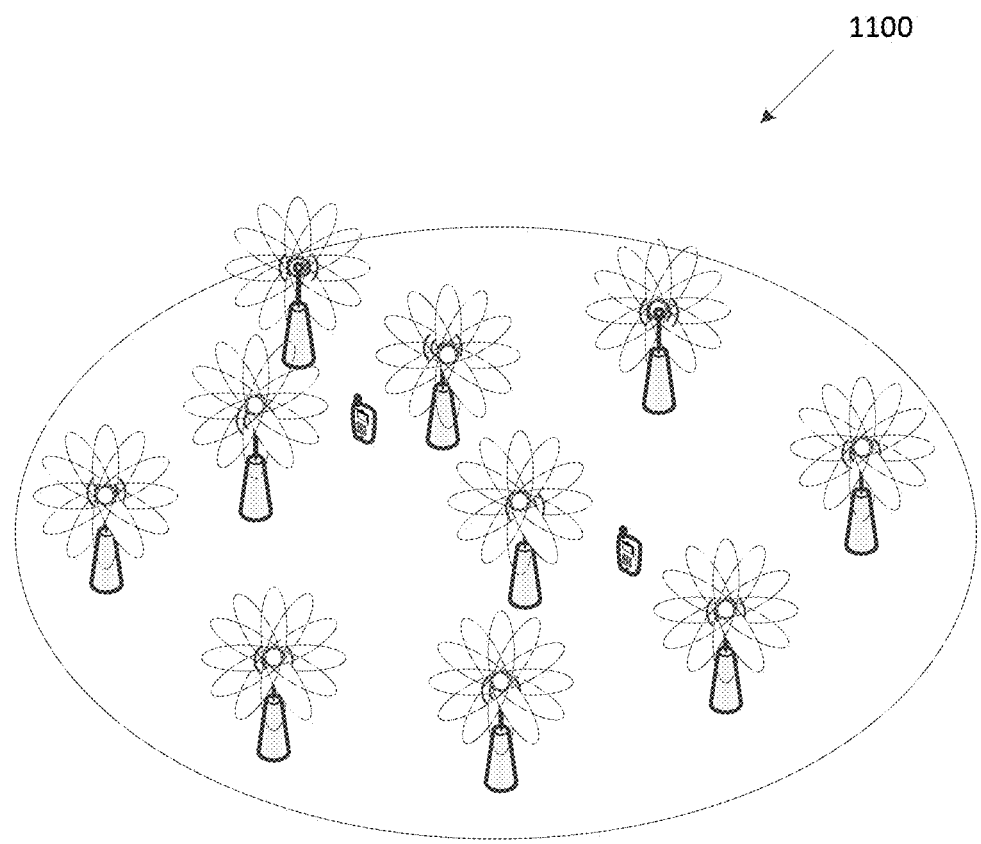
FIG. 11 illustrates an example UE mobility scenario according to embodiments of the present disclosure.

FIG. 11 illustrates an example UE mobility scenario 1100 according to embodiments of the present disclosure. The embodiment of the UE mobility scenario 1100 illustrated in FIG. 11 is for illustration only. FIG. 11 does not limit the scope of this disclosure to any particular implementation of the UE mobility scenario 1100.

For instance, the framework may be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework may be applicable whether beam sweeping (as illustrated in FIG. 11) is used or not.

Third, different frequency bands and use cases impose different coverage limitations. For example, mmWave bands impose large propagation losses. Therefore, some form of coverage enhancement scheme is needed. Several candidates include beam sweeping (as shown in FIG. 10), repetition, diversity, and/or multi-TRP transmission. For mMTC where transmission bandwidth is small, time-domain repetition is needed to ensure sufficient coverage.

A UE-centric access which utilizes two levels of radio resource entity is described in FIG. 11. These two levels can be termed as "cell" and "beam". These two terms are exemplary and used for illustrative purposes. Other terms such as radio resource (RR) 1 and 2 can also be used. Additionally, the term "beam" as a radio resource unit is to be differentiated with, for instance, an analog beam used for beam sweeping in FIG. 10.

As shown in FIG. 11, the first RR level (termed "cell") applies when a UE enters a network and therefore is engaged in an initial access procedure. In 1110, a UE 1111 is connected to cell 1112 after performing an initial access procedure which includes detecting the presence of synchronization signals. Synchronization signals can be used for coarse timing and frequency acquisitions as well as detecting the cell identification (cell ID) associated with the serving cell. In this first level, the UE observes cell boundaries as different cells can be associated with different cell IDs. In FIG. 11, one cell is associated with one TRP (in general, one cell can be associated with a plurality of TRPs). Since cell ID is a MAC layer entity, initial access involves not only physical layer procedure(s) (such as cell search via synchronization signal acquisition) but also MAC layer procedure(s).

The second RR level (termed "beam") applies when a UE is already connected to a cell and hence in the network. In this second level, a UE 1111 can move within the network without observing cell boundaries as illustrated in FIG. 11. That is, UE mobility is handled on beam level rather than cell level, where one cell can be associated with N beams (N can be 1 or >1). Unlike cell, however, beam is a physical layer entity. Therefore, UE mobility management is handled solely on physical layer. An example of UE mobility scenario based on the second level RR is given in FIG. 11.

After the UE 1111 is associated with the serving cell 1112, the UE 1111 is further associated with beam 1151. This is achieved by acquiring a beam or radio resource (RR) acquisition signal from which the UE can acquire a beam identity or identification. An example of beam or RR acquisition signal is a measurement reference signal (RS). Upon acquiring a beam (or RR) acquisition signal, the UE 1111 can report a status to the network or an associated TRP. Examples of such report include a measured beam power (or measurement RS power) or a set of at least one recommended "beam identity (ID)" or "RR-ID". Based on this report, the network or the associated TRP can assign a beam (as a radio resource) to the UE 1111 for data and control transmission. When the UE 1111 moves to another cell, the boundary between the previous and the next cells is neither observed nor visible to the UE 1111. Instead of cell handover, the UE 1111 switches from beam 1151 to beam 1152. Such a seamless mobility is facilitated by the report from UE 711 to the network or associated TRP—especially when the UE 1111 reports a set of M>1 preferred beam identities by acquiring and measuring M beam (or RR) acquisition signals.

In the present disclosure, a "beam" can correspond to an RS resource or one port in RS or one port+one time unit in RS, whether the beam is a sounding reference signal (SRS), CSI-RS, beam RS, measurement RS, or any other type of RS.

In high frequency band system (e.g., >6 GHz system), the TRP and the UE can be deployed with large number of antennas to relay on the high gain beamforming to defeat the large path loss and signal blockage. A general system configuration is that the TRP and UE have large number antenna but only one or a few TXRUs. So hybrid beamforming mechanism is utilized. Analog beams with different direction can be formulated on the antenna array that is connected to one TXRU. To get the best link quality and coverage distance, the TRP and UE need to align the analog beam directions for each particular downlink and uplink transmission.

In some embodiment, when a UE detects a beam failure event, the UE can be requested to transmit beam recovery request and then monitor for the beam recovery response from a TRP. If no proper response for the beam recovery request is received within configured time duration $T_0$, the UE can be configured to re-send the beam recovery request until a proper beam recovery response is received by the UE or the maximal number of beam recovery request transmission is achieved.

Figure 12:
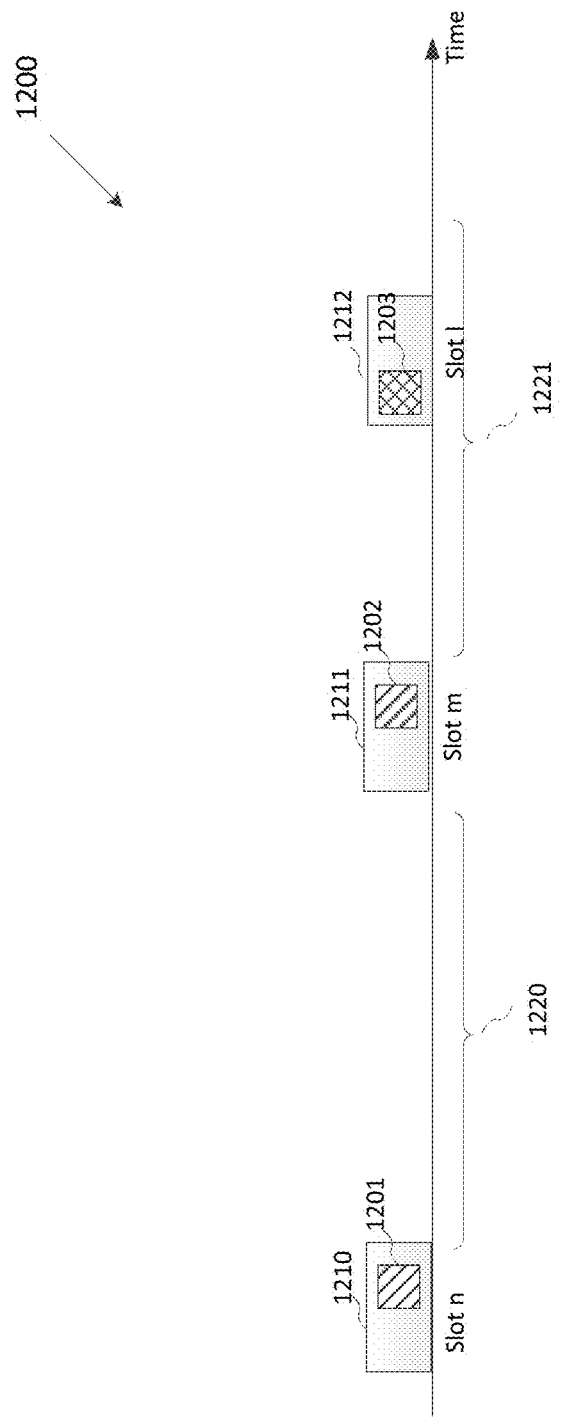
FIG. 12 illustrates an example beam recovery according to embodiments of the present disclosure.

FIG. 12 illustrates an example beam recovery 1200 according to embodiments of the present disclosure. The embodiment of the beam recovery 1200 illustrated in FIG. 12 is for illustration only. FIG. 12 does not limit the scope of this disclosure to any particular implementation As shown in FIG. 12, a UE can transmit beam recovery request 1201 in slot n 1210. After sending the beam recovery request 1201 in slot n 1210, the UE can be requested to monitor the gNB response during a configured beam recovery response window 1220. The beam recovery response window can be N slot or T milliseconds that can be configured by the NW. As illustrated in FIG. 12, the UE does not receive any proper beam recovery response during time window 1220. Then the UE can re-send the beam recovery request after the time window 1220. The UE sends beam recovery request 1202 in slot m 1211 and monitors the beam recovery response after sending beam recovery request 1202. Within the time window 1221, the UE receives a beam recovery response 1203 in slot l 1212.

In some embodiments, the UE can be configured with one or more of the following parameters by the NW. In one example, a length of time window to monitor the beam recovery response from a gNB. It can be a number of slot, N. It can be a length of time in milliseconds. The UE can be requested to monitor and receive beam recovery response within the configured time window after sending a beam recovery request. It can be signaled through system information, high layer signaling (e.g., RRC), MAC-CE or L1 signaling. In one example, a default value for the length of time window can be specified in the specification. The NW can signal a new value e.g., through system information, high layer signaling, MAC-CE or L1 signaling to override the default value.

In another example, a maximum number of beam recovery request transmission, $M_{max}$. When configured, the UE can be requested to transmit the beam recovery request message for up to $M_{max}$ times for a beam failure event. It can be signaled through system information, high layer signaling (e.g., RRC), MAC-CE or L1 signaling. In one example, a default value for the length of time window can be specified in the specification. The NW can signal a new value e.g., through system information, high layer signaling, MAC-CE or L1 signaling to override the default value.

In yet another example, a second timer for the UE to transmit and re-transmit beam failure recovery request. If a second timer expires and the UE does not receive any NW response to the beam failure recovery request, the UE can be requested to abort the beam failure recovery request transmission.

Figure 13A:
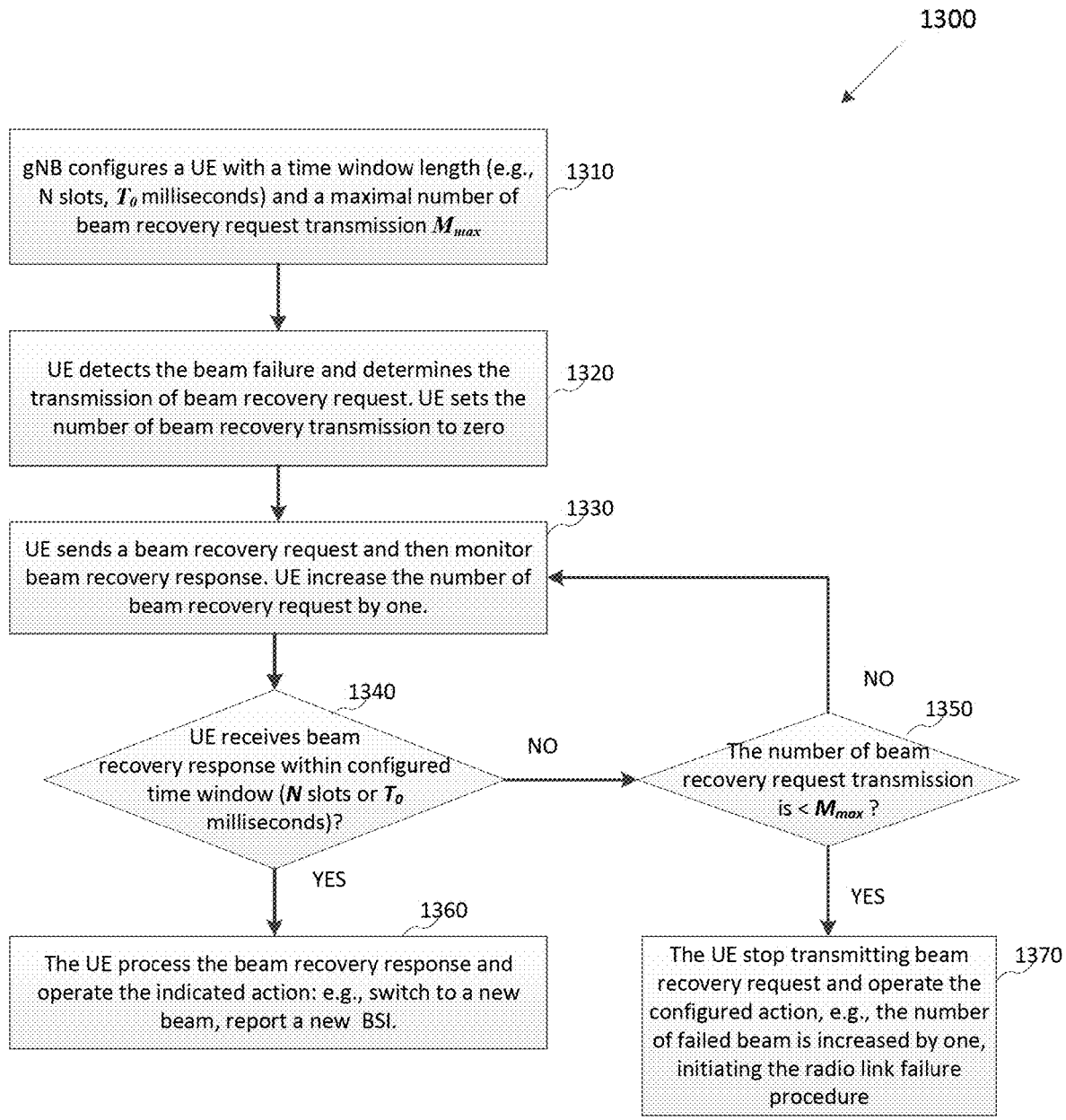
FIG. 13A illustrates a flow chart of a procedure for sending beam recovery request according to embodiments of the present disclosure.

FIG. 13A illustrates a flow chart of a procedure 1300 for sending beam recovery request according to embodiments of the present disclosure. The embodiment of the procedure 1300 illustrated in FIG. 13A is for illustration only. FIG. 13A does not limit the scope of this disclosure to any particular implementation.

In one embodiment, the UE can be configured with both maximum number of beam failure recovery request and a second timer. The UE can re-transmit the beam failure recovery request (if no NW response to any beam failure recovery request is received) until maximum number is achieved or a second timer expires.

In one embodiment, the UE can be configured with maximum number of beam failure recovery request. The UE can re-transmit the beam failure recovery request (if no NW response to any beam failure recovery request is received) until maximum number is achieved.

In one embodiment, the UE can be configured with a second timer. The UE can re-transmit the beam failure recovery request (if no NW response to any beam failure recovery request is received) until a second timer expires.

A TRP configures by high layers a UE with a time window length (e.g., N slots, $T_0$ milliseconds) within which the UE can be requested to monitor the beam recovery response from the NW after sending a beam recovery request at step 1310. A TRP configures by high layers a UE with a maximum number beam recovery request transmission, $T_0$, that indicates the maximal times a UE can send the beam recovery request after a beam failure event is detected at step 1310. The UE detects the beam failure event as configured by the NW at step 1320.

If a beam failure event is detected, the UE can determine to transmit beam recovery request and initiate the number of beam recovery request transmission to zero at step 1320. The UE sends a beam recovery request in a configured UL channel and then increases the number of beam recovery request by one at step 1330. Then the UE begins to monitor the beam recovery response from the NW. When the UE does not receive any beam recovery response within the configured time window (e.g., N slots, $T_0$ milliseconds) in step 1340, the UE can check if the number of beam recovery request transmission has achieved the configured transmission number limit $M_{max}$. When the UE determines the number of beam recovery request transmission is less than the configured transmission number limit $M_{max}$ in step 1350, the UE can re-send the beam recovery request on a configured UL channel and then increase the number of beam recovery request transmission by one in step 1330.

When the UE determines the number of beam recovery request transmission is not less than the configured transmission number limit $M_{max}$ in step 1350, the UE can abort the beam recovery request transmission and operates the configured operations, e.g., initiating the RLF (radio link failure) procedure in step 1370. When the UE receives any beam recovery response within the configured time window (e.g., N slots, $T_0$ milliseconds) after sending one beam recovery request in step 1340, the UE can abort the beam recovery request transmission and operate accordingly based on the received beam recovery response, e.g., switching the beam to a indicated new beam, reporting a beam state information in a scheduled UL transmission, measuring some RS for beam management as configured in step 1360.

Figure 13B:
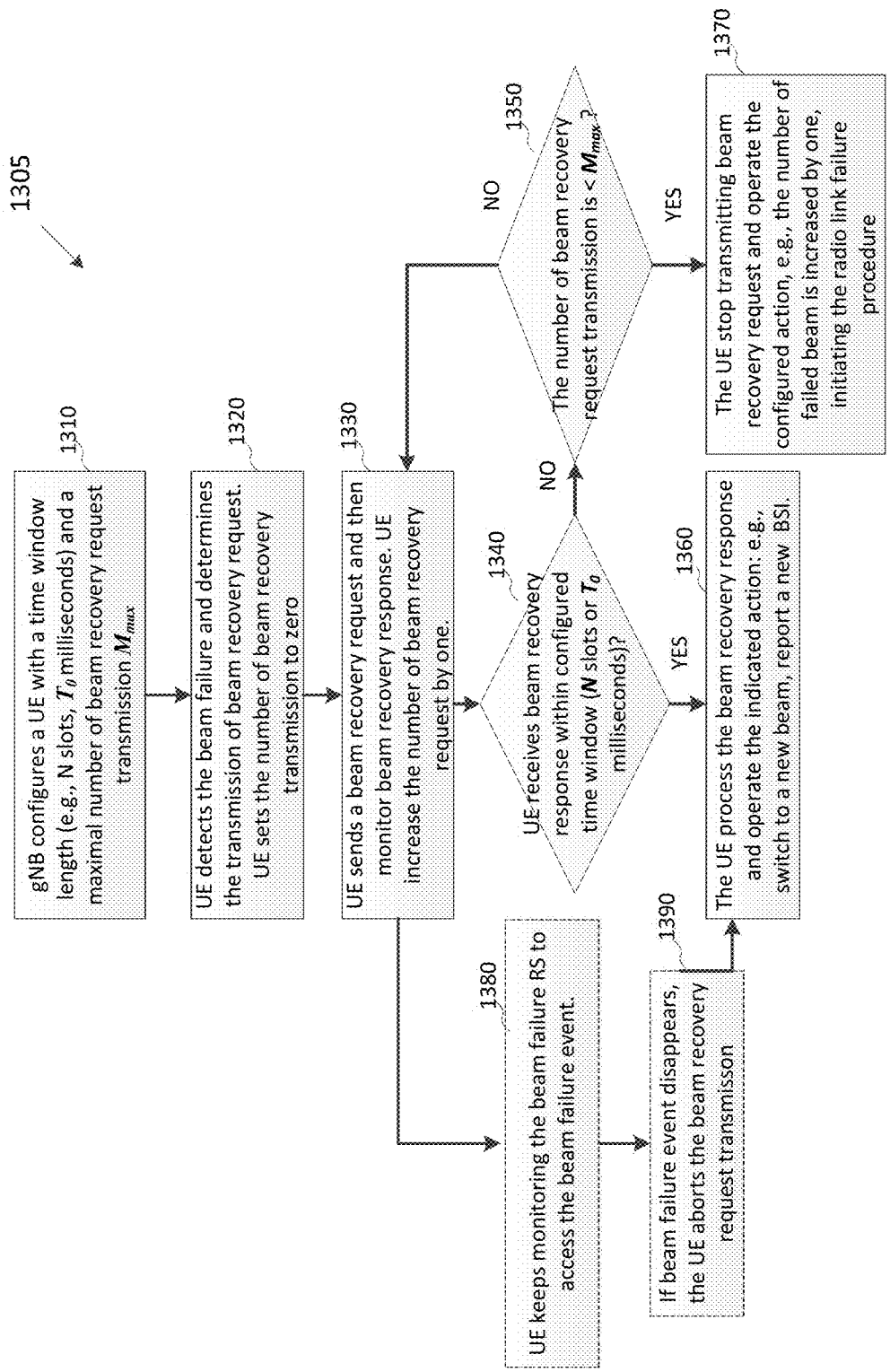
FIG. 13B illustrates another flow chart of a procedure for sending beam recovery request according to embodiments of the present disclosure.

FIG. 13B illustrates another flow chart of a procedure 1305 for sending beam recovery request according to embodiments of the present disclosure. The embodiment of the procedure 1305 illustrated in FIG. 13B is for illustration only. FIG. 13B does not limit the scope of this disclosure to any particular implementation.

In one embodiment, the UE can be configured to continue monitoring the beam failure detection RS to assess if a beam failure trigger condition is met or not when the UE sends beam recovery request and monitors beam recovery response as shown in FIG. 13B. The UE keeps monitoring the beam failure RS to access the beam failure trigger condition in step 1380 after the UE sends beam recovery request in step 1330. When the beam failure trigger condition disappears, the UE can abort the beam recovery request transmission in step 1390.

In one embodiment, the UE can be requested to monitor a beam failure detection RS and measure the RSRP of some configured beam covered in the beam failure RS to assess if a beam failure trigger condition is met. In one method, the UE can be requested to measure the RSRP of NR-SSS in one indicated new radio secondary synchronization signal (NR-SS) block. The gNB can configure a UE with one or more of the followings: the index of one NR-SS block, i; a RSRP threshold; a time duration $T_1$; and a number of measurement on new radio shared spectrum (NR-SS) block, $N_1$.

The UE can be requested to measure the L1-RSRP of NR-SSS in the indicated NR-SS block index. In one example, when L1-RSRP of NR-SSS of all NR-SS block index i within the time unit $T_1$ is less than a configured RSRP threshold, the UE can declare beam failure trigger condition is met. In one example, when L1-RSRP of NR-SSS of all NR-SS block index i within $N_1$ consecutive NR-SS block burst sets is less than a configured RSRP threshold, the UE can declare beam failure trigger condition is met. In one example, when mean of L1-RSRP of NR-SSS of all NR-SS block index i within the time unit $T_1$ is less than a configured RSRP threshold, the UE can declare beam failure trigger condition is met.

In one example, when the mean L1-RSRP of NR-SSS of all NR-SS block index i within $N_1$ consecutive NR-SS block burst sets is less than a configured RSRP threshold, the UE can declare beam failure trigger condition is met. In one example, when median of L1-RSRP of NR-SSS of all NR-SS block index i within the time unit $T_1$ is less than a configured RSRP threshold, the UE can declare beam failure trigger condition is met. In one example, when the median L1-RSRP of NR-SSS of all NR-SS block index i within $N_1$ consecutive NR-SS block burst sets is less than a configured RSRP threshold, the UE can declare beam failure trigger condition is met.

Alternatively, the UE can be requested to measure the L1-RSRP of new radio physical broadcast channel (NR-PBCH) signal in one indicated NR-SS block i and apply the above embodiments to declare the beam failure event. Alternatively, the UE can be requested to measure the L1-RSRP of DMRS for NR-PBCH signal in one indicated NR-SS block i and apply the above methods to declare the beam failure event. Alternatively, the UE can be requested to measure the sum L1-RSRP of NR-SSS and NR-PBCH signal in one indicated NR-SS block i and apply the above methods to declare the beam failure event.

In one method, the beam recovery request signal can include one or more of the following component. In one example, the beam recovery request signal can include one bit information to indicate that beam failure is detected; information to indicate that TRP Tx beam is failed; information to indicate that UE Rx beam is failed. In one example, the beam recovery request signal can include information to indicate if a new candidate TRP Tx beam is determined by the UE.

In one example, the beam recovery request signal can include a TRP Tx beam recommended by the UE. It can be a NR-SS block index. It can be a CSI-RS resource ID. It can be a {CSI-RS resource ID, CSI-RS antenna port ID or CSI-RS antenna port ID set index}.

In one example, the beam recovery request signal can include a request from the UE to request UL assignment for a beam reporting; a request from the UE to request the gNB to trigger aperiodic CSI-RS transmission to allow the UE to refine Rx beams.

In one example, the beam recovery request signal can include UE's identity. It can be UE's RNTI. It can be implicitly indicated through the UL resource assigned to a UE to transmit beam recovery request. It can be jointly indicated through the UL resource assignment and signal scramble sequence.

In one method, the UE can assume to expect one or more of the following messages after sending a beam recovery request. In one example, the beam recovery response is signaling indicating the UE to switch the beam of control channel to a new beam. The signaling can be RRC signaling, MAC-CE or L1 DCI signaling in common control channel. In one example, the beam recovery response is that the UE decodes DCI in control channel by assuming the gNB uses the recommended beam in the beam recovery request message within the configured time window. In one example, the beam recovery response is a dedicated acknowledge message transmitted in DCI or MAC-CE to inform the UE that the beam recovery request is received successfully by the NW. In one example, the beam recovery response is that the UE receives a UL NR-PUSCH assignment. In one example, the beam recovery response is that the UE receives the trigger message of aperiodic CSI-RS transmission or semi-persistent transmission.

In some embodiments, a UE can be configured with a signal sequence and a UL channel. The UE can be request to send the configured signal sequence on the configured UL channel when beam recovery request trigger condition is met. After sending the configured signal sequence, the UE can be configured to receive a DCI scrambled with this UE's RNTI within N slots. If no DCI scrambled with this UE's RNTI is received within N slots, the UE can re-send the configured signal sequence.

A UE can be configured to monitor $M \geq 1$ BPLs (beam pair links) on the PDCCH. Each BPL corresponds to a pair of one TRP Tx beam and one UE Rx beam. Based on BPL identification, the UE can calculate the Rx beam that may be used to buffer one PDCCH. The UE can be configured with $M \geq 1$ BPLs at a slot-level or OFDM symbol-level. If at slot-level, the UE can be configured with different BPLs at different slots. If at OFDM symbol-level, the UE can be configured with different BPL at different OFDM symbols in the PDCCH region at one slot.

When the UE is configured with $M \geq 1$ BPLs to monitor the PDCCH, the UE can be requested to transmit beam failure recovery request message if some condition is met. The condition can be one of more of the followings. In one example, the condition can be the L1 RSRP measurement of all M configured BPL is below a configured RSRP threshold for configured time duration, e.g., N slots and a new candidate beam is identified.

In one example, the condition can be out of configured $M \geq 1$ BPLs, one BPL is defined as the primary BPL. The L1 RSRP measurement of primary BPL is below a configured RSRP threshold for configured time duration and new candidate beam is identified.

In one example, the condition can be the L1 RSRP measurement of primary BPL is below a configured RSRP threshold for configured time duration.

In one example, the condition can be the L1 RSRP measurement of one or more but <M BPLs is below a configured RSRP threshold for a configured time duration.

In one embodiment, the UE can be configured with an L1 RSRP threshold and time duration for each BPL separately.

The UE can be configured to monitor the L1 RSRP of all M configured BPL. In one embodiment, the UE can be requested to monitor the L1 RSRP of one or more than one CSI-RS resources in a periodic CSI-RS or semi-persistent CSI-RS transmission. In one example, the TRP can signal a subset of CSI-RS resource indices or the index of CSI-RS resource ports/CSI-RS resource indices and the UE can be requested to monitor the L1 RSRP of those CSI-RS resources or CSI-RS resource ports. In one example, the TRP can signal a subset of SS-block time indices and the UE can be requested to monitor the L1 RSRP of signals in those SS-blocks.

The signals in SS blocks can be NR-SSS, NR-PBCH, DMRS to NR-PBCH or the combination of these signals. In one embodiment, the UE can be requested to monitor the corresponding CSI-RS resource, CSI-RS ports or SS-block when the UE is configured with one BPL to monitor the PDCCH. When the UE is configured with M BPL to monitor the PDCCH, the UE can be requested to calculate the corresponding CSI-RS resource, CSI-RS ports or SS block for each configured BPL and then monitor the L1 RSRP. When the RS resource corresponding to one configured BPL is updated, the UE can be requested to monitor the new RS resource.

In one embodiment, the UE can be requested to calculate the Tx power of beam recovery request based on the path loss measured from the selected new candidate beam. The Tx power can be calculated by:

$$P_{BR,c,k}(i) = \min\left\{\begin{array}{l}P_{CMAX,c}(i),\\P_{BR\_OFFSET,c,k}(m) + 10\log_{10}(M_{BR,c}(i)) + P_{O,c,k}(j) + \alpha_{c,k}(j) \cdot PL_{c,k} + f_{c,k}(i)\end{array}\right\}.$$

The path loss $PL_{c,k}$ can be measured from the RS that carries the new candidate beam selected by the UE. The parameters Po and α can be configured specifically for beam recovery request by the NW. The parameters Po and α can be re-used of the parameters for PUSCH, SRS, PUCCH or PRACH transmission.

In one embodiment, the UE can increase the Tx power of beam recovery request transmission in the re-transmission of beam recovery request.

In one embodiment, the UE may re-calculate the Tx power if the UE changes the selection of new candidate beam in the re-transmission of beam recovery request.

The UE can be configured to trigger an event report if one or more but not all of those M configured BPLs have L1 RSRP being below some configured threshold for configured time duration. In one example, the UE can report an event in PUCCH and the message can include one or more of the followings: an indication of some BPL(s) is failed; and the identification information of one or more BPLs. After sending the event report, the UE can be requested to monitor the rest of BPL for the event response from the TRP.

In some embodiments, a UE can be configured to measure the beam quality of one configured periodic RS resource and reports the measurement results to upper layer. A UE can be configured with a first beam quality threshold, a second beam quality threshold, a first beam quality measurement time duration, and a second beam quality measurement time duration.

In one embodiment, a UE can be configured with a first beam quality threshold, a number threshold and a RS resource (e.g., one CSI-RS resource, one NR-SS block index, one CSI-RS resource+port index). The UE can be configured to measure the L1 RSRP or L1 RSRQ of each RS resource transmission and then compare the L1 RSRP or L1 RSRQ with the configured first beam quality threshold. If the measured L1 RSRP or L1 RSRQ is below the first beam quality threshold, the UE can report a beam-link-out-of-sync event to the upper layer.

In one example, if the number of consecutive beam-link-out-of-sync events is above a number threshold, the UE can declare the beam failure is detected on configured RS resource. If the configured RS resource is NR-SS block, the UE can be configured to measure the L1-RSRP or L1-RSRQ from NR-SSS signal in the configured NR-SS block, or NR-SSS and DMRS for PBCH in the configured NR-SS block. If the configured RS resource is one CSI-RS resource, the UE can be configured to measure the L1-RSRP or L1-RSRQ of a first antenna port in the configured CSI-RS resource and the UE can be configured to measure more than one or all antenna ports in CSI-RS resource and then sum or average the L1-RSRP of those antenna ports.

In one example, the UE can be configured to measure the SINR-like or CQI-like metric on configured RS resource. The UE can be configured to measure the SINR-like or CQI-like metric by assuming one PDCCH signal is transmitted on the time-frequency resource used by the configured RS resource. The UE can be configured with the transmit power offset between the PDCCH signal and the configured RS resource. The UE can be requested to measure the SINR-like or CQI-like by applying the transmit power offset and also the transmit scheme assumed for the PDCCH channel.

The UE can be requested to measure the SINR-like or CQI-like metric of each RS resource transmission instance and then compare the SINR-like/CQI-like metric with a first beam quality. If the SINR-like/CQI-like metric is below a first beam quality, the UE can report beam-link-out-of-sync event to the upper layer. In one example, if the number of consecutive beam-link-out-of-sync events is above a number threshold, the UE can declare the beam failure is detected on configured RS resource.

In one example, the UE can be requested to assume the configured RS to estimate the channel by assuming the configured RS as DMRS to measure the SINR-like metric or CQI-like metric. If the RS has more antenna ports than the DMRS of corresponding PDCCH, the UE can be configured to assume some precoding is applied to the configured RS first before the UE measure the CQI-like or SINR-like metric.

In one embodiment, the UE can be configured with two number thresholds: a first number threshold and a second number threshold. The UE can declare the beam failure if the number beam-link-out-of-sync is above a first number threshold within the latest a second number threshold L1 metric measurement reporting from L1.

In one embodiment, the UE can be configured with a third number threshold and a ratio threshold. The UE can declare the beam failure if the ratio of beam-link-out-of-sync is above a ratio threshold within the latest a third number threshold L1 metric measurement reporting from L1.

In one embodiment, the UE can be configured to monitor the beam quality of multiple RS resources. In one example, the UE can be configured to measure the beam quality of each CSI-RS resources of multiple indicated CSI-RS resource. In one example the UE can configured to measure the beam quality of each NR-SS block of multiple indicated NR-SS blocks.

In one embodiment, the UE can be configured with a first beam quality threshold (e.g., L1 RSRP value, L1 RSRQ value, SINR, CQI) for each indicated RS resource. Then the UE can be configured to measure the beam quality (as configured) of each transmission instance of each indicates RS resource and then compare each measured beam quality with the corresponding configured a first beam quality threshold. If one measured beam quality is below the configured a first beam quality threshold, a beam-link-out-sync event can be claimed for that RS resource. The UE can also be configured with a threshold for event number for each of indicated RS resource. If the number of consecutive beam-link-out-sync is larger than the configured threshold for event number, the corresponding RS resource (and corresponding) can be declared as beam failure.

In one embodiment, the UE can be configured with one a first beam quality threshold and a threshold for event number that are used for all indicated RS resources.

In one embodiment, one UE can be configured with one or more RS resource indices the UE to measure and monitor the beam failure for one or more BPL (beam pair link) for PDCCH. The PDCCH can be UE-specific PDCCH. The PDCCH can be UE-group-common PDCCH.

In one embodiment, the UE can be configured with one or more than one CSI-RS resource indicators and also the mapping between indicated CSI-RS resource indicators and the BPLs used for PDCCH transmission. If the UE declare the beam quality of one CSI-RS resource is failed, the UE can assume the beam failure event of the corresponding BPL has occurred.

In one embodiment, the UE can be configured with one or more than one NR-SS block indicators and also the mapping between indicated NR-SS block indicators and the BPLs used for PDCCH transmission. If the UE declares the beam quality of one NR-SS block is failed, the UE can assume the beam failure event of the corresponding BPL has occurred.

In one embodiment, the UE can be configured with one or more than one NR-SS block indicators and one or more CSI-RS resource indicators and also the mapping between indicated NR-SS block indicators/CSI-RS resource indicators and the BPLs used for PDCCH transmission. If the UE declare the beam quality of one NR-SS block/CSI-RS resource is failed, the UE can assume the beam failure event of the corresponding BPL has occurred. The aforementioned information of embodiments can be signaled by RRC signaling, MAC-CE signaling or DCI signaling.

In one embodiment, the UE can be requested to calculate the CSI-RS resource indicator, CSI-RS resource/port index or NR-SS block index based on the configured BPLs for monitoring PDCCH transmission. In one example, the UE can be configured with one or more BPLs for PDCCH transmission, The UE can be requested to calculate the RS resource index based on each configured BPL and then monitor the calculated RS resources for the beam failure event of corresponding BPL.

In one embodiment, the UE can be requested to calculate the RS resource index based on the configured BPLs for monitoring PDCCH transmission. The UE can also be configured to monitor the beam failure event for a subset of the configured BPLs.

In some embodiments, a UE can be configured to identify one or more new candidate beam from a configured RS setting. The UE can be configured with: a set of RS resources: a set of multiple periodic CSI-RS resources (e.g., a set of multiple NR-SS blocks); a first beam quality threshold (e.g., can be threshold for L1 RSRP, L1 RSRQ, SINR, CQI, and CSI); and/or a threshold for measurement number (e.g., a number of measurement, a metric of time, for example milliseconds).

In one embodiment, a UE can be configured with a first beam quality threshold, a number threshold and a RS resource (e.g., one CSI-RS resource, one NR-SS block index, one CSI-RS resource+port index). The UE can be configured to measure the L1 RSRP or L1 RSRQ of each RS resource transmission and then compare the L1 RSRP or L1 RSRQ with the configured first beam quality threshold. If one measured L1 RSRP or L1 RSRQ is above the first beam quality threshold, the UE can report a beam-candidate event to the upper layer.

In one example, if the number of consecutive beam-candidate events is above a number threshold, the UE can declare a new candidate beam is detected on configured RS resource. If the configured RS resource is NR-SS block, the UE can be configured to measure the L1-RSRP or L1-RSRQ from NR-SSS signal in the configured NR-SS block, or NR-SSS and DMRS for PBCH in the configured NR-SS block. If the configured RS resource is one CSI-RS resource, the UE can be configured to measure the L1-RSRP or L1-RSRQ of a first antenna port in the configured CSI-RS resource and the UE can be configured to measure more than one or all antenna ports in CSI-RS resource and then sum or average the L1-RSRP of those antenna ports.

In one example, the UE can be configured to measure the SINR-like or CQI-like metric on configured RS resource. The UE can be configured to measure the SINR-like or CQI-like metric by assuming one PDCCH signal is transmitted on the time-frequency resource used by the configured RS resource. The UE can be configured with the transmit power offset between the PDCCH signal and the configured RS resource. The UE can be requested to measure the SINR-like or CQI-like by applying the transmit power offset and also the transmit scheme assumed for the PDCCH channel. The UE can be requested to measure the SINR-like or CQI-like metric of each RS resource transmission instance and then compare the SINR-like/CQI-like metric with a first beam quality. If the SINR-like/CQI-like metric is above a first beam quality, the UE can report beam-candidate event to the upper layer.

In one example, if the number of consecutive beam-candidate events is above a number threshold, the UE can declare a new candidate beam is detected on that RS resource. In one example, the UE can be requested to assume the configured RS to estimate the channel by assuming the configured RS as DMRS to measure the SINR-like metric or CQI-like metric. If the RS has more antenna ports than the DMRS of corresponding PDCCH, the UE can be configured to assume some precoding is applied to the configured RS first before the UE measure the CQI-like or SINR-like metric.

In one embodiment, the UE can be configured with two number thresholds: a first number threshold and a second number threshold. The UE can declare a new candidate beam if the number of beam-candidate is above a first number threshold within the latest a second number threshold L1 metric measurement reporting from L1.

In one embodiment, the UE can be configured with a third number threshold and a ratio threshold. The UE can declare a new candidate beam if the ratio of beam-candidate is above a ratio threshold within the latest a third number threshold L1 metric measurement reporting from L1.

A UE can be requested to measure RS resource transmission and claim beam failure according one or more of the following embodiments.

In one embodiment, the UE can be requested to measure the L1-RSRP or L1-RSRQ of each RS transmission instance of all N consecutive RS transmission instances (during one indicated time duration). The UE can compare the L1-RSRP or L1-RSRQ of each RS transmission instance with a configured threshold. The UE can claim the beam failure of beam that is associated with the measured RS resource if the L1-RSRP or L1-RSRQ of all N RS transmission instances is below the configured threshold.

In another embodiment, the UE can be requested to measure the L1-RSRP or L1-RSRQ of each RS transmission instance of all N consecutive RS transmission instances (during one indicated time duration). The UE can compare the L1-RSRP or L1-RSRQ of each RS transmission instance with a configured threshold. The UE can claim the beam failure of beam that is associated with the measured RS resource if the mean or median of L1-RSRP or L1-RSRQ of all N RS transmission instances is below the configured threshold.

In yet another embodiment, the UE can be requested to measure the L1-RSRP or L1-RSRQ of each RS transmission instance of all N consecutive RS transmission instances (during one indicated time duration). The UE can compare the L1-RSRP or L1-RSRQ of each RS transmission instance with a configured threshold. The UE can claim the beam failure of beam that is associated with the measured RS resource if the percentage of RS transmission instance whose L1-RSRP or L1-RSRQ is below the configured threshold is above some configured percentage threshold.

In yet another embodiment, the UE can be requested to measure the SINR or CQI of each RS transmission instance of all N consecutive RS transmission instances (during one indicated time duration). The UE can compare the SINR or CQI of each RS transmission instance with a configured threshold. The UE can claim the beam failure of beam that is associated with the measured RS resource if the SINR or CQI of all N RS transmission instances is below the configured threshold.

In yet another embodiment, the UE can be requested to measure the SINR or CQI of each RS transmission instance of all N consecutive RS transmission instances (during one indicated time duration). The UE can compare the SINR or CQI of each RS transmission instance with a configured threshold. The UE can claim the beam failure of beam that is associated with the measured RS resource if the mean or median of SINR or CQI of all N RS transmission instances is below the configured threshold.

In yet another embodiment, the UE can be requested to measure the SINR or CQI of each RS transmission instance of all N consecutive RS transmission instances (during one indicated time duration). The UE can compare the SINR or CQI of each RS transmission instance with a configured threshold. The UE can claim the beam failure of beam that is associated with the measured RS resource if the percentage of RS transmission instance whose SINR or CQI is below the configured threshold is above some configured percentage threshold.

In some embodiments, a UE can be configured to measure one RS resource transmission for the beam failure detection of BPL (beam pair link) that is configured for PDCCH transmission. The UE can be requested to use the same Rx beam to measure the beam quality of one RS resource transmission as the Rx beam used to receive the PDCCH that is configured with the BPL associating with the configured RS resource transmission.

In one embodiment, the UE can be configured with RS resource for beam failure detection through an implicit method. A UE can be configured with one BPL or spatial quasi co-located (QCL) assumption information for one or more CORESET of PDCCH. The UE can be requested to calculate the Rx beam that may be used to receive the corresponding CORESET based on indicated BPL or spatial QCL assumption. The UE can also be requested to calculate the index of one RS resource that corresponds to the BPL or spatial QCL assumption. In one example, the RS resource used for beam failure detection is CSI-RS resource. In another example, the RS resource used for beam failure detection is NR-SS block. The UE can be requested to calculate the index of one RS resource that corresponds to one indicated BPL or spatial QCL assumption information and then begin to measure/monitor the transmission instance of calculated RS resource based on one or more of the method described above.

In one embodiment, the UE can be configured with one RS resource for beam failure detection for one indicated BPL for PDCCH transmission through an explicit method. In one example, the UE can be configured with one CSI-RS resource or one NR-SS block index and the UE can be requested to use measure the quality of configured CSI-RS resource or NR-SS block for the first configured BPL for PDCCH. In one example, the UE can be configured with one or more CSI-RS resources or NR-SS block indices and a tag index for each configured RS resource. The UE can be requested to calculate the BPL index or corresponding spatial QCL assumption based on each indicated tag index and then the UE can be requested to measure each configured RS resource for the beam failure detection for the BPL or spatial QCL assumption corresponding to the tag index associated with that RS resource. The UE can measure and monitor each configured RS resource for the beam failure detection for corresponding BPL according to one or more of method described above.

In one embodiment, the UE can be configured with spatial QCL configuration for UE-specific PDCCH by signaling one or more transmission configuration indication (TCI) state(s). The UE can be configured with a TCI state for each CORESET. The UE can be configured with TCI state for each search space. The UE can be configured with one or more than one TCI states for UE-specific PDCCH. The UE can be configured to declare beam failure if all the configured TCI states are failed. The UE can be configured to detect the failure of each TCI state as follows.

In one example, one TCI state can be configured for one or more CORSET (or search space). For one configured TCI state j, the UE can be requested to calculate the ID of DL RS that is used for the purpose of spatial QCL. The DL RS can be SSB (SS block), CSI-RS (periodic, semi-persistent, or aperiodic). The UE can be requested to monitor the calculated DL RS to detect the beam failure of TCI state j. The UE can be requested to use the methods described in this disclosure to measure the calculate DL RS and the detect beam failure.

In another example, the UE can be configured with M TCI states $\{\alpha_1, \alpha_2, \ldots, \alpha_M\}$ for spatial QCL for UE-specific PDCCH. For one TCI state $\alpha_i$ in $\{\alpha_1, \alpha_2, \ldots, \alpha_M\}$, the UE can be configured with a index of DL RS and that DL RS resource can be configured to be associated with TCI state $\alpha_i$, and the UE can be requested to measure/monitor this DL RS resource to detect the beam failure of TCI state $\alpha_i$. Such association configuration can be signaled/configured through high layer signaling, MAC-CE and/or physical layer signaling (e.g., DCI).

In one embodiment, a UE can be configured to use one or more CSI-RS resource and/or NR-SS blocks to identify new beam candidate and the UE can recommend the identified new beam candidate to the TRP when beam failure is detected.

In one embodiment, the UE can be requested to measure the L1-RSRP or L1-RSRQ of transmission instances of each CSI-RS resource or NR-SS block in the configured CSI-RS resource/NR-SS blocks for new beam identification. The UE can assume one CSI-RS or NR-SS block as new beam candidate if one or more of the following conditions are met.

In one example, the mean or median L1-RSRP or L1-RSRQ of one CSI-RS resource transmission instances or NR-SS block transmission instances is above some configured threshold. In another example, the L1-RSRP or L1-RSRQ of all N consecutive transmission instances of one CSI-RS resource or NR-SS block (or within one time window duration) is above some configured threshold. In yet another example, the percentage of transmission instances of all N consecutive transmission instances of one CSI-RS resource or NR-SS block (or within one time window duration) whose L1-RSRP or L1-RSRQ being above some configured threshold is above some configured percentage threshold.

In one embodiment, the UE can be requested to measure the SINR or CQI of transmission instances of each CSI-RS resource or NR-SS block in the configured CSI-RS resource/ NR-SS blocks for new beam identification. The UE can assume one CSI-RS or NR-SS block as new beam candidate if one or more of the following conditions are met. In one example, the mean or median SINR or CQI of one CSI-RS resource transmission instances or NR-SS block transmission instances is above some configured threshold. In another example, the SINR or CQI of all N consecutive transmission instances of one CSI-RS resource or NR-SS block (or within one time window duration) is above some configured threshold. In yet another example, the percentage of transmission instances of all N consecutive transmission instances of one CSI-RS resource or NR-SS block (or within one time window duration) whose SINR or CQI being above some configured threshold is above some configured percentage threshold.

If more than one CSI-RS resources (or SSBs) are associated with the same dedicated UL channel resource as configuration to the UE, the UE can be requested to select the dedicated UL channel resource for beam recovery request transmission if one of the associated CSI-RS resources (or SSBs) meet the new beam identification condition. If more than one CSI-RS resources (or SSBs) are associated with the same dedicated UL channel resource as configuration to the UE, the UE can be requested to select that dedicated UL channel resource for beam recovery request transmission if the averaged RSRP/CQI/SINR of all the associated CSI-RS resources (or SSBs) meet the new beam identification condition. If more than one CSI-RS resources (or SSBs) are associated with the same dedicated UL channel resource as configuration to the UE, the UE can be requested to select that dedicated UL channel resource for beam recovery request transmission if the CSI-RS resource (SSB) with lowest (or highest) index among all associated CSI-RS resources (or SSBs) meets the new beam identification condition.

In one embodiment, the UE can be configured with both a set of CSI-RS resources and a set of SS blocks (SSB) to identify the new candidate beam for beam recovery request. One-bit field in high layer signaling can be used to indicate the UE that SS blocks are configured for new candidate beam identification. The UE can be requested to use the configuration of actually transmitted SSBs signaling by RMSI and/or RRC signaling.

If a first CSI-RS resource and a second SSB are associated with the same dedicated UL channel resource, the UE can choose that UL channel resource for beam recovery request transmission only if both a first CSI-RS resource and a second SSB can meet the new candidate beam selection condition. If a first CSI-RS resource and a second SSB are associated with the same dedicated UL channel resource, the UE can choose that UL channel resource for beam recovery request transmission only if the UE can identify both a first CSI-RS resource and a second SSB as a new beam. If a first CSI-RS resource and a second SSB are associated with third dedicated UL channel resource but a first CSI-RS resource is not QCLed with a second SSB as configured by the gNB, the UE can assume there is an error case and ignore the association between a first CSI-RS resource and a third UL channel resource but only assume the association between a second SSB and a third UL channel resource.

In one embodiment, in the configuration for beam failure recovery configuration, a CSI-RS resource index a and a SSB index b are included in Candidate-Beam-RS-List. A CSI-RS resource index is spatial QCLed with SSB index b. SSB index b is associated with a first PRACH resource in the configuration for beam failure recovery configuration. The UE can choose a first PRACH resource for beam failure recovery request transmission (i.e. link reconfiguration request transmission) if the L1-RSRP measured from SSB index b meets the new candidate beam identification condition or if the L1-RSRP of both SSB index b and CSI-RS a meet the new candidate beam identification.

In one embodiment, a UE can be configured with a CORESET that is dedicated for monitoring gNB's response to beam failure recovery request. In one method, the UE can be configured with a first CORESET and a second set of CORESETs. The UE can be requested to monitor the CORESETS in a second set of CORESET for normal downlink and uplink transmission. After the UE sends one beam failure recovery request, the UE can be requested to monitor a first CORESET for the response to beam failure recovery request. The response from NW to the beam failure recovery request can be implicit and/or explicit.

In one embodiment, the response from NW can be implicitly indicated by that a DCI (or control singling message) is correctly decoded by the UE in a first CORESET. The UE can be configured to claim that a response from NW for the beam failure recovery request is correctly received if a DCI is correctly decoded by the UE in a first CORESET.

In one embodiment of explicit scheme, one or more of the following can be considered as NW response to the beam failure recovery request. In one example, one special DCI type is considered to indicate the NW response to the beam failure recovery request. In another example, the DCI is scrambled by a special RNTI, e.g., BR-RNTI BFR-RNTI. That special RNTI can be configured UE-specifically or cell-specially or pre-configured. In yet another example, the value of one bit field in DCI is considered to indicate the NW response to the beam failure recovery request. In yet another example, the presence/absence of one bit field in DCI is considered to indicate the NW response to the beam failure recovery request. In yet another example, a dedicated NW response message is transmitted in PDSCH scheduled by the DCI sent in a first CORESET.

In one embodiment, when a new BPL (e.g., a Tx beam) is indicated in beam failure recovery request, the UE can be requested to monitor a first CORESET by assuming the DMRS in a first CORESET is spatial QCLed to the new BPL indicated in beam failure recovery request.

In one embodiment, after one UE sends one beam failure recovery request, the UE can begin to monitor a first CORESET that is dedicatedly configured for gNB response for beam failure recovery request. The UE can assume to stop monitoring a first CORESET after a valid DCI scrambled by this UE's C-RNTI is correctly received in a first CORESET.

In one embodiment, one gNB can signal one MAC-CE to indicate the UE to stop monitoring a first CORESET and after receiving that MAC-CE, the UE can assume to stop monitoring a first CORESET. In one example, one UE sends one beam failure recovery request at slot n. The UE can begin to monitor a first CORESET at slot n+offset. At slot m, the UE receives a MAC-CE or high layer signaling to indicate the UE to stop monitoring a first CORESET. Then the UE stops monitoring a first CORESET and the UE can resume monitoring a first CORESET after a new beam failure recovery request is sent.

In one embodiment, the UE can begin to monitor a first CORESET that is dedicated configured for gNB response to the beam failure recovery request. The UE can stop monitoring a first CORESET after the UE has received signaling from the gNB to configure the spatial QCL assumption for all the PDCCH which is included for beam failure recovery request. In one example, one UE is configured with K PDCCHs. The UE detects the beams of all K PDCCH are failed so the UE transmit a beam failure recovery request at slot n. The UE can begin to monitor a first CORESET at slot n+offset. At some slots after n+offset, the UE can receive the MAC-CE or high layer signaling to configure or indicate the spatial QCL reference for one or more of those K PDCCHs. After the UE receives the signaling to configure or indicate the spatial QCL reference for all those K PDCCHs, the UE can stop monitoring a first CORESET and the UE can assume monitoring a first CORESET after a new beam failure recovery request is sent.

In one embodiment, a UE can be configured with multiple BPL to monitor the PDCCH. In the beam failure recovery request, the UE can indicate the event of beam failure and the index of BPLs that were detected beam failure (for example, the UE can use a bitmap to indicate the beam failure of each BPL. Each bit in the bitmap corresponds to one configured BPL and the value of that bit being 1 (or 0) can indicate the corresponding BPL is detected beam failure). After sending the beam failure recovery request, the UE can monitor a first CORESET by assuming the DMRS in a first CORESET can be spatial QCLed to one of the unfailed BPLs. In one example, the UE can assume the DMRS in a first CORESET can be spatial QCLed to the BPL that is not failed and has the lowest index among all the unfailed BPLs. In one example, the UE can assume the DMRS in a first CORESET can be spatial QCLed to the BPL that is not failed and has the largest index among all the unfailed BPLs.

In one embodiment, the UE can be requested to monitor one or more of the configured CORESET that is configured to normal downlink and uplink transmission for NW response to the beam failure recovery request.

In one embodiment, the UE can be configured with one or more CORESET $\{c1, c2, \ldots, cL\}$ and with one single BPL for PDCCH. Then the UE may monitor all the configured CORESETs with the same configured BPL. If that BPL is detected beam failure, the UE can be requested to monitor one or more of configured CORESETs $\{c1, c2, \ldots, cL\}$ for NW response. The UE can assume the DMRS of monitored CORESETS chosen among $\{c1, c2, \ldots, cL\}$ is spatial QCLed to the new Tx beam indicated by beam failure recovery request.

In one embodiment, the UE can be requested to monitor all the configured CORESET $\{c1, c2, \ldots, cL\}$. In one example, the UE can be requested to monitor a subset of configured CORESETs $\{c1, c2, \ldots, cL\}$. In one example, the UE can be requested to monitor one particular from the configured CORESETs $\{c1, c2, \ldots, cL\}$.

In one embodiment, the UE can be configured with one or more CORESET $\{c1, c2, \ldots, cL\}$ and with multiple BPLs for PDCCH. Then the UE may monitor all the configured CORESETs with the same or different configured BPLs. If all the BPLs are detected beam failure, the UE can be requested to monitor one or more of configured CORESETs $\{c1, c2, \ldots, cL\}$ for NW response. The UE can assume the DMRS of monitored CORESETS chosen among $\{c1, c2, \ldots, cL\}$ is spatial QCLed to the new Tx beam indicated by beam failure recovery request.

In one example, the UE can be requested to monitor all the configured CORESET $\{c1, c2, \ldots, cL\}$. In one example, the UE can be requested to monitor a subset of configured CORESETs $\{c1, c2, \ldots, cL\}$. In one example, the UE can be requested to monitor one particular from the configured CORESETs $\{c1, c2, \ldots, cL\}$.

In one embodiment, the UE can be configured with one or more CORESET $\{c1, c2, \ldots, cL\}$ and with multiple BPLs for PDCCH. Then the UE may monitor all the configured CORESETs with the same or different configured BPLs. If not all the BPLs are detected beam failure but only a subset of configured BPLs are detected beam failure, the UE can be requested to monitor one or more of configured CORESETs $\{c1, c2, \ldots, cL\}$ for NW response. In one example, the UE can be requested to monitor those CORESETs whose corresponding configured BPL are not detected beam failure for NW response. The UE can assume that the DMRS of those CORESETs are still spatial QCLed to the corresponding configured BPL. In one example, the UE can be requested to monitor only one CORESET among the CORESETs whose corresponding configured BPL are not detected beam failure. In one example, the UE can be requested to monitor a subset of those CORESETs whose corresponding configured BPL are not detected beam failure.

In one embodiment, the UE can be requested to expect only fall back DCIs in the control resource configured through higher layer parameter Beam-failure-recovery-Response-CORESET. The fall back DCI can be UL DCI format 0_0 and DL DCI format 1_0.

In one embodiment, the UE can be configured to assume only particular DCI format(s) are transmitted in the control resource configured through higher layer parameter Beam-failure-recovery-Response-CORESET. In one example, the UE can be configured to assume only DCI format 0_0 and DCI format 1_0 are transmitted in control resource configured through higher layer parameter Beam-failure-recovery-Response-CORESET.

In one embodiment, once the UE receive gNB's response to one beam failure recovery request (i.e., the PRACH transmission for link reconfiguration request), the UE can be requested to monitor some of those old CORESETs or monitor only particular DCI format in those old CORESETs. The UE can be requested to assume such behavior on those old CORESET until (1) the TCI state used as QCL reference for those CORESET are re-configured and (2) control resource set(s) are re-configured. One or more of the following embodiments can be used for UE to monitor those old CORESETs after receiving gNB response.

In one embodiment, a UE can be configured with a few control resource sets {CORESET1, CORESET2, . . . } for monitoring PDCCH. When the UE detects beam failure on those control resource sets {CORESET1, CORESET2, . . . }, the UE can start the beam failure recovery procedure. After the UE receives valid a DCI formats with CRC scrambled by C-RNTI through monitoring PDCCH in the control resource configured by higher layer parameter Beam-failure-recovery-Response-CORESET, the UE can be requested to monitor DCI format 1_0 and 0_0 in the PDCCH in control resource sets {CORESET1, CORESET2, . . . }.

In another embodiment, a UE can be configured with a few control resource sets {CORESET1, CORESET2, ... } for monitoring PDCCH. When the UE detects beam failure on those control resource sets {CORESET1, CORESET2, ... }, the UE can start the beam failure recovery procedure. After the UE receives valid a DCI formats with CRC scrambled by C-RNTI through monitoring PDCCH in the control resource configured by higher layer parameter Beam-failure-recovery-Response-CORESET, the UE can be requested to only monitor PDCCH in one control sets of those old control resource sets {CORESET1, CORESET2, ... }. In one example, the UE can be requested to only monitor PDCCH in the control resource set with lowest CORESET-ID among those old control resource sets {CORESET1, CORESET2, ... }.

In yet another embodiment, a UE can be configured with a few control resource sets {CORESET1, CORESET2, ... } for monitoring PDCCH. When the UE detects beam failure on those control resource sets {CORESET1, CORESET2, ... }, the UE can start the beam failure recovery procedure. After the UE receives valid a DCI formats with CRC scrambled by C-RNTI through monitoring PDCCH in the control resource configured by higher layer parameter Beam-failure-recovery-Response-CORESET, the UE can be requested to only monitor PDCCH in one control sets of those old control resource sets {CORESET1, CORESET2, ... } and only monitor particular DCI format(s). In one example, the UE can be requested to only monitor PDCCH in the control resource set with lowest CORESET-ID among those old control resource sets {CORESET1, CORESET2, ... } and the UE can be requested to only DCI format 0_0 and DCI format 1_0 in that control resource set.

In some embodiments, a UE can be configured with two UL channels for beam recovery request transmission, a first UL channel and a second UL channel.

In one example, a first UL channel can be a UL channel without beam sweeping operation. An example of a first UL channel is NR-PUCCH channel. A second UL channel can be a UL channel that supports TRP Rx beam sweeping and/or UE Tx beam sweeping. An example of a second UL channel is NR-PRACH channel. The use case for a first UL channel is when the beam failure event is detected in DL connection and the UL connection can still support reliable PUCCH transmission. The use case for a second UL channel is when beam failure event is detected in DL connection and the TRP Rx beam/UE Rx beam for UL transmission are misaligned too.

In another example, a first UL channel can be a contention-free UL channel for beam recovery request transmission. A second UL channel can be a contention-based UL channel for beam recovery request transmission. In a contention-free UL channel, one UE can be configured with a dedicated resource, for example, one dedicated preamble sequence, and the UE can transmit the indicated preamble in one selected time-frequency resource for the beam recovery request. IN a contention-based UL channel, one UE can be configured with a subset of dedicated resources for beam recovery request, for example, a subset of preamble sequences and the UE can be requested to select one from that subset for beam recovery request transmission.

The UE is configured with a first transmit beam recovery request on a first UL channel when a beam failure trigger condition is met (e.g., through measuring beam failure detection RS, e.g., NR-SS block or CSI-RS for beam management). When the UE does not receive beam recovery response for the beam recovery request sent on a first UL channel, the UE can be configured to transmit beam recovery request on a second UL channel to report the same detected beam failure event.

Figure 14:
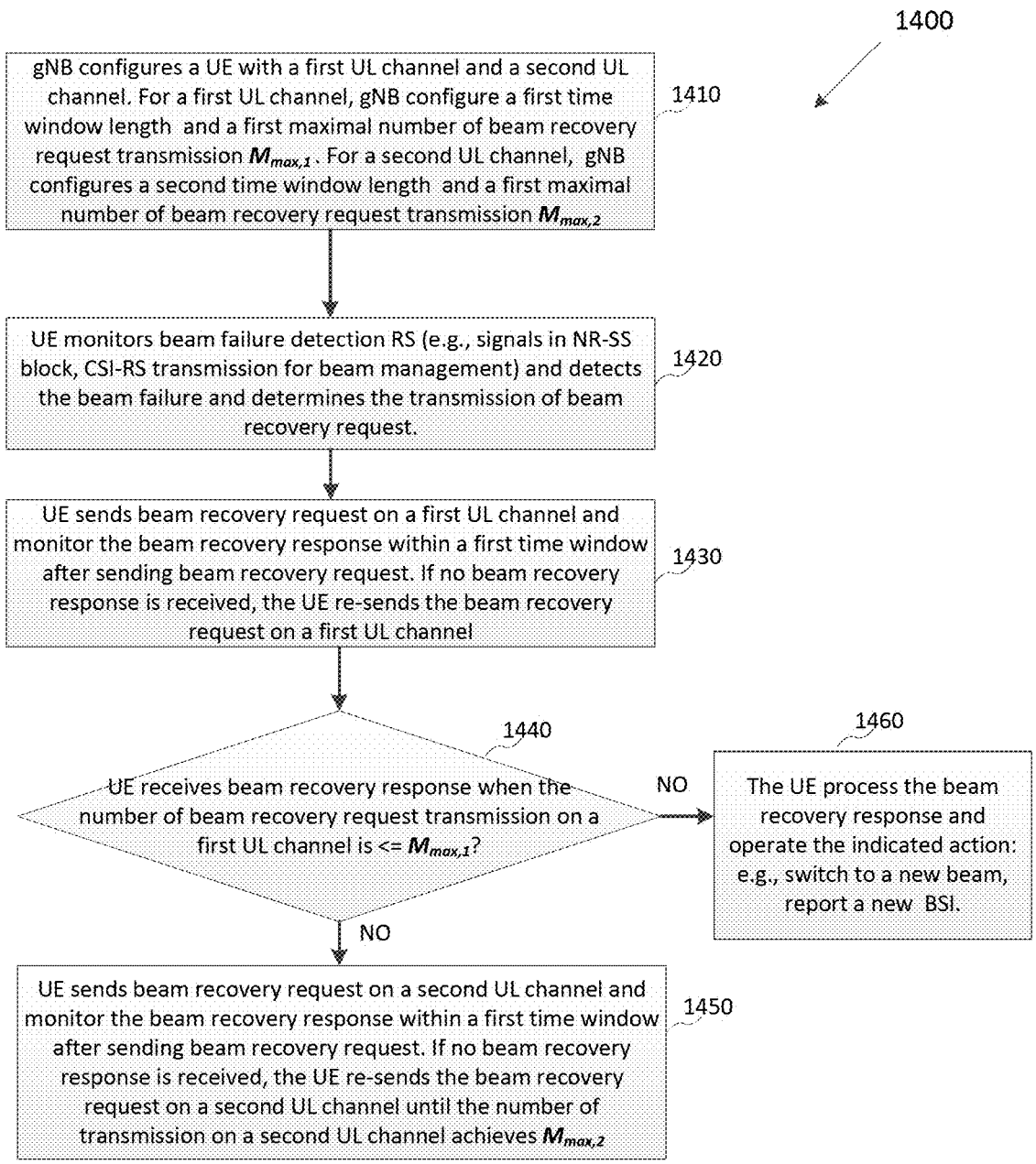
FIG. 14 illustrates a flow chart of a procedure for sending beam recovery request on a first UL channel and a second channel n example according to embodiments of the present disclosure.

FIG. 14 illustrates a flow chart of a procedure 1400 for sending beam recovery request on a first UL channel and a second channel n example according to embodiments of the present disclosure. The embodiment of the procedure 1400 illustrated in FIG. 14 is for illustration only. FIG. 14 does not limit the scope of this disclosure to any particular implementation A TRP configures by high layer a UE with a first UL channel and a second UL channel for beam recovery request transmission in step 1410. A TRP configures by high layer a UE with a first time window length and a first maximal number transmission number, $M_{max,1}$, for the beam recovery transmission on a first UL channel in step 1410. A TRP configures by high layer a UE with a second time window length and a second maximal number transmission number, $M_{max,2}$, for the beam recovery transmission on a first UL channel in step 1410. The UE can be requested to monitor beam failure detection RS to determine if the beam failure trigger condition is met.

The example for beam failure detection RS can be NR-SS signal in one or more NR-SS blocks, the NR-PBCH and DMRS in one or more NR-SS blocks, and the CSI-RS transmission for beam management. The UE detects beam failure event in step 1420. For the detected beam failure event, the UE first sends beam recovery request message in a first UL channel in step 1430 that is configured by the TRP in step 1410. After sending beam recovery request message in a first UL channel, the UE monitors beam recovery response from the NW during a first time window. If there is no beam recovery response, the UE can re-send the beam recovery request message in a first UL channel in step 1430.

When there is no beam recovery response when the number of beam recovery request transmission on a first UL channel achieves $M_{max,1}$ in step 1440, the UE sends beam recovery request on a second UL channel in step 1450. After sending beam recovery request, the UE monitors beam recovery response during a second time window. If no beam recovery response is received within a second time window after sending a beam recovery request on a second UL channel, the UE re-sends the beam recovery request on a second UL channel until the number of beam recovery request transmission on a second UL channel achieves $M_{max,2}$ or beam recovery response is received by the UE in step 1450.

When there is beam recovery response corresponding to the beam recovery request sent on first UL channel in step 1440, the UE can process the beam recovery response and operate the configured action in step 1460.

In some embodiments, when downlink beam failure is determined by a UE, there can be two different cases for TRP Rx beam and UE Tx beam used for UL transmission. One scenario can be the TRP Rx beam and UE Tx beam selected for UL transmission are still aligned. In that scenario, the beam recovery request can be received successfully by the TRP through a UL channel without beam sweeping operation. Another scenario can be the TRP Rx beam and UE Tx beam selected for UL transmission are misaligned too. In that scenario, the beam recovery request sent on a UL channel without beam sweeping operation could be lost with high probability due to the misaligned TRP Rx beam and UE Tx beam.

To ensure the reliability of beam recovery request in that scenario, the UE can be requested to transmit beam recovery request on a UL channel with beam sweeping operation.

When downlink beam failure is determine by a UE, the UE cannot know if the beams selected for UL transmission are still aligned or not. A UL channel with beam sweeping operation needs much more time resource than a UL channel without beam sweeping operation. The embodiments in the present disclosure provide a way to achieve better tradeoff between time resource overhead and beam recovery request transmission efficiency.

In one embodiment, a UE can be configured with a first UL channel and a second UL channel for beam recovery request transmission. A TRP configures by high layer a UE with a first time window length and a first timer, $T_{max,1}$, for the beam recovery transmission on a first UL channel. A TRP configures by high layer a UE with a second time window length and a second timer, $T_{max,2}$, for the beam recovery transmission on a first UL channel. The UE can be requested to monitor beam failure detection RS to determine if the beam failure trigger condition is met.

The example for beam failure detection RS can be NR-SS signal in one or more NR-SS blocks, the NR-PBCH and DMRS in one or more NR-SS blocks, and the CSI-RS transmission for beam management. The UE detects beam failure event. For the detected beam failure event, the UE first sends beam recovery request message in a first UL channel. After sending beam recovery request message in a first UL channel, the UE monitors beam recovery response from the NW during a first time window. If there is no beam recovery response, the UE can re-send the beam recovery request message in a first UL channel.

When there is no beam recovery response when the number of beam recovery request transmission on a first UL channel achieves $T_{max,1}$, the UE sends beam recovery request on a second UL channel. After sending beam recovery request, the UE monitors beam recovery response during a second time window. If no beam recovery response is received within a second time window after sending a beam recovery request on a second UL channel, the UE re-sends the beam recovery request on a second UL channel until the number of beam recovery request transmission on a second UL channel achieves $\tau_{max,2}$ or beam recovery response is received by the UE. When there is beam recovery response corresponding to the beam recovery request sent on the first UL channel, the UE can process the beam recovery response and operate the configured action.

In one embodiment, a TRP configures by high layer a UE with a first UL channel and a second UL channel for beam recovery request transmission. A TRP configures by high layer a UE with a first time window length and a first maximal number transmission number, $M_{max,1}$, and a first timer $T_{max,1}$ for the beam recovery transmission on a first UL channel. A TRP configures by high layer a UE with a second time window length and a second maximal number transmission number, $M_{max,2}$, and a second timer $T_{max,2}$ for the beam recovery transmission on a first UL channel. The UE can be requested to monitor beam failure detection RS to determine if the beam failure trigger condition is met. The example for beam failure detection RS can be NR-SS signal in one or more NR-SS blocks, the NR-PBCH and DMRS in one or more NR-SS blocks, and the CSI-RS transmission for beam management. The UE detects beam failure event.

For the detected beam failure event, the UE first sends beam recovery request message in a first UL channel. After sending beam recovery request message in a first UL channel, the UE monitors beam recovery response from the NW during a first time window. If there is no beam recovery response, the UE can re-send the beam recovery request message in a first UL channel. When there is no beam recovery response when the number of beam recovery request transmission on a first UL channel achieves $M_{max,1}$ or a first timer $T_{max,1}$ expires, the UE sends beam recovery request on a second UL channel.

After sending beam recovery request, the UE monitors beam recovery response during a second time window. If no beam recovery response is received within a second time window after sending a beam recovery request on a second UL channel, the UE re-sends the beam recovery request on a second UL channel until the number of beam recovery request transmission on a second UL channel achieves $M_{max,2}$ or a second timer $T_{max,2}$ expires or beam recovery response is received by the UE. When there is beam recovery response corresponding to the beam recovery request sent on the first UL channel, the UE can process the beam recovery response and operate the configured action.

In one embodiment, a first UL channel for beam recovery request transmission can be a periodic PUCCH channel. In one example, a special bit value, for example, all 1s (or all 0s) in the PUCCH payload bit, can be used to indicate that a beam failure event is detected. Other bit values can be used to indicate UL scheduling request, HARQ feedback, CSI report or beam state information report.

In one embodiment, a second UL channel for beam recovery request transmission can be the PRACH channel and a subset of preamble sequences is configured for beam recovery request through system information message or high layer signaling (e.g., RRC message). When a UE determines a beam failure event, the UE can select one preamble sequence from the subset of preamble sequence configured for beam recovery request. When the TRP detects preamble sequence for beam recovery request, the TRP sends a beam recovery response that can contain the one or more of the following information components.

In one example, the beam recovery response can contain the sequence ID of the detected preamble sequence for beam recovery request. In another example, the beam recovery response can contain a UL transmission scheduling information. In yet another example, the beam recovery response can contain information of a Tx beam that is going to be used for the control channel transmission to the UE who reports the detected preamble sequence. In such example, it can be a NR-SS block index. It can be a CSI-RS resource index or CSI-RS resource index/CSI-RS antenna port index. It can be an Rx beam set ID. In yet another example, the beam recovery response can contain triggering the transmission of CSI-RS transmission for beam management. In such example, the CSI-RS transmission can be aperiodic transmission with sub-time in a CSI-RS resource to allow the UE to refine Rx beams. The CSI-RS transmission can be aperiodic transmission to allow the UE to refine TRP Tx beams. The CSI-RS transmission can be semi-persistent transmission.

A UE can be configured with two UL channels for beam failure recovery request transmission, i.e., a first UL channel and a second UL channel. In one method, when the beam failure recovery request is triggered, the UE can be request to transmit the beam failure recovery request on the earliest available UL channel instance, no matter it is a first UL channel or a second UL channel. In one method, the UE can be configured to transmit on both UL channels and then wait for the beam recovery request response for each of the beam recovery request transmission on both UL channels. Once the UE receives the beam recovery request response from the TRP for one beam recovery request transmission on one of the UL channels the UE can abort monitoring the response corresponding to the other UL channel.

In one embodiment, the UL channel for transmitting beam failure recovery request has multiple time-frequency resource unit. Each time-frequency resource unit is associated with one SS-block or one CSI-RS resource or one set of CSI-RS antenna ports of CSI-RS resource. A UE can be configured with one sequence. The UE can be requested to transmit the UE's configured sequence on one time-frequency resource unit in the UL channel for transmitting beam failure recovery request. After transmitting the configured sequence, the UE can be requested to monitor the downlink PDCCH by assuming the DMRS in PDCCH is spatial QCLed with the SS-block, CSI-RS resource or CSI-RS antenna ports associated with that time-frequency resource unit where the UE transmit the configured sequence.

In one embodiment, a set of sequences associated with SS-blocks, CSI-RS resources or sets of CSI-RS antenna ports can be configured to a UE. Each sequence in that set is associated with one SS-block, one CSI-RS resource or one set of CSI-RS antenna ports. The UE can be requested to send one of those sequences on the UL channel for beam failure recovery request. After sending the sequence, the UE can be requested to monitor downlink PDCCH by assuming the DMRS in PDCCH is spatial QCLed with the SS block, CSI-RS resource or CSI-RS antenna ports associated with the sequence that the UE transmitted.

In one embodiment, a UE can be requested to transmit some beam recovery request message on PUCCH channel when only a subset of but not all of the configured BPLs for PDCCH is detected beam failure.

In one embodiment, a UE can send a flag information in PUCCH to indicate the TRP that a subset of configured BPLs for PDCCH has been detected as beam failure. After sending the flag information, the UE can assume to monitor the downlink PDCCH for uplink scheduling and then the UE can report the index or indices of PDCCH BPLs that have been detected beam failure to the TRP. In one example, the UE can report which of those configured BPLs are detected beam failure in MAC-CE signaling. In one example the UE can report on bitmap and each bit in the bitmap corresponds to one of the configured BPL for PUCCH. The value of one bit in the bit map indicates whether beam failure is detected for the corresponding BPL or not. In one example, the value of one bit being 1 can indicate that beam failure is detected for the BPL corresponding to that bit. After reporting the failed BPL, the UE can assume to stop monitoring the failed BPL for PDCCH.

In one embodiment, a UE can send flag information and the index information of BPLs that are detected beam failure in PUCCH. In one example, the UE can report one bitmap and each bit in the bitmap corresponds to one of the configured BPL for PUCCH. The value of one bit in the bit map indicates whether beam failure is detected for the corresponding BPL or not. In one example, the value of one bit being 1 can indicate that beam failure is detected for the BPL corresponding to that bit.

In some embodiments, the UE can be configured to indicate one of the followings is transmitted in one reporting instance and also transmit the indicated reporting case. In one example, a normal beam reporting is transmitted. In such example, the UE can report one or more beam ID (for example, SSB Index or index of CSI-RS resource) and the associated L1-RSRP and differential L1-RSRP measurement of reported SSB index or CSI-RS resource index.

In another example, a reporting the failure of a subset of PDCCH beams is transmitted. In such example, the UE can report one bitmap and each bit in the bitmap corresponds to one of the configured Tx beam for PDCCH. The value of one bit can indicate whether the corresponding beam is failed or not. In one instance, each bit in the bitmap can be associated with one TCI state configured to PDCCH for one UE for the spatial QCL configuration. In one instance, 4 TCI states {M1, M2, M3, M4} are configured for one UE for the spatial QCL configuration for UE to receive the PDCCH. A 4-bit bitmap {b0, b1, b2, b3} can be used to indicate the failure status of beam link of the DL RS associated with TCI states {M1, M2, M3, M4}. The UE can assume the bit b0 is used to indicate for TCI state with lowest TCI index among {M1, M2, M3, M4} and can assume bit b1 is used to indicate for TCI state with the second lowest TCI index among {M1, M2, M3, M4}, and can assume bit b2 is used to indicate for TCI state with the third lowest TCI index among {M1, M2, M3, M4} can assume bit b3 is used to indicate for TCI state with the largest TCI index among {M1, M2, M3, M4}. In another instance, the UE can also report one or more newly identified beams and/or their associated L1-RSRP measurement. In yet another instance, the UE can also report one or more selected Tx beam IDs and/or their associated L1-RSRP measurement. In yet another instance, for periodic beam reporting, if the UE is configured to select and report N Tx beams and their L1-RSRP measurement. In this instance, the UE can be requested to report N−1 Tx beams and their associated L1-RSRP.

In one embodiment, the beam failure recovery request is transmitted. The UE can report the index of one Tx beam (for example, one SSB index or CSI-RS resource index) and/or the associated L1-RSRP measurement. In such embodiment, if the UE is configured to select/report N Tx beams and their L1-RSRP measurement. In this mode, the UE can also be requested to report N−1 Tx beams and their associated L1-RSRP.

In one embodiment, a combination of normal beam reporting and reporting the failure of a subset of PDCCH beams is transmitted. When the trigger condition for reporting failure of a subset of PDCCH beam is met, the UE can be requested to report the information of those failed PDCCH beams and N-L Tx beams selected according to the configuration of normal beam measurement and reporting, where L can be 1, 2, . . . , N, where N is the number of Tx beams the UE is configured to report in one beam reporting instance.

In one embodiment, a combination of normal beam reporting and the beam failure recovery request are transmitted. When the trigger condition for reporting beam failure recovery request is met, the UE can be requested to report the beam failure recovery request message and N-L Tx beams selected according to the configuration of normal beam measurement and reporting, where L can be 1, 2, . . . , N, where N is the number of Tx beams the UE is configured to report in one beam reporting instance. The beam failure recovery request can include one or more of the following: (1) one flag to indicate that is a beam failure recovery request; (2) the index of one CSI-RS resource or SSB as the newly identified beam that will be used by the NW to transmit response to that beam failure recovery request; and (3) The L1-RSRP (or RSRQ, or SINR) associated with the reported CSI-RS or SSB index.

In one embodiment, a UE is requested to report the CRIs/SSBIs and the L1-RSRP and differential L1-RSRP of reported CRIs/SSBIs in periodic CSI reporting. When the Tx beam(s) of a subset of downlink control channels are declared failure, the UE can do one of the following.

In one example, the UE can report a special value of one L1-RSRP or differential L1-RSRP to indicate the reported CRI/SSBI corresponding to that L1-RSRP or differential L1-RSRP is a failed beam. Some example of the special value can be all 1s or all 0s.

In another example, the UE can be report a special value of one L1-RSRP or differential L1-RSRP to indicate the reported CRI/SSBI corresponding to that L1-RSRP or differential L1-RSRP is used to report the beam failure state of downlink control channel. In this case, the bits of that CRI/SSBI can be used indicate which ones of the CORESETs has failed beam. In one example, the bits of that CRI/SSBI can be used as a bitmap to indicate which ones of the CORESETs of that UE has failed beam. In one example, 6 bits $\{b_1 b_2 b_3 b_4 b_5 b_6\}$ are used for CRI/SSBI and each bit in $b_1 b_2 b_3 b_4 b_5 b_6$ can be used to indicate the beam failure status of one CORESET configured to that UE. The value of each bit being 1 can indicate the associated CORESET has beam failure and the value of each bit being 0 can indicate the associated CORESET has no beam failure. Bit $b_1$ can be associated with the CORESET with lowest CORESET-ID among the CORESETs configured to that UE. Bit $b_2$ can be associated with the CORESET with second lowest CORESET-ID among the CORESETs configured to that UE. Bit $b_3$ can be associated with the CORESET with third lowest CORESET-ID among the CORESETs configured to that UE, so on so forth.

In one embodiment, the UE reports 2-bit in one reporting instance to indicate the type of reporting content in one reporting instance. In one example, the value of 2-bit being 00 can indicate the reporting content in one reporting instance is normal beam reporting as described above; the value of 2-bit being 01 can indicate the reporting content in one reporting instance is reporting the failure of a subset of PDCCH beams. The UE can be requested to report up to B bits payload, $\{b_0, b_1, \ldots, b_{B-1}\}$, in one beam reporting instance.

The UE can be requested to use first two bits $b_0, b_1$ to indicate which content is reported in this beam reporting instance through the rest of bits in up to B bits payload. In one example, if the UE reports normal beam reporting, the UE can set the value of $b_0, b_1$ to be 00 and uses some or all of the rest bits to report one or more SSB indices or indices of CSI-RS resources and their associated L1-RSRP and differential L1-RSRP; If the UE reports the failure of a subset of PDCCH beams, the UE can set the value of $b_0, b_1$ to be 01 and then uses bits $b_2, b_3, \ldots, b_{Q+1}$ as bitmap to indicate the failure status of each PDCCH beam of Q configured PDCCH beams; If the UE reports the beam failure recovery request, the UE can set the value of $b_0, b_1$ to 10 and then some bits in $\{b_2, b_3, \ldots, b_{B-1}\}$ to report one index of selected SSB or CSI-RS resource and/or the UE's associated L1-RSRP measurement.

In one embodiment, the UE can reports 1-bit in one reporting instance to indicate the type of reporting content in one reporting instance. In one example, the value of 1-bit being 0 can indicate the reporting content in one reporting instance is normal beam reporting as described above; the value of 1-bit being 1 can indicate the reporting content in one reporting instance is beam failure request and the UE can report one selected SSB index or index of CSI-RS resource and/or the UE's associated L1-RSRP measurement.

The UE can be requested to report up to B bits payload, $\{b_0, b_1, \ldots, b_{B-1}\}$, in one beam reporting instance. The UE can be requested to use first one bit $b_0$ to indicate which content is reported in this beam reporting instance through the rest of bits in up to B bits payload. In one example, if the UE reports normal beam reporting, the UE can set the value of $b_0$ to be 0 and uses some or all of the rest bits to report one or more SSB indices or indices of CSI-RS resources and their associated L1-RSRP and differential L1-RSRP; If the UE reports the beam failure recovery request, the UE can set the value of $b_0$ to 1 and then some bits in $\{b_1, b_2, \ldots, b_{B-1}\}$ to report one index of selected SSB or CSI-RS resource and/or the UE's associated L1-RSRP measurement.

In one embodiment, the UE can dynamically determine the reporting content selection based on the number of configured PDCCH beams. If only one Tx beam is configured for the UE to monitor for the failure of PDCCH, the UE can determine that the UE reports normal beam reporting or beam failure recovery request. Then only 1 bit in the reporting content can be used to indicate which content is contained in one beam reporting instance. If more than one Tx beams are configured for the UE to monitor for the failure of PDCCH, the UE can determine that the UE can report normal beam reporting, failure of a subset of PDCCH beams or beam failure recovery request; then two bits in the reporting content can be used to indicate which content is contained in one beam reporting instance.

In one embodiment, the UE can be requested to apply different scramble sequences on the reporting bits $\{b_0, b_1, \ldots, b_{B-1}\}$ for different reporting contents. In one example, the UE can be requested to a first scramble sequence on the reporting bits $\{b_0, b_1, \ldots, b_{B-1}\}$ if the UE reports normal beam reporting in one reporting instance. In one example, the UE can be requested to a second scramble sequence on the reporting bits $\{b_0, b_1, \ldots, b_{B-1}\}$ if the UE reports the failure of a subset of PDCCH beams in one reporting instance. In one example, the UE can be requested to a third scramble sequence on the reporting bits $\{b_0, b_1, \ldots, b_{B-1}\}$ if the UE reports beam failure recovery request in one reporting instance.

In some embodiments, if the UE is configured with both SSB and CSI-RS for new beam identification, the UE can be requested to only report one CSI-RS resource index as the new beam when reporting beam failure recovery request in PUCCH channel.

In some embodiments, if the UE is configured with both SSB and CSI-RS for new beam identification, the UE can be requested to add one bit appended to the SSB index bits or CSI-RS resource index bits to indicate whether one reported index is SSB index or CSI-RS resource index. The value of that one bit can be used to indicate the type of RS of that the reported DL RS resource in beam failure request sent in PUCCH.

In some embodiments, after the UE sends beam failure request in one beam reporting instance in PUCCH, the UE can be requested to monitor CORESET that is dedicatedly configured for monitoring beam recovery request response.

In some embodiments, a UE can be configured with one preamble sequence and/or a set of preamble sequence for the transmission of beam recovery request. The UE can be requested to calculate the scheme to receive the beam recovery response according to the configuration of preamble sequence.

In one embodiment, a UE can be configured with one preamble sequence. The UE can be requested to send the configured preamble sequence on some selected time-frequency resource when beam failure is detected the trigger condition for beam recovery request is satisfied. After sending the preamble sequence, the UE can be requested to monitor the PDCCH by assuming the Tx beam corresponding to the CSI-RS resource or SS-block associated with the selected time-frequency resource is used to transmit the PDCCH by the TRP and by assuming that the PDCCH can be scrambled by the UE ID.

In one embodiment, a UE can be configured with a set of preamble sequences. The UE can be requested to select one from the configured preamble sequences and send the selected preamble sequence on some selected time-frequency resource when beam failure is detected the trigger condition for beam recovery request is satisfied. After sending the preamble sequence, the UE can be requested to monitor the PDCCH by assuming the Tx beam corresponding to the CSI-RS resource or SS-block associated with the selected time-frequency resource is used to transmit the PDCCH by the TRP and by assuming that the PDCCH can be scrambled by the UE ID. After receiving the beam response, the UE can be requested to report the UE ID in the uplink transmission that is scheduled by beam recovery response.

In one embodiment, a UE can be configured with one preamble sequence a and a set of preamble sequences. The UE can be requested to send the configured preamble sequence a on some selected time-frequency resource when beam failure is detected the trigger condition for beam recovery request is satisfied. After sending the preamble sequence, the UE can be requested to monitor the PDCCH by assuming the Tx beam corresponding to the CSI-RS resource or SS-block associated with the selected time-frequency resource is used to transmit the PDCCH by the TRP and by assuming that the PDCCH can be scrambled by the UE ID.

If the UE does not receive response within a configured timer, the UE can re-send preamble sequence a on some selected time-frequency resource. If the number of transmitting preamble sequence a without successful response achieves some configured threshold or a timer for trying sending preamble sequence a expires, the UE can be requested to use the configured set of preamble sequences for beam recovery request transmission. The UE can be requested to select one from the configured preamble sequences and send the selected preamble sequence on some selected time-frequency resource when beam failure is detected the trigger condition for beam recovery request is satisfied.

After sending the preamble sequence, the UE can be requested to monitor the PDCCH by assuming the Tx beam corresponding to the CSI-RS resource or SS-block associated with the selected time-frequency resource is used to transmit the PDCCH by the TRP and by assuming that the PDCCH can be scrambled by the UE ID. After receiving the beam response, the UE can be requested to report the UE ID in the uplink transmission that is scheduled by beam recovery response.

The present disclosure relates generally to wireless communication systems and, more specifically, to vehicular communication network protocols, including vehicle-to-device, vehicle-to-vehicle, and vehicle-to-network communication resource allocation and synchronization methods. A communication system includes a downlink (DL) that conveys signals from transmission points such as base stations (BSs) or NodeBs to user equipments (UEs) and an uplink (UL) that conveys signals from UEs to reception points such as NodeBs. Additionally a sidelink (SL) may convey signals from UEs to other UEs or other non-infrastructure based nodes. A UE, also commonly referred to as a terminal or a mobile station, may be fixed or mobile and may be a cellular phone, a personal computer device, etc. A NodeB, which is generally a fixed station, may also be referred to as an access point or other equivalent terminology such as eNodeB. The access network including the NodeB as related to 3GPP LTE is called as Evolved Universal Terrestrial Access Network (E-UTRAN).

In a communication system, DL signals can include data signals conveying information content, control signals conveying DL control information (DCI), and reference signals (RS) that are also known as pilot signals. A NodeB transmits data information through a physical DL shared channel (PDSCH). A NodeB transmits DCI through a physical DL control channel (PDCCH) or an enhanced PDCCH (EPDCCH).

Messages are transmitted on the PDCCH using a cell radio network temporary identifier (C-RNTI) to identify the intended UE. The C-RNTI is the RNTI to be used by a given UE while the UE is in a particular cell after the UE and a NodeB establish an RRC connection. A NodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements.

To reduce CRS overhead, a NodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a sub-frame (SF) and can have, for example, duration of 1 millisecond. A number of ten SFs is referred to as a frame and is identified by a system frame number (SFN).

Traditionally, cellular communication networks have been designed to establish wireless communication links between mobile devices (UEs) and fixed communication infrastructure components (such as base stations or access points) that serve UEs in a wide or local geographic range. However, a wireless network can also be implemented by utilizing only device-to-device (D2D) communication links without the need for fixed infrastructure components. This type of network is typically referred to as an "ad-hoc" network.

A hybrid communication network can support devices that connect both to fixed infrastructure components and to other D2D-enabled devices. While UEs such as smartphones can be envisioned for D2D networks, vehicular communication can also be supported by a communication protocol where vehicles exchange control or data information with other vehicles or other infrastructure or UEs. Such a network is referred to as a V2X network. Multiple types of communication links can be supported by nodes supporting V2X in the network and can utilize same or different protocols and systems.

Figure 15:
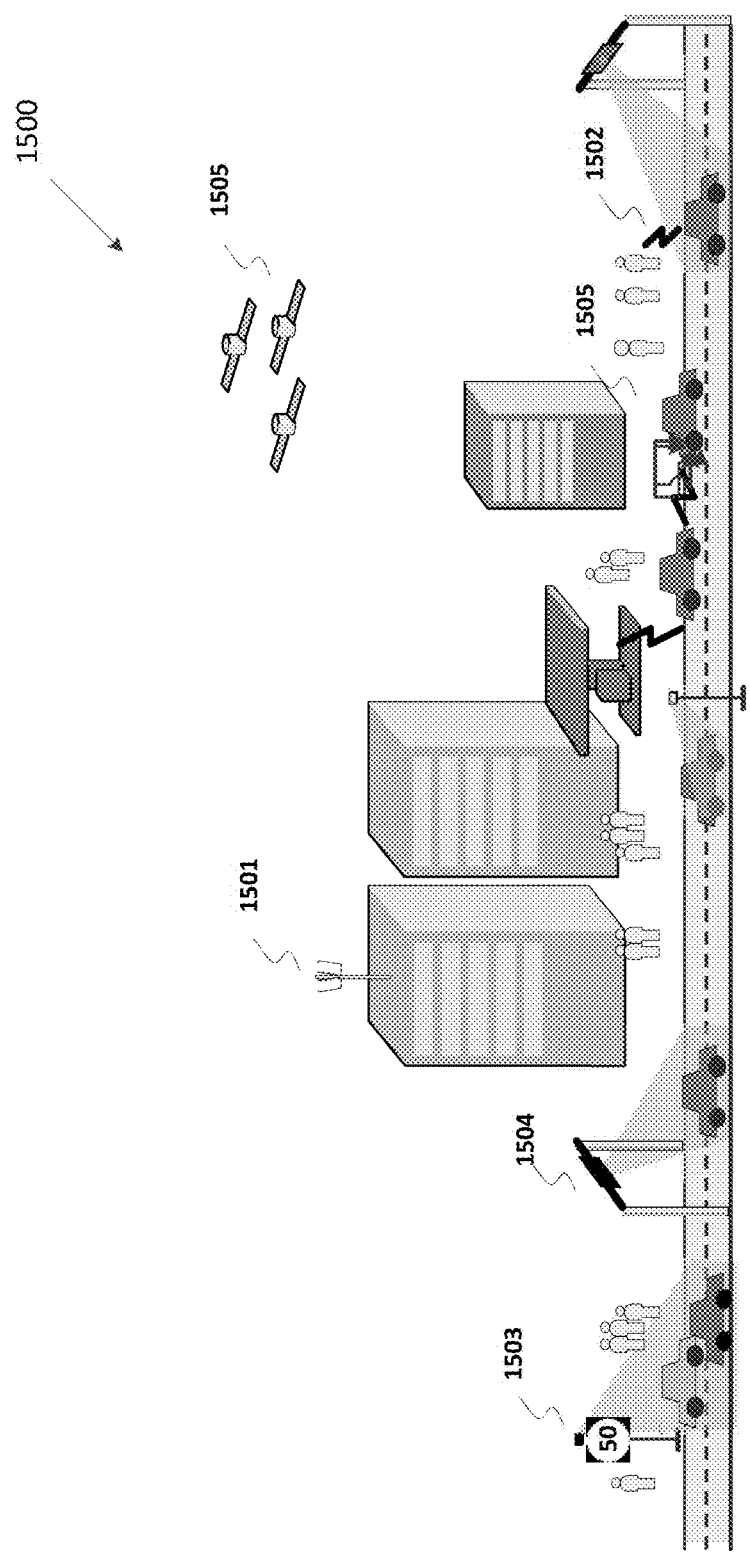
FIG. 15 illustrates an example use case of a vehicle-centric communication network according to embodiments of the present disclosure.

FIG. 15 illustrates an example use case of a vehicle-centric communication network 1500 according to embodiments of the present disclosure. The embodiment of the use case of a vehicle-centric communication network 1500 illustrated in FIG. 15 is for illustration only. FIG. 15 does not limit the scope of this disclosure to any particular implementation.

The vehicular communication, referred to as Vehicle-to-Everything (V2X), contains the following three different types: vehicle-to-vehicle (V2V) communications; vehicle-to-infrastructure (V2I) communications; and vehicle-to-pedestrian (V2P) communications.

These three types of V2X can use "co-operative awareness" to provide more intelligent services for end-users. This means that transport entities, such as vehicles, roadside infrastructure, and pedestrians, can collect knowledge of their local environment (e.g., information received from other vehicles or sensor equipment in proximity) to process and share that knowledge in order to provide more intelligent services, such as cooperative collision warning or autonomous driving.

A V2X communication can be used to implement several types of services that are complementary to a primary communication network or to provide new services based on a flexibility of a network topology. V2X can support unicasting, broadcasting, or group/multicasting as potential means for V2V communication 100 where vehicles are able to transmit messages to all in-range V2V-enabled devices or to a subset of devices that are members of particular group. The protocol can be based on LTE-D2D or on a specialized LTE-V2V protocol.

V2X can support V2I communication 1501 between one or more vehicles and an infrastructure node to provide cellular connectivity as well as specialized services related to control and safety of vehicular traffic. V2P communication 1502 can also be supported, for example to provide safety services for pedestrians or traffic management services. V2X multicast communication 1503 can be used to provide safety and control messages to large numbers of vehicles in a spectrally efficient manner.

The two primary standardized messages for V2V/V2I communication are the periodic beacons called cooperative awareness messages (CAM) and the event-triggered warning messages, called decentralized environment notification messages (DENM). The CAMs are periodically broadcasted beacons used to maintain awareness of the surrounding vehicles. These messages are sent with an adaptive frequency of 1-10 Hz. The CAMs include information such as position, type and direction. The DENMs are event-triggered warning messages which are generated to alert neighboring vehicles about potential hazards.

While vehicle devices can be able to support many different communication protocols and include support of mandatory or optional features, since the traffic types, QoS requirements, and deployment topologies are distinct from other types of communications, the hardware/software on a vehicle for supporting V2X can have a reduced or specialized functionality compared to other devices. For example, protocols related to low-complexity, low-data rate, and/or low-latency for machine-type communications 1504 can be supported such as, for example, traffic tracking beacons. Satellite-based communication 1505 can also be supported for V2X networks for communication or positioning services.

A direct communication between vehicles in V2V is based on a sidelink (SL) interface. Sidelink is the UE to UE interface for SL communication and SL discovery. The SL corresponds to the PC5 interface as defined in REF 6. SL communication is defined as a functionality enabling proximity services (ProSe) Direct Communication as defined in LTE specification between two or more nearby UEs using E-UTRA technology but not traversing any network node.

E-UTRAN allows such UEs that are in proximity of each other to exchange V2V-related information using E-UTRA (N) when permission, authorization and proximity criteria are fulfilled. The proximity criteria can be configured by the MNO. However, UEs supporting V2V Service can exchange such information when served by or not served by E-UTRAN which supports V2X Service. The UE supporting V2V applications transmits application layer information (e.g. about the UE's location, dynamics, and attributes as part of the V2V Service). The V2V payload must be flexible in order to accommodate different information contents, and the information can be transmitted periodically according to a configuration provided by the MNO.

V2V is predominantly broadcast-based; V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

Figure 16:
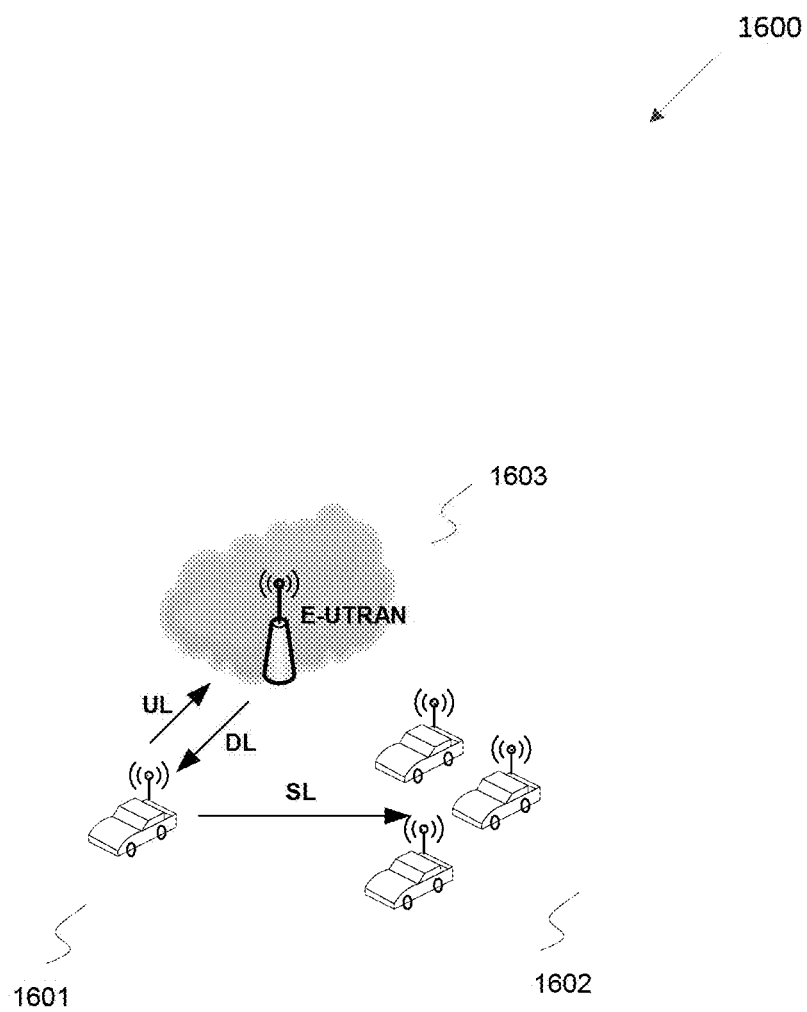
FIG. 16 illustrates an example SL interface according to embodiments of the present disclosure.

FIG. 16 illustrates an example SL interface 1600 according to embodiments of the present disclosure. The embodiment of the SL interface 1600 illustrated in FIG. 16 is for illustration only. FIG. 16 does not limit the scope of this disclosure to any particular implementation As shown in FIG. 16, FIG. 16 illustrates an example SL interface according to illustrative embodiments of the present disclosure. While UL designates the link from UE 1601 to NodeB 1603 and DL designates the reverse direction, SL designates the radio links over the PC5 interfaces between UE 1601 and UEs 1602. The UE 1601 transmits a V2V message to multiple UEs 1602 in the SL. SL communication happens directly without using E-UTRAN technology and not traversing any network node NodeB 1603. The PC5 interface re-uses existing frequency allocation, regardless of the duplex mode (frequency division duplex (FDD) or time division duplex (TDD)).

To minimize hardware impact on a UE and especially on the power amplifier of the UE, transmission of V2V links occurs in the UL band in case of FDD. Similar, the PC5 interface uses SFs that are reserved for UL transmission in TDD. The signal transmission is based on single carrier frequency division multiple access (SC-FDMA) that is also used for UL transmission. The new channels can be largely based on the channel structure applicable for the transmission of the physical UL shared channel (PUSCH).

An SL transmission and reception occurs with resources assigned to a group of devices. A resource pool (RP) is a set of resources assigned for sidelink operation. It consists of the subframes and the resource blocks within the subframe. For SL communication, two additional physical channels are introduced: physical sidelink control channel (PSCCH) carrying the control information, and physical sidelink shared channel (PSSCH) carrying the data.

Figure 17:
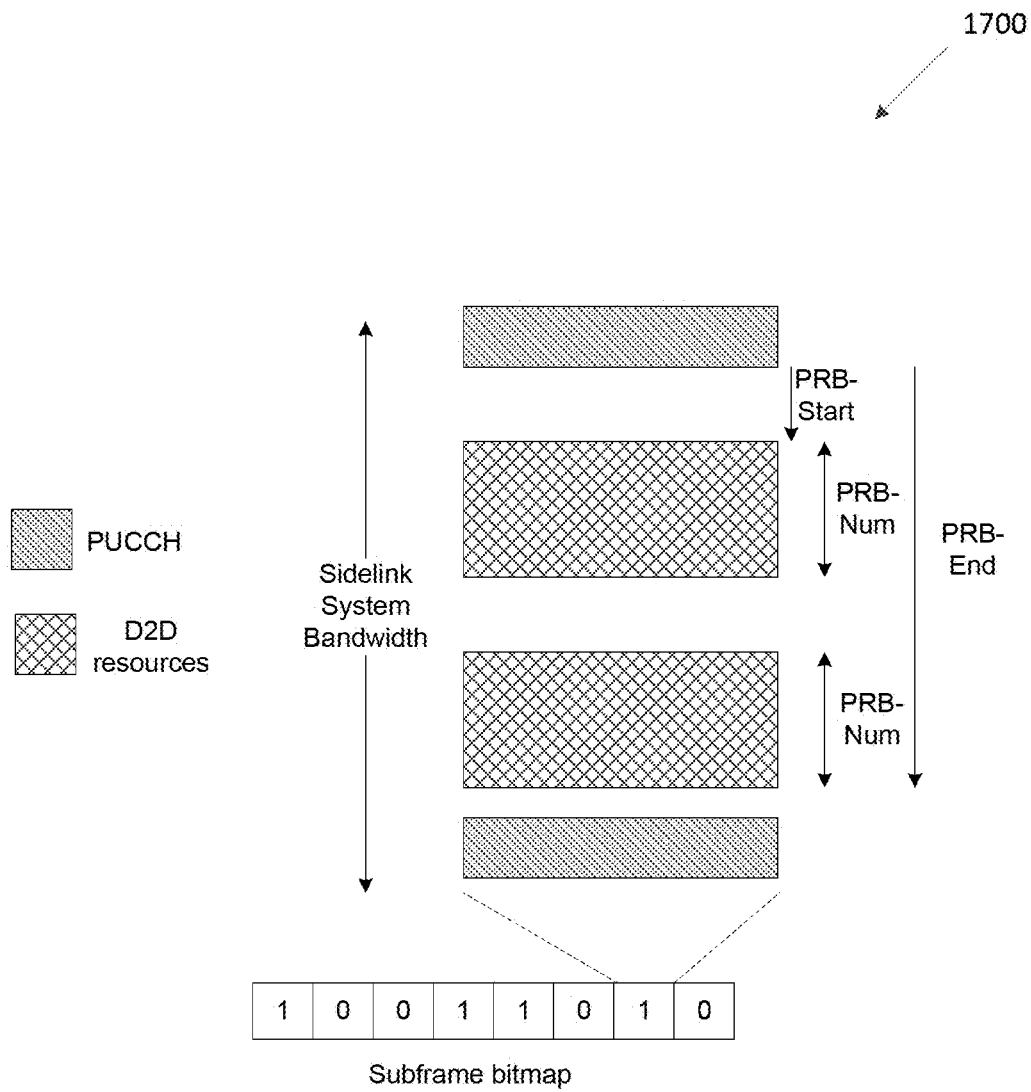
FIG. 17 illustrates an example resource pool for PSCCH according to embodiments of the present disclosure.

FIG. 17 illustrates an example resource pool for PSCCH 1700 according to embodiments of the present disclosure. The embodiment of the resource pool for PSCCH 1700 illustrated in FIG. 17 is for illustration only. FIG. 17 does not limit the scope of this disclosure to any particular implementation FIG. 17 illustrates an example resource pool for PSCCH according to illustrative embodiments of the present disclosure. In one example, the pool is defined in frequency (by parameter), for example, PRBnum that defines the frequency range in physical resource block (PRB) bandwidth units; and PRBstart and PRBend define the location in the frequency domain within the uplink band. In another example, the pool is defined in the time domain (by a bitmap) that indicates the 1 msec sub-frames used for PSCCH transmission.

This block of resources is repeated with a period defined by a parameter SC-Period (expressed in sub-frame duration, i.e. 1 msec). The range of possible values for SC-Period is from 40 msec to 320 msec: low values are supported for voice transmission.

All the parameters needed to define the resource pool are broadcasted in a system information block (SIB) by the network. The devices which are not within coverage (and hence cannot acquire the SIB) may use some pre-configured values internally stored. The PSCCH is used by the V2X transmitting UE to make the members of the V2X transmitting UE's group aware of the next data transmission that may occur on the PSSCH. The V2X transmitting UE sends the sidelink control information (SCI) format 1 on the PSCCH as shown in TABLE 1.

TABLE 1

The sidelink control information

| Parameter | Usage and Notes |
| --- | --- |
| Priority | 3 bits |
| Resource reservation | 4 bits |
| Frequency resource location of initial transmission and retransmission | give the receiving devices information about the resources of the PSSCH that may be decoded in the frequency domain |
| Time gap between initial transmission and retransmission | 4 bits |
| Modulation and coding scheme | 5 bits |
| Retransmission index | 1 bit to indicate first or second transmission |
| Reserved information bits | To make the size of SCI format 1 to be 32 bits |

Devices interested in receiving V2X services blindly scan the whole PSCCH pool to search if a SCI format matching their group identifier can be detected. On the transmitting device side, resources to transmit the SCI format information may be selected within the PSCCH pool.

There are two types of resource pools: reception resource pools (Rx RPs) and transmission resource pools (Tx RPs). These are either signaled by the NodeB for in-coverage case or a pre-configured value is used for the out-of-coverage case. Within a cell, there may be more Rx RPs than Tx RPs to enable reception from adjacent cells or from out-of-coverage UEs. Two modes of resource allocation have been defined for SL communication: mode 3 (e.g., scheduled resource allocation) and mode 4 (UE autonomous resource selection).

In mode 3, transmission of V2X on sidelink is scheduled by NodeB. The UE receives DCI format 5A from the NodeB a and then sends SCI format over the resources indicated by DCI format 5A that is illustrated in TABLE 2. Access to the sidelink resources is driven by the NodeB. The UE needs to be connected to transmit data.

TABLE 2

SCI format

| Parameter | Usage and Notes |
| --- | --- |
| Carrier indicator | Carrier indicator to support cross carrier scheduling |
| Lowest index of the subchannel allocation to the initial transmission | The resource allocation for PSCCH on V2X sidelink |
| SCI format 1 fields | The resource allocation for PSCH |
| SL index | 2 bits |
| SL SPS configuration index | 3 bits Configure the SPS transmission on sidelink |
| Activation/release indication | 1 bits to activate or release the SPS transmission on sidelink |

In the present disclosure, schemes of transmit diversity transmission for V2V/V2X are proposed. Specially, the methods of transmission schemes, DMRS design and SCI/DCI format design are provided in the present disclosure.

In one embodiment, the UE can be configured to detect DMRS with two antenna ports. This design is useful to the V2V/V2X UE to support transmit diversity with two antenna ports, for example SFBC, STBC and large delay CDD. In addition to support two antenna ports, the design of new DMRS may enable the rel14 to measure the PSSCH-RSRP based on the one of the antenna port in the newly designed DMRS.

In one embodiment, the DMRS of those two antenna ports for PSSCH $P_0$, $P_1$ are mapped to different DMRS OFDM symbols. In one method, the DMRS of antenna port $P_0$ are mapped to OFDM symbols 2 and 8 (1810 and 1812) and the DMRS of antenna port $P_1$ are mapped to OFDM symbols 5 and 11 (1811 and 1813). In one method, the DMRS of antenna port $P_0$ are mapped to OFDM symbols 2 and 5 (1810 and 1811) and the DMRS of antenna port $P_1$ are mapped to OFDM symbols 8 and 11 (1812 and 1813).

Figure 18:
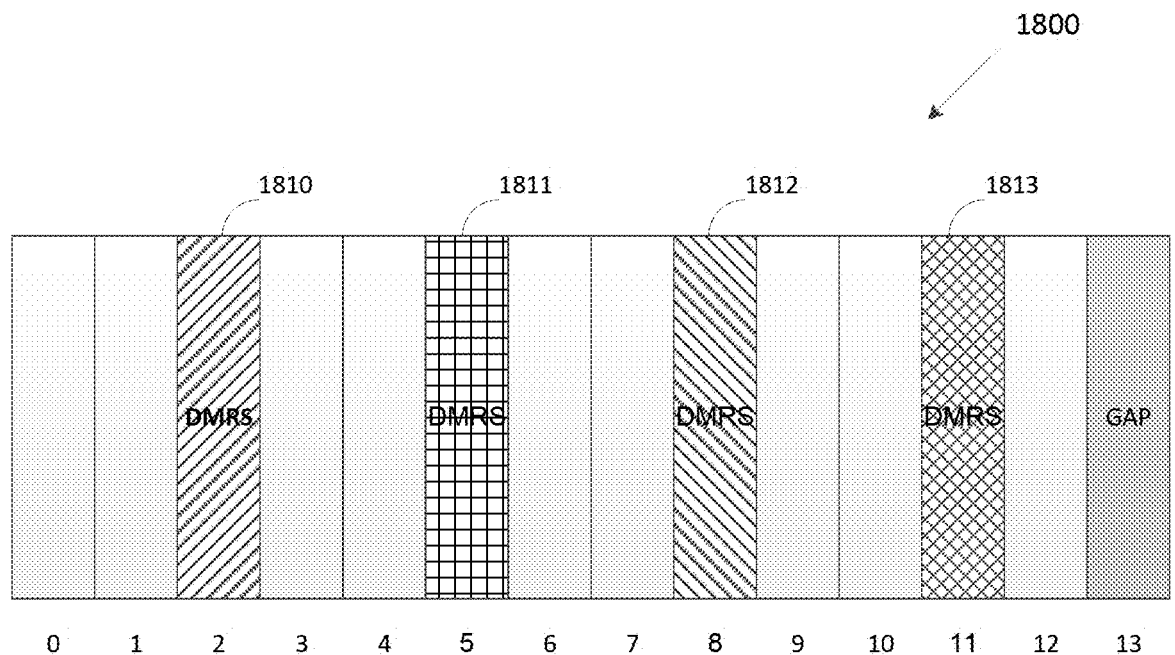
FIG. 18 illustrates an example DMRS configuration according to embodiments of the present disclosure.

FIG. 18 illustrates an example DMRS configuration 1800 according to embodiments of the present disclosure. The embodiment of the DMRS configuration 1800 illustrated in FIG. 18 is for illustration only. FIG. 18 does not limit the scope of this disclosure to any particular implementation. And the same reference signal sequence can be used for DMRS antenna ports $P_0$ and $P_1$ as shown in TABLE 3.

TABLE 3

Reference signal sequence

| | | PSSCH |
| --- | --- | --- |
| | | Sidelink transmission modes 3 and 4 |
| Group hopping | $n_{ID}^{RS}$ | $n_{ID}^X$ enabled |
| | $n_s$ | $2n_{ss}^{PSSCH}$ first DM-RS symbol in a slot |
| | | $2n_{ss}^{PSSCH} +1$ second DM-RS symbol in a slot |
| | $f_{ss}$ | $\lfloor n_{ID}^X/16 \rfloor \bmod 30$ |
| Sequence hopping | | disabled |
| Cyclic shift | $n_{cs, \lambda}$ | $\lfloor n_{ID}^X/2 \rfloor \bmod 8$ |
| Orthogonal sequence | $\lfloor w^\lambda(\cdot) \rfloor$ | $[+1 +1 +1 +1]$ if $n_{ID}^X \bmod 2 = 0$ |
| | | $[+1 -1 +1 -1]$ if $n_{ID}^X \bmod 2 = 1$ |
| Reference signal length | $M_{sc}^{RS}$ | $M_{sc}^{PSSCH}$ |

In some embodiments, different reference signal sequences can be used for two DMRS antenna ports $P_0$ and $P_1$. In one example, the reference signal for DMRS antenna ports $P_0$ and $P_1$ are mapped to OFDM symbols {2, 5, 8, 11} and the reference signal for DMRS can be generated according one or more of the fields in following TABLE 4A.

TABLE 4A

| | | Reference signal for DMRS | |
|---|---|---|---|
| Group hopping | $n_{ID}^{RS}$ | PSSCH Sidelink transmission modes 3 and 4 enabled $n_{ID}^{X}$ | |
| | $n_s$ | $2n_{ss}^{PSSCH}$ first DM-RS symbol in a slot $2n_{ss}^{PSSCH}+1$ second DM-RS symbol in a slot | |
| | $f_{ss}$ | $\lfloor n_{ID}^{X}/16 \rfloor \bmod 30$ | |
| Sequence hopping | | disabled | |
| Cyclic shift | $n_{cs,\lambda}$ | $\lfloor n_{ID}^{X}/2 \rfloor \bmod 8$ for antenna port $P_0$ | $(\lfloor n_{ID}^{X}/2 \rfloor + 4) \bmod 8$ for antenna port $P_1$ |
| Orthogonal sequence | $[w^{\lambda}(\cdot)]$ | [+1 +1 +1 +1] if $n_{ID}^{X} \bmod 2 = 0$ [+1 -1 +1 -1] if $n_{ID}^{X} \bmod 2 = 1$ for antenna port $P_0$ | [+1 +1 -1 -1] if $n_{ID}^{X} \bmod 2 = 0$ [+1 -1 -1 +1] if $n_{ID}^{X} \bmod 2 = 1$ for antenna port $P_1$ or [+1 -1 -1 +1] if $n_{ID}^{X} \bmod 2 = 0$ [+1 +1 -1 -1] if $n_{ID}^{X} \bmod 2 = 1$ for antenna port $P_1$ |
| Reference signal length | $M_{sc}^{RS}$ | $M_{sc}^{PSSCH}$ | |
| Number of layers | $\upsilon$ | 2 | |
| Number of antenna ports | P | 2 | |

The DMRS antenna ports using two different reference signal sequences can be mapped to the same OFDM symbols. In one example, DMRS antenna ports $P_0$ and $P_1$ are mapped to DMRS symbols 2/5/8/11.

In one embodiment, fours sequence, sequence 0, sequence 1, sequence 2 and sequence 3, are generated according to TABLE 4B. Sequence 0 and 2 are sequence for first DMRS in a lot and sequence 1 and 3 are sequences for second DMRS in a slot. In an example, sequence 0 is mapped to symbols 2 and 8 for DMRS antenna port $P_0$, and sequence 1 is mapped to symbols 5 and 11 for DMRS antenna port $P_0$. Sequence 2 is mapped to symbols 2 and 8 for DMRS antenna port $P_1$, and sequence 3 is mapped to symbols 5 and 11 for DMRS antenna port $P_1$. OCC code can be applied for each antenna port. For antenna port $P_0$, the OCC code can be:

[+1 +1 +1 +1] if $n_{ID}^{X} \bmod 2=0$
[+1 -1 +1 -1] if $n_{ID}^{X} \bmod 2=1$

For antenna port $P_1$, the OCC code can be one of the followings:

[+1 +1 -1 -1] if $n_{ID}^{X} \bmod 2=0$
[+1 -1 -1 +1] if $n_{ID}^{X} \bmod 2=1$
[+1 +1 -1 -1] if $n_{ID}^{X} \bmod 2=1$
[+1 -1 -1 +1] if $n_{ID}^{X} \bmod 2=0$
[+1 -1 -1 +1] if $n_{ID}^{X} \bmod 2=0$
[+1 +1 -1 -1] if $n_{ID}^{X} \bmod 2=1$
[+1 -1 -1 +1] if $n_{ID}^{X} \bmod 2=1$
[+1 +1 -1 -1] if $n_{ID}^{X} \bmod 2=0$

TABLE 4B

| | | Sequence generation | |
|---|---|---|---|
| Group hopping | $n_{ID}^{RS}$ | PSSCH Sidelink transmission modes 3 and 4 enabled $n_{ID}^{X}$ | |
| | $n_s$ | $2n_{ss}^{PSSCH}$ first DM-RS symbol in a slot $2n_{ss}^{PSSCH}+1$ second DM-RS symbol in a slot | |
| | $f_{ss}$ | $\lfloor n_{ID}^{X}/16 \rfloor \bmod 30$ | |
| Sequence hopping | | disabled | |
| Cyclic shift | $n_{cs,\lambda}$ | $\lfloor n_{ID}^{X}/2 \rfloor \bmod 8$ for sequence 0 (for first DMRS symbol in a lot) and sequence 1 (for second DMRS symbol in a slot) | $(\lfloor n_{ID}^{X}/2 \rfloor + 4) \bmod 8$ for sequence 2 (for first DMRS symbol in a lot) and sequence 3 (for second DMRS symbol in a lot). |
| Reference signal length | $M_{sc}^{RS}$ | $M_{sc}^{PSSCH}$ | |
| Number of layers | $\upsilon$ | 2 | |
| Number of antenna ports | P | 2 | |

In one example, the sequence can be mapped for antenna ports $P_0$ and $P_1$. In one instance, for antenna port $P_0$, sequence 0 is mapped to symbols 2 and 8, sequence 3 is mapped to symbols 5 and 11. In one instance, for antenna port $P_1$, sequence 2 is mapped to symbols 2 and 8, sequence 1 is mapped to symbols 5 and 11. In one instance, for antenna port $P_0$, the OCC code can be one of the followings:

$$\begin{matrix} [+1 & +1 & +1 & +1] & \text{if } n_{ID}^X \bmod 2 = 0 \\ [+1 & -1 & +1 & -1] & \text{if } n_{ID}^X \bmod 2 = 1 \end{matrix}.$$

In one instance, for antenna port $P_1$, the OCC code can be one of the followings:

$$\begin{matrix} [-1 & +1 & -1 & +1] & \text{if } n_{ID}^X \bmod 2 = 0 \\ [-1 & -1 & -1 & -1] & \text{if } n_{ID}^X \bmod 2 = 1 \end{matrix}.$$

In one example, the sequence can be mapped for antenna ports $P_0$ and $P_1$. In one example, for antenna port $P_1$, sequence 0 is mapped to symbols 2 and 8, sequence 3 is mapped to symbols 5 and 11. In one example, for antenna port $P_0$, sequence 2 is mapped to symbols 2 and 8, sequence 1 is mapped to symbols 5 and 11. In one example, for antenna port $P_1$, the OCC code can be one of the followings:

$$\begin{matrix} [+1 & +1 & +1 & +1] & \text{if } n_{ID}^X \bmod 2 = 0 \\ [+1 & -1 & +1 & -1] & \text{if } n_{ID}^X \bmod 2 = 1 \end{matrix}.$$

In one example, for antenna port $P_0$, the OCC code can be one of the followings:

$$\begin{matrix} [-1 & +1 & -1 & +1] & \text{if } n_{ID}^X \bmod 2 = 0 \\ [-1 & -1 & -1 & -1] & \text{if } n_{ID}^X \bmod 2 = 1 \end{matrix}.$$

Figure 19:
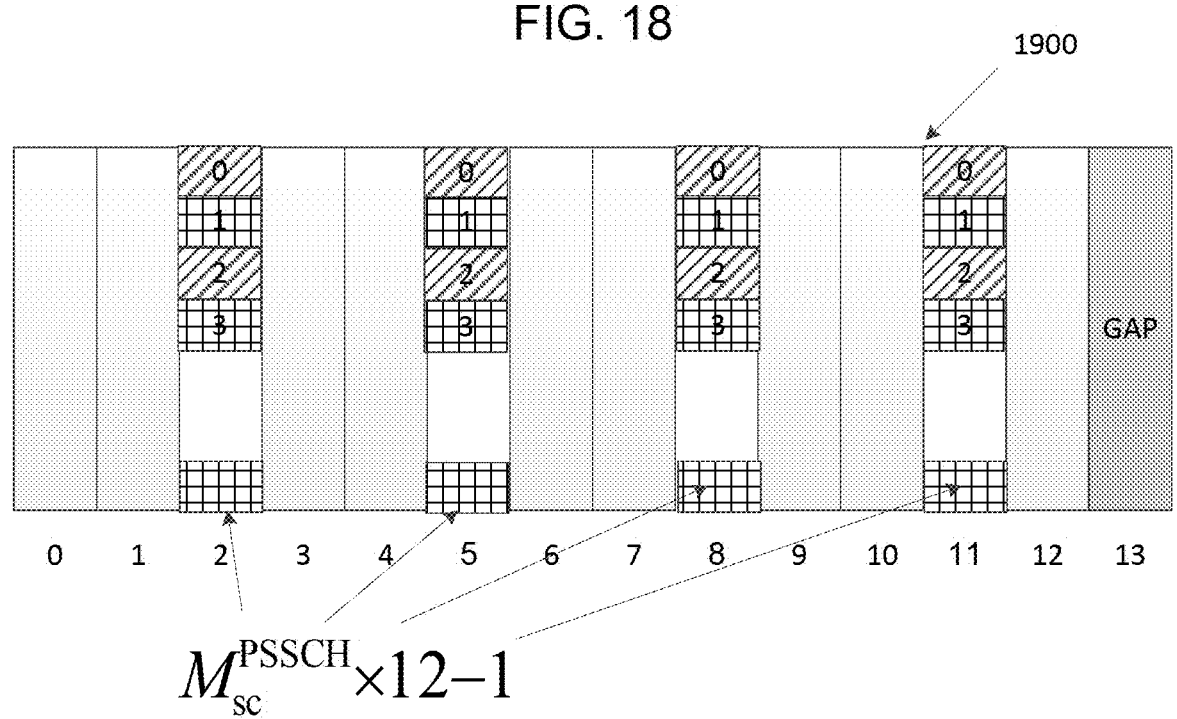
FIG. 19 illustrates another example DMRS configuration according to embodiments of the present disclosure.

FIG. 19 illustrates another example DMRS configuration 1900 according to embodiments of the present disclosure. The embodiment of the DMRS configuration 1900 illustrated in FIG. 19 is for illustration only. FIG. 19 does not limit the scope of this disclosure to any particular implementation In one embodiment, the DMRS of two antenna ports for PSSCH $P_0$ and $P_1$ are mapped to different REs of same DMRS OFDM symbols. The even number of REs is mapped to a first antenna port and the odd number of REs is mapped to a second antenna port. An example is illustrated in FIG. 19.

In one example, the DMRS reference signal sequences are generated according to TABLE 3. On Symbols $\{2, 5, 8, 11\}$, the even number of REs $\{0, 2, 4, \ldots, M_{sc}^{PSSCH}-2\}$ within the PSSCH allocation are mapped to antenna port $P_0$ and the odd number of REs $\{1, 3, 5, \ldots, M_{sc}^{PSSCH}-1\}$ within the PSSCH allocation are mapped to antenna port $P_1$.

In one example, in symbols $\{2, 8\}$, the even number of REs $\{0, 2, 4, \ldots, M_{sc}^{PSSCH}-2\}$ within the PSSCH allocation are mapped to antenna port $P_0$ and the odd number of REs $\{1, 3, 5, \ldots, M_{sc}^{PSSCH}-1\}$ within the PSSCH allocation are mapped to antenna port $P_1$. And on symbols $\{5, 11\}$, the even number of REs $\{0, 2, 4, \ldots, M_{sc}^{PSSCH}-2\}$ within the PSSCH allocation are mapped to antenna port $P_1$ and the odd number of REs $\{1, 3, 5, \ldots, M_{sc}^{PSSCH}-1\}$ within the PSSCH allocation are mapped to antenna port $P_0$.

In one example, in symbols $\{2, 5\}$, the even number of REs $\{0, 2, 4, \ldots, M_{sc}^{PSSCH}-2\}$ within the PSSCH allocation are mapped to antenna port $P_0$ and the odd number of REs $\{1, 3, 5, \ldots, M_{sc}^{PSSCH}-1\}$ within the PSSCH allocation are mapped to antenna port $P_1$. And in symbols $\{8, 11\}$, the even number of REs $\{0, 2, 4, \ldots, M_{sc}^{PSSCH}-2\}$ within the PSSCH allocation are mapped to antenna port $P_1$ and the odd number of REs $\{1, 3, 5, \ldots, M_{sc}^{PSSCH}-1\}$ within the PSSCH allocation are mapped to antenna port $P_0$.

In one example, in symbols $\{2, 11\}$, the even number of REs $\{0, 2, 4, \ldots, M_{sc}^{PSSCH}-2\}$ within the PSSCH allocation are mapped to antenna port $P_0$ and the odd number of REs $\{1, 3, 5, \ldots, M_{sc}^{PSSCH}-1\}$ within the PSSCH allocation are mapped to antenna port $P_1$. And in symbols $\{5, 8\}$, the even number of REs $\{0, 2, 4, \ldots, M_{sc}^{PSSCH}-2\}$ within the PSSCH allocation are mapped to antenna port $P_1$ and the odd number of REs $\{1, 3, 5, \ldots, M_{sc}^{PSSCH}-1\}$ within the PSSCH allocation are mapped to antenna port $P_0$.

In one embodiment, a UE can be configured with DMRS sequences and mapping that can support specific pre-coder cycling scheme. The UE can be requested to only use the DMRS transmitted on particular time location and/or frequency location to estimate the channel for demodulation of PSSCH transmission on particular time location and/or frequency location. This embodiment is useful to support pre-coder cycling transmission scheme along frequency domain and/or time domain. In pre-coder cycling transmission scheme, the pre-coder can be changed along frequency and/or time and the UE needs to know which part of DMRS can be used to the estimate the channel for demodulation of one particular part of PSSCH. Pre-coder cycling can also be called pre-coder switching, pre-coder vector switching, pre-coding vector switching and PVS. The term 'pre-coder cycling' is exemplary and can be substituted with any other names or labels without changing the substances of this disclosure.

In one embodiment, the UE can be configured to assume that the same pre-coder(s) are applied to DMRS symbols and data symbols in PSSCH as follows as showed in FIG. 18. In one example, the same pre-coder(s) are applied to DMRS symbol 2, 1810 and data symbols $\{0, 1, 3\}$ in PSSCH in one subframe. In one example, the same pre-coder(s) are applied to DMRS symbol 5, 1811 and data symbols $\{4, 6\}$ in PSSCH in one subframe. In one example, the same pre-coder(s) are applied to DMRS symbol 8, 1812 and data symbols $\{7, 9\}$ in PSSCH in one subframe. In one example, the same pre-coder(s) are applied to DMRS symbol 11, 1813 and data symbols $\{10, 12\}$ in PSSCH in one subframe.

In one embodiment, the UE can be configured to assume same pre-coder(s) are applied DMRS symbols and data symbols in PSSCH as follows as showed in FIG. 18. In one example, the same pre-coder(s) are applied to DMRS symbols 2 and 5 (1810 and 1811) and data symbols $\{0, 1, 3, 4, 6\}$ in PSSCH in one subframe. In one example, the same pre-coder(s) are applied to DMRS symbols 8 and 11 (1812 and 1813) and data symbols $\{7, 9, 10, 12\}$ in PSSCH in one subframe.

Figure 20:
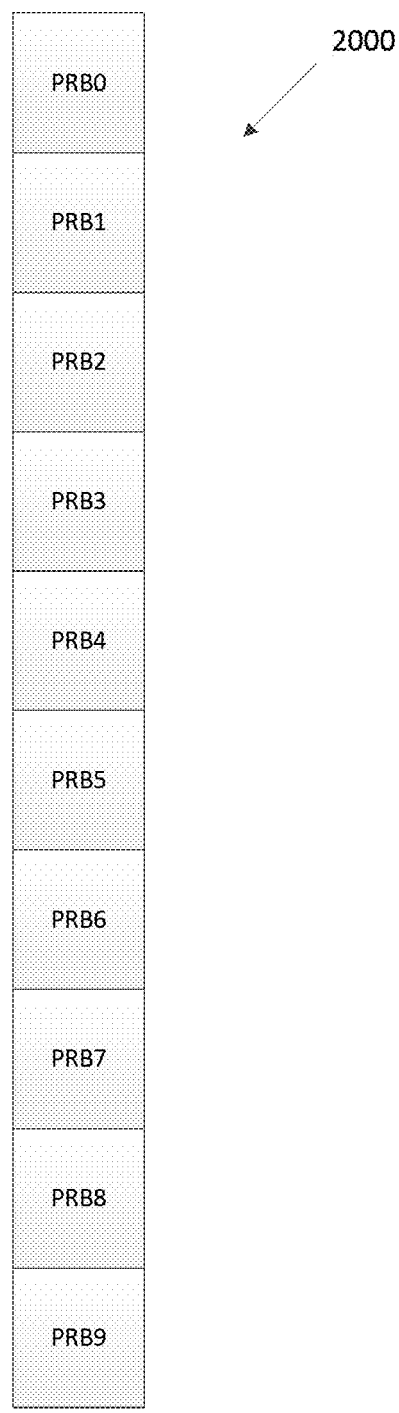
FIG. 20 illustrates an example PRB configuration according to embodiments of the present disclosure.

FIG. 20 illustrates an example PRB configuration 2000 according to embodiments of the present disclosure. The embodiment of the PRB configuration 2000 illustrated in FIG. 20 is for illustration only. FIG. 20 does not limit the scope of this disclosure to any particular implementation In one embodiment, the UE can be configured to assume the same pre-coder(s) are applied to one continuous PRB sets with one or more PRBs in frequency domain. In one example, the UE can be configured to assume the pre-coder(s) on DMRS symbol is changed every PRB. As illustrated in FIG. 20, the UE can be configured to assume the pre-coder(s) applied to PRB0, PRB1, . . . , PRB9 within the PSSCH allocation are different and the UE cannot use the DMRS signal across the PRBs to estimate the channel.

In one example, the UE can be configured to assume the pre-coder(s) on DMRS symbol is changed every two PRB. As illustrated in FIG. 20, the UE can be configured to assume the pre-coder(s) applied to each PRB pair {PRB0, PRB1}, {PRB2, PRB3}, {PRB4, PRB5}, {PRB6, PRB7}, {PRB8, PRB9} within the PSSCH allocation are different and the UE can use the DMRS signal within each of those the PRB pair to estimate the channel.

In one example, the UE can be configured to assume the pre-coder(s) on DMRS symbol is changed every 4 PRBs. As illustrated in FIG. 20, the UE can be configured to assume the pre-coder(s) applied to {PRB0, PRB1, PRB2, PRB3}, {PRB4, PRB5, PRB6, PRB7}, {PRB8, PRB9} within the PSSCH allocation are different and the UE can use the DMRS signal within each of those PRB subset/bundling set to estimate the channel.

In one embodiment, the UE can be configured to assume the same pre-coder(s) are applied to each continuous N subcarrier in frequency domain in one OFDM symbol. The value of N can be 1/2/3/4/6/12/24/48.

In some embodiments, the transmission scheme for PSSCH in V2V/V2X link can be: pre-coder cycling across subcarriers and/or OFDM symbols; the combination of SFBC and pre-coder cycling across subcarriers and/or OFDM symbols; and/or the combination of STBC and pre-coder cycling across subcarriers and/or OFDM symbols.

In one embodiment, the transmission scheme of pre-coder cycling for PSSCH can be one of the following alternatives: N pre-coders are cycled through by transmitter UE in frequency domain (e.g., the pre-coders can be cycled across PRBs and/or the pre-coders can be cycled across REs); M pre-coders are cycled through by transmitter UE in time domain (e.g., the pre-corders can be cycled across every few OFDM symbols and/or the pre-coders can be cycled across every OFDM symbol subset); and/or the combination of the above two alternatives.

Figure 21A:
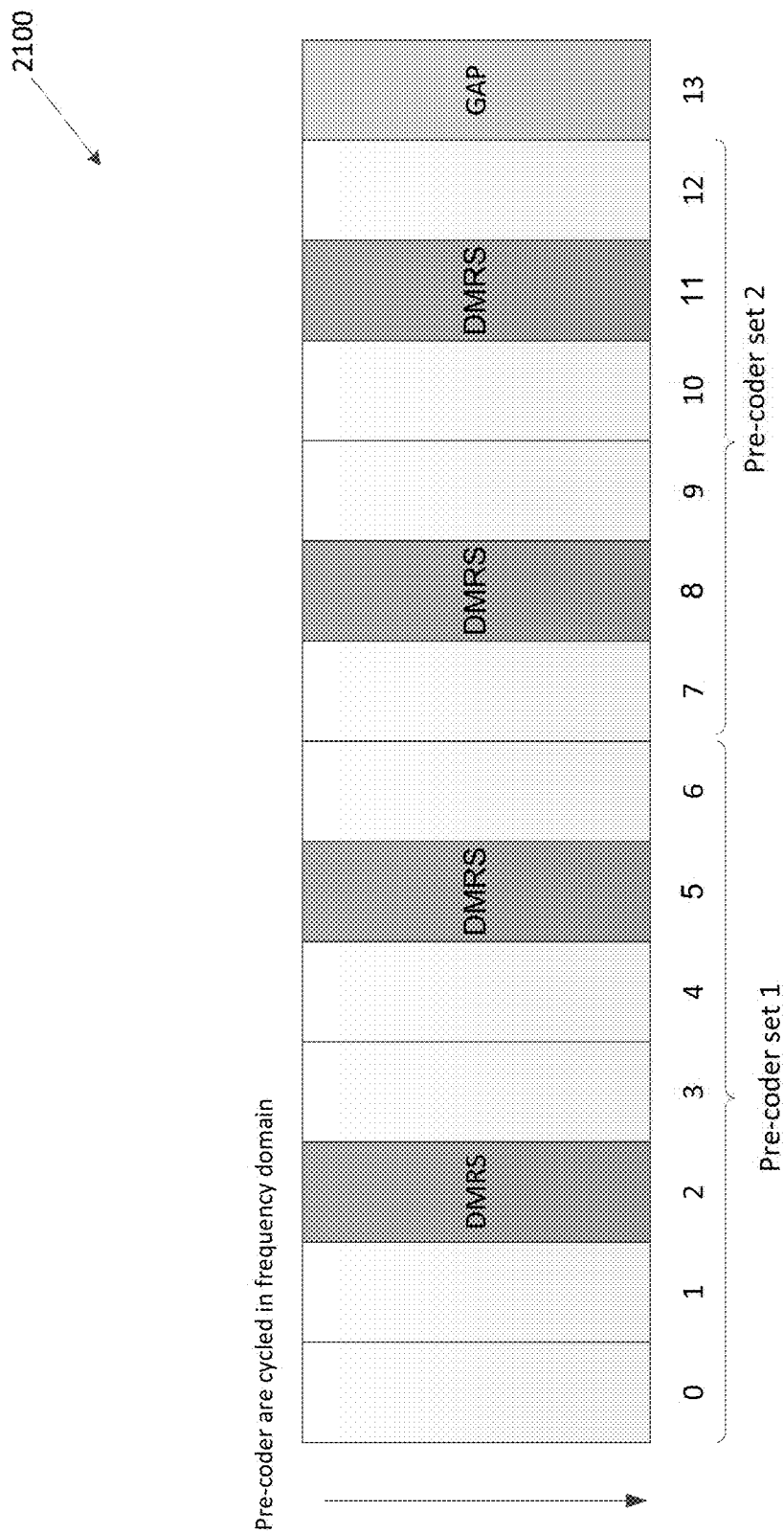
FIG. 21A illustrates an example DMRS configuration and pre-coder set according to embodiments of the present disclosure.

FIG. 21A illustrates an example DMRS configuration and pre-coder set 2100 according to embodiments of the present disclosure. The embodiment of the DMRS configuration and pre-coder set 2100 illustrated in FIG. 21A is for illustration only. FIG. 21A does not limit the scope of this disclosure to any particular implementation In one method, the transmitter UE has two pre-coder sets, pre-coder set 1 $\{w_{1,1}, w_{1,2}, \ldots, w_{1,N_1}\}$ and pre-coder set 2 $\{w_{2,1}, w_{2,2}, \ldots, w_{2,N_2}\}$. The pre-coder set 1 can be applied to PSSCH data OFDM symbols {0, 1, 3, 4, 6} and the pre-coder set 2 can applied to PSSCH data OFDM symbols {7, 9, 10, 12}, as illustrated in FIG. 21A. In each symbol of PSCCH data OFDM symbols {0, 1, 3, 4, 6}, the pre-coders in pre-coder set 1 $\{w_{1,1}, w_{1,2}, \ldots, w_{1,N_1}\}$ can be cycled in frequency domain and across every 1/2/3/4/6/12/24/48 subcarriers.

In each symbol of PSCCH data OFDM symbols {7, 9, 10, 12}, the pre-coders in pre-coder set 2 $\{w_{2,1}, w_{2,2}, \ldots w_{2,N_2}\}$ can be cycled in frequency domain and can be cycled across every 1/2/3/4/6/12/24/48 subcarriers.

Different cycling patterns in frequency domain can be applied to OFDM symbols sets {0, 1, 3, 4, and 6} ad {7, 9, 10, and 12}. In one example, the pre-coder set 1 can be applied to PSSCH OFDM symbol set {0, 1, 3, 4} and the pre-coder set 2 can be applied to PSCCH OFDM symbol set {6, 7, 9, 10, 12}. In each symbol in symbol set {0, 1, 3, 4}, the pre-coders in pre-coder set 1 can be cycled across every 48/24/12/6/4/3/2/1 subcarriers. In each symbol in symbol set {6, 7, 9, 10, 12}, the prec-coders in pre-coder set 2 can be cycled across every 48/24/12/6/4/3/2/1 subcarriers.

The number of pre-coders in pre-coder set 1, $N_1$, can be 1 or more than one. The number of pre-coders in pre-coder set 2, $N_2$, can be 1 or more than one. The number of pre-coders in pre-coder set 1 and 2 can be equal or different.

Figure 21B:
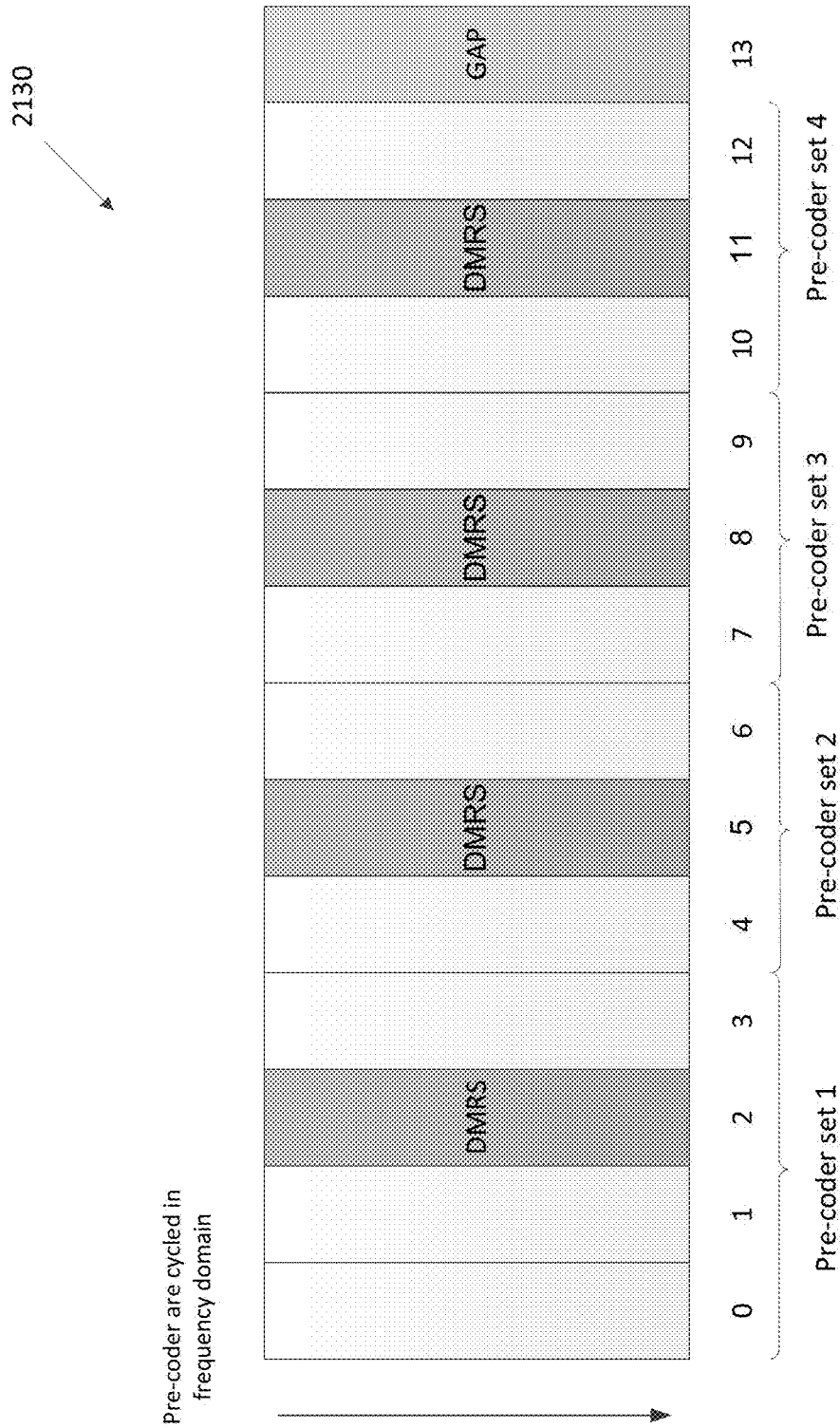
FIG. 21B illustrates another example DMRS configuration and pre-coder set according to embodiments of the present disclosure.

FIG. 21B illustrates another example DMRS configuration and pre-coder set 2130 according to embodiments of the present disclosure. The embodiment of the DMRS configuration and pre-coder set 2130 illustrated in FIG. 21B is for illustration only. FIG. 21B does not limit the scope of this disclosure to any particular implementation.

In one method, the transmitter UE has four pre-coder sets, pre-coder set 1 $\{w_{1,1}, w_{1,2}, \ldots, w_{1,N_1}\}$ pre-coder set 2 $\{w_{2,1}, w_{2,2}, \ldots, w_{2,N_2}\}$, pre-coder set 3 $\{w_{3,1}, w_{3,2}, \ldots, w_{3,N_3}\}$, and pre-coder set 4 $\{w_{4,1}, w_{4,2}, \ldots, w_{4,N_4}\}$, as illustrated in FIG. 21B. The pre-coder set 1 can be applied to PSSCH data OFDM symbols {0, 1, 3}. The pre-coder set 2 can applied to PSSCH data OFDM symbols {4, 6}. The pre-coder set 3 can applied to PSSCH data OFDM symbols {7, 9}. The pre-coder set 4 can applied to PSSCH data OFDM symbols {10, 12}.

In each symbol of PSCCH data OFDM symbols {0, 1, 3}, the pre-coders in pre-coder set 1 $\{w_{1,1}, w_{1,2}, \ldots, w_{1,N_1}\}$ can be cycled in frequency domain and across every 1/2/3/4/6/12/24/48 subcarriers. In each symbol of PSCCH data OFDM symbols {4, 6}, the pre-coders in pre-coder set 2 $\{w_{2,1}, w_{2,2}, \ldots, w_{2,N_2}\}$ can be cycled in frequency domain and across every 1/2/3/4/6/12/24/48 subcarriers. In each symbol of PSCCH data OFDM symbols {7, 9}, the pre-coders in pre-coder set 3 $\{w_{3,1}, w_{3,2}, \ldots, w_{3,N_3}\}$ can be cycled in frequency domain and across every 1/2/3/4/6/12/24/48 subcarriers. In each symbol of PSCCH data OFDM symbols {10, 12}, the pre-coders in pre-coder set 4 $\{w_{4,1}, w_{4,2}, \ldots, w_{4,N_4}\}$ can be cycled in frequency domain and across every 1/2/3/4/6/12/24/48 subcarriers.

In one example, the pre-coder set 1 can be applied to PSSCH data OFDM symbols {0, 1}, the pre-coder set 2 can be applied to PSSCH data OFDM symbols {3, 4}, the pre-coder set 3 can be applied to PSSCH data OFDM symbols {6, 7}, and the pre-coder set 4 can be applied to PSSCH data OFDM symbols {9, 10, 12}. The number of pre-coders in pre-coder set 1, $N_1$, can be 1 or more than one. The number of pre-coders in pre-coder set 2, $N_2$, can be 1 or more than one. The number of pre-coders in pre-coder set 3, $N_3$, can be 1 or more than one. The number of pre-coders in pre-coder set 4, $N_4$, can be 1 or more than one. The numbers of pre-coders in pre-coder sets 1, 2, 3 and 4 can be different or equal.

Figure 21C:
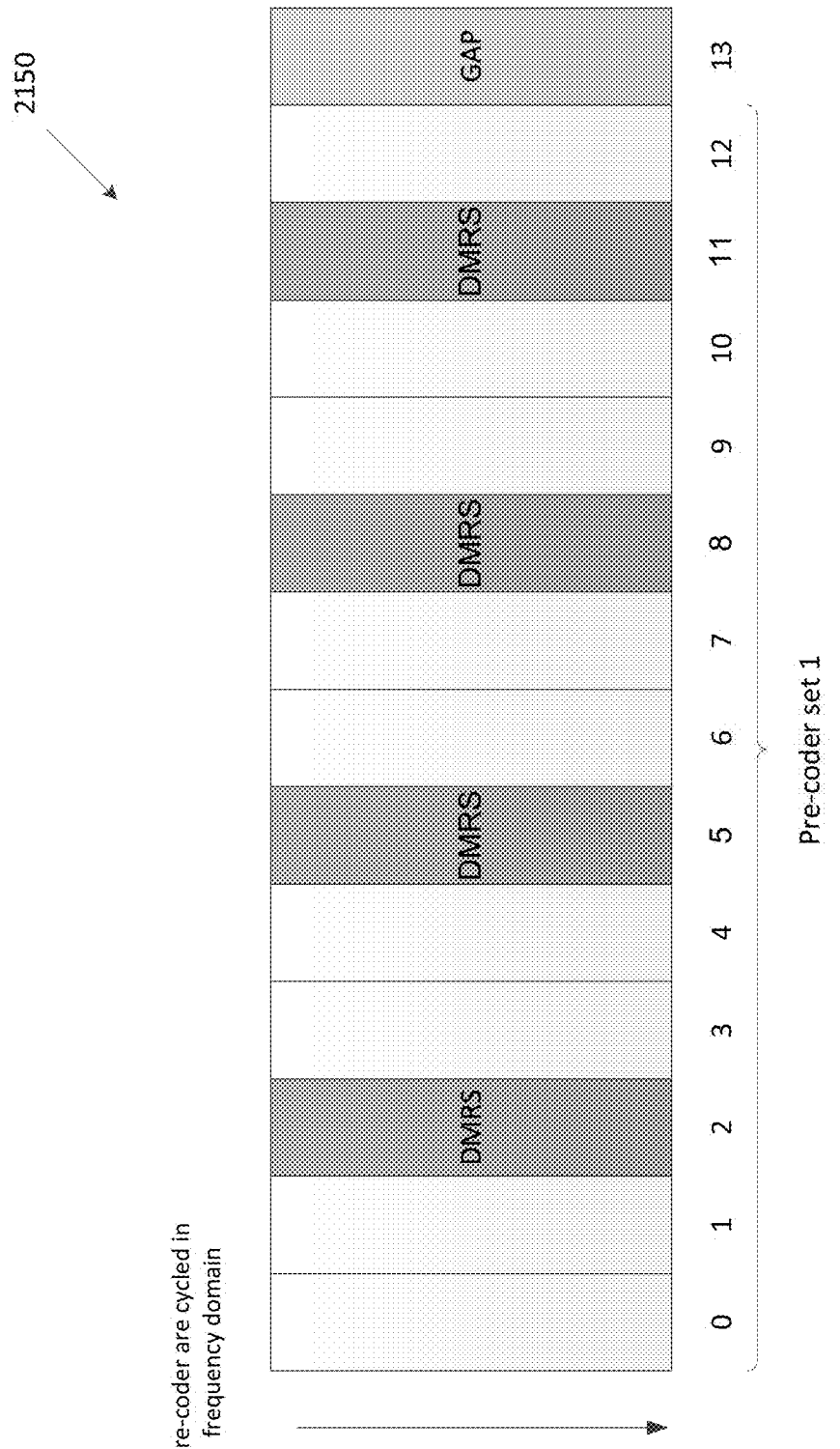
FIG. 21C illustrates yet another example DMRS configuration and pre-coder set according to embodiments of the present disclosure.

FIG. 21C illustrates yet another example DMRS configuration and pre-coder set 2150 according to embodiments of the present disclosure. The embodiment of the DMRS configuration and pre-coder set 2150 illustrated in FIG. 21C is for illustration only. FIG. 21C does not limit the scope of this disclosure to any particular implementation.

In one embodiment, the transmitter UE has one pre-coder set, pre-coder set 1 $\{w_{1,1}, w_{1,2}, \ldots, w_{1,N_1}\}$ as illustrated in FIG. 21C. The pre-coder set 1 can be applied to all PSSCH data OFDM symbols {0, 1, 3, 4, 6, 7, 9, 10, 12} in one subframe. In each symbol of PSCCH data OFDM symbols {0, 1, 3, 4, 6, 7, 9, 10, 12}, the pre-coders in pre-coder set 1 $\{w_{1,1}, w_{1,2}, \ldots, w_{1,N_1}\}$ can be cycled in frequency domain and across every 1/2/3/4/6/12/24/48 subcarriers. The number of pre-coders in pre-coder set 1, $N_1$, can be one or more than one.

In one embodiment, the transmission scheme for PSSCH can be the combination of SFBC and pre-coder cycling in frequency/time domain. In one example, the codeword of PSSCH can be first mapped to two layers:

$$x^{(0)}(i) = d(2i)$$
$$x^{(1)}(i) = d(2i+1)$$

where d(n) is the modulation symbol(s) in the codeword of PSSCH and $x^{(0)}(i)$ and $x^{(1)}(i)$ are the first and second layers, respectively.

Then, in one OFDM symbol of PSSCH data OFDM symbols {0, 1, 3, 4, 6, 7, 9, 10, 12}, the two layers are mapped to two antenna ports $p_0$ and $p_1$ as follows:

$$\begin{bmatrix} y^{(p_0)}(2i) \\ y^{(p_1)}(2i) \\ y^{(p_0)}(2i+1) \\ y^{(p_1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} Re(x^{(0)}(i)) \\ Re(x^{(1)}(i)) \\ Im(x^{(0)}(i)) \\ Im(x^{(1)}(i)) \end{bmatrix}$$

where i=0, 1, ..., $M_{sc}^{PSSCH}/2-1$. Then on each of antenna ports of PSSCH, $p_0$ and $p_1$, pre-coder cycling can be applied.

The pre-coder cycling for antenna ports $p_0$ and $p_1$ can be one of the followings. In one example, the transmitter UE has two pre-coder sets, pre-coder set 1 {$w_{1,1}$, $w_{1,2}$, ..., $w_{1,N_1}$} and pre-coder set 2 {$w_{2,1}$, $w_{2,2}$, ..., $w_{2,N_2}$}. The pre-coder set 1 can be applied to PSSCH data OFDM symbols {0, 1, 3, 4, 6} and the pre-coder set 2 can be applied to PSSCH data OFDM symbols {7, 9, 10, 12}. In each symbol of PSCCH data OFDM, the pre-coders in corresponding pre-coder set can be cycled in frequency domain and across every 2/4/6/12/24/48 subcarriers.

In another example, the transmitter UE has two pre-coder sets, pre-coder set 1 {$w_{1,1}$, $w_{1,2}$, ..., $w_{1,N_1}$} and pre-coder set 2 {$w_{2,1}$, $w_{2,2}$, ..., $w_{2,N_2}$}. The pre-coder set 1 can be applied to PSSCH data OFDM symbols {0, 1, 3, 4} and the pre-coder set 2 can be applied to PSSCH data OFDM symbols {6, 7, 9, 10, 12}. In each symbol of PSCCH data OFDM symbols, the pre-coders in corresponding pre-coder set can be cycled in frequency domain and across every 2/4/6/12/24/48 subcarriers.

In yet another example, the transmitter UE has four pre-coder sets, pre-coder set 1 {$w_{1,1}$, $w_{1,2}$, ..., $w_{1,N_1}$}, pre-coder set 2 {$w_{2,1}$, $w_{2,2}$, ..., $w_{2,N_2}$}, pre-coder set 3 {$w_{3,1}$, $w_{3,2}$, ..., $w_{3,N_3}$}, and pre-coder set 4 {$w_{4,1}$, $w_{4,2}$, ..., $w_{4,N_4}$}. The pre-coder set 1 can be applied to PSSCH data OFDM symbols {0, 1, 3}. The pre-coder set 2 can applied to PSSCH data OFDM symbols {4, 6}. The pre-coder set 3 can applied to PSSCH data OFDM symbols {7, 9}. The pre-coder set 4 can applied to PSSCH data OFDM symbols {10, 12}. In each symbol of PSCCH data OFDM symbols, the pre-coders in corresponding pre-coder set can be cycled in frequency domain and across every 2/4/6/12/24/48 subcarriers.

In yet another example, the transmitter UE has four pre-coder sets, pre-coder set 1 {$w_{1,1}$, $w_{1,2}$, ..., $w_{1,N_1}$}, pre-coder set 2 {$w_{2,1}$, $w_{2,2}$, ..., $w_{2,N_2}$}, pre-coder set 3 {$w_{3,1}$, $w_{3,2}$, ..., $w_{3,N_3}$}, and pre-coder set 4 {$w_{4,1}$, $w_{4,2}$, ..., $w_{4,N_4}$}. The pre-coder set 1 can be applied to PSSCH data OFDM symbols {0, 1}. The pre-coder set 2 can applied to PSSCH data OFDM symbols {3, 4}. The pre-coder set 3 can applied to PSSCH data OFDM symbols {6, 7}. The pre-coder set 4 can applied to PSSCH data OFDM symbols {9, 10, 12}. In each symbol of PSCCH data OFDM symbols, the pre-coders in corresponding pre-coder set can be cycled in frequency domain and across every 2/4/6/12/24/48 subcarriers.

In yet another example, the transmitter UE has one pre-coder set, pre-coder set 1 {$w_{1,1}$, $w_{1,2}$, ..., $w_{1,N_1}$}, as illustrated in FIG. 21C. The pre-coder set 1 can be applied to all PSSCH data OFDM symbols {0, 1, 3, 4, 6, 7, 9, 10, 12} in one subframe. In each symbol of PSCCH data OFDM symbols {0, 1, 3, 4, 6, 7, 9, 10, 12}, the pre-coders in pre-coder set 1 {$w_{1,1}$, $w_{1,2}$, ..., $w_{1,N_1}$} can be cycled in frequency domain and across every 2/4/6/12/24/48 subcarriers.

In yet another example, the transmitter applies pre-coder $w_{1,1}$ on PSSCH transmitted on OFDM symbols {0, 1, 3, 4, 6} and DMRS on symbols {2, 5} of antenna port $p_0$. The transmitter UE applies pre-coder $w_{1,2}$ on PSSCH transmitted on OFDM symbols {7, 9, 10, 12} and DMRS on symbols {8, 11} of antenna port $p_0$. The receiver UE can be requested to assume pre-coders $w_{1,1}$ and $w_{1,2}$ are different. The transmitter applies pre-coder $w_{2,1}$ on PSSCH transmitted on OFDM symbols {0, 1, 3, 4, 6} and DMRS on symbols {2, 5} of antenna port $p_1$. The transmitter UE applies pre-coder $w_{2,2}$ on PSSCH transmitted on OFDM symbols {7, 9, 10, 12} and DMRS on symbols {8, 11} of antenna port $p_1$. The receiver UE can be requested to assume pre-coders $w_{2,1}$ and $w_{2,2}$ are different.

In yet another example, the transmitter applies pre-coder $w_{1,1}$ on PSSCH transmitted on OFDM symbols {0, 1, 3, 4, 6} and DMRS on symbols {2, 5} of antenna port $p_0$. The transmitter UE applies pre-coder $w_{1,2}$ on PSSCH transmitted on OFDM symbols {7, 9, 10, 12} and DMRS on symbols {8, 11} of antenna port $p_0$. The receiver UE can be requested to assume pre-coders $w_{1,1}$ and $w_{1,2}$ are different. The transmitter applies pre-coder $w_2$ on PSSCH transmitted on OFDM symbols {0, 1, 3, 4, 6, 7, 9, 10, 12} and DMRS on symbols {2, 5, 8, 11} of antenna port $p_1$.

In yet another example, the transmitter applies pre-coder $w_1$ on PSSCH transmitted on OFDM symbols {0, 1, 3, 4, 6, 7, 9, 10, 12} and DMRS on symbols {2, 5, 8, 11} of antenna port $p_0$. The transmitter applies pre-coder $w_{2,1}$ on PSSCH transmitted on OFDM symbols {0, 1, 3, 4, 6} and DMRS on symbols {2, 5} of antenna port $p_1$. The transmitter UE applies pre-coder $w_{2,2}$ on PSSCH transmitted on OFDM symbols {7, 9, 10, 12} and DMRS on symbols {8, 11} of antenna port $p_1$. The receiver UE can be requested to assume pre-coders $w_{2,1}$ and $w_{2,2}$ are different.

One of the aforementioned embodiments can be used for antenna port $p_0$. One of the above methods can be used for antenna port $p_1$. Different or same pre-coder cycling method can be applied to the antenna ports $p_0$ and $p_1$.

In one embodiment, the transmission scheme for PSSCH can be the combination of STBC and pre-coder cycling in frequency/time domain. In one example, the SBTC scheme over two antenna ports can be transmitted on OFDM symbol pairs {0, 1}, {3, 4}, {6, 7} and {9, 10}. One OFDM symbol 12, only antenna port $p_0$ is mapped. An example of transmitting PSSCH codeword {x(0), x(1), x(2), ..., x($M_{sc}^{PSSCH} \times 9-1$)} is shown in TABLE 5A through 5D.

TABLE 5A

| Subcarrier index | PSSCH codeword OFDM symbol index | | |
|---|---|---|---|
| | 0 | 1 | 2 |
| 0 | $y^{p_0} = \frac{x(0)}{\sqrt{2}}$<br>$y^{p_1} = \frac{-x^*(1)}{\sqrt{2}}$ | $y^{p_0} = \frac{x(1)}{\sqrt{2}}$<br>$y^{p_1} = \frac{x^*(0)}{\sqrt{2}}$ | DMRS symbol |
| 1 | $y^{p_0} = \frac{x(9)}{\sqrt{2}}$<br>$y^{p_1} = \frac{-x^*(10)}{\sqrt{2}}$ | $y^{p_0} = \frac{x(10)}{\sqrt{2}}$<br>$y^{p_1} = \frac{x^*(9)}{\sqrt{2}}$ | |
| 2 | $y^{p_0} = \frac{x(18)}{\sqrt{2}}$<br>$y^{p_1} = \frac{-x^*(19)}{\sqrt{2}}$ | $y^{p_0} = \frac{x(19)}{\sqrt{2}}$<br>$y^{p_1} = \frac{x^*(18)}{\sqrt{2}}$ | |
| 3 | $y^{p_0} = \frac{x(27)}{\sqrt{2}}$<br>$y^{p_1} = \frac{-x^*(28)}{\sqrt{2}}$ | $y^{p_0} = \frac{x(28)}{\sqrt{2}}$<br>$y^{p_1} = \frac{x^*(27)}{\sqrt{2}}$ | |
| ... | ... | ... | |
| $M_{sc}^{PSSCH} - 1$ | $y^{p_0} = \frac{x(Z)}{\sqrt{2}}$<br>$y^{p_1} = \frac{-x^*(Z+1)}{\sqrt{2}}$<br>$Z = (M_{sc}^{PSSCH} - 1) \times 9$ | $y^{p_0} = \frac{x(Z+1)}{\sqrt{2}}$<br>$y^{p_1} = \frac{x^*(Z)}{\sqrt{2}}$<br>$Z = (M_{sc}^{PSSCH} - 1) \times 9$ | |

TABLE 5B

| Subcarrier index | PSSCH codeword OFDM symbol index | | | |
|---|---|---|---|---|
| | 3 | 4 | 5 | 6 |
| 0 | $y^{p_0} = \frac{x(2)}{\sqrt{2}}$<br>$y^{p_1} = \frac{-x^*(3)}{\sqrt{2}}$ | $y^{p_0} = \frac{x(3)}{\sqrt{2}}$<br>$y^{p_1} = \frac{x^*(2)}{\sqrt{2}}$ | DMRS symbol | $y^{p_0} = \frac{x(4)}{\sqrt{2}}$<br>$y^{p_1} = \frac{-x^*(5)}{\sqrt{2}}$ |
| 1 | $y^{p_0} = \frac{x(11)}{\sqrt{2}}$<br>$y^{p_1} = \frac{-x^*(12)}{\sqrt{2}}$ | $y^{p_0} = \frac{x(12)}{\sqrt{2}}$<br>$y^{p_1} = \frac{x^*(11)}{\sqrt{2}}$ | | $y^{p_0} = \frac{x(13)}{\sqrt{2}}$<br>$y^{p_1} = \frac{-x^*(14)}{\sqrt{2}}$ |
| 2 | $y^{p_0} = \frac{x(20)}{\sqrt{2}}$<br>$y^{p_1} = \frac{-x^*(21)}{\sqrt{2}}$ | $y^{p_0} = \frac{x(21)}{\sqrt{2}}$<br>$y^{p_1} = \frac{x^*(20)}{\sqrt{2}}$ | | $y^{p_0} = \frac{x(22)}{\sqrt{2}}$<br>$y^{p_1} = \frac{-x^*(23)}{\sqrt{2}}$ |

TABLE 5B-continued

| | PSSCH codeword | | | |
|---|---|---|---|---|
| Subcarrier | OFDM symbol index | | | |
| index | 3 | 4 | 5 | 6 |
| 3 | $y^{p0} = \frac{x(29)}{\sqrt{2}}$ $y^{p1} = \frac{-x^*(30)}{\sqrt{2}}$ | $y^{p0} = \frac{x(30)}{\sqrt{2}}$ $y^{p1} = \frac{x^*(29)}{\sqrt{2}}$ | | $y^{p0} = \frac{x(31)}{\sqrt{2}}$ $y^{p1} = \frac{-x^*(32)}{\sqrt{2}}$ |
| ... | | | | |
| $M_{sc}^{PSSCH} - 1$ | $y^{p0} = \frac{x(Z+2)}{\sqrt{2}}$ $y^{p1} = \frac{-x^*(Z+3)}{\sqrt{2}}$ $Z = (M_{sc}^{PSSCH} - 1) \times 9$ | $y^{p0} = \frac{x(Z+3)}{\sqrt{2}}$ $y^{p1} = \frac{x^*(Z+2)}{\sqrt{2}}$ $Z = (M_{sc}^{PSSCH} - 1) \times 9$ | | $y^{p0} = \frac{x(Z+4)}{\sqrt{2}}$ $y^{p1} = \frac{-x^*(Z+5)}{\sqrt{2}}$ $Z = (M_{sc}^{PSSCH} - 1) \times 9$ |

TABLE 5C

| | PSSCH codeword | | |
|---|---|---|---|
| Subcarrier | OFDM symbol index | | |
| index | 7 | 8 | 9 |
| 0 | $y^{p0} = \frac{x(5)}{\sqrt{2}}$ $y^{p1} = \frac{x^*(4)}{\sqrt{2}}$ | DMRS symbol | $y^{p0} = \frac{x(6)}{\sqrt{2}}$ $y^{p1} = \frac{-x^*(7)}{\sqrt{2}}$ |
| 1 | $y^{p0} = \frac{x(14)}{\sqrt{2}}$ $y^{p1} = \frac{x^*(13)}{\sqrt{2}}$ | | $y^{p0} = \frac{x(15)}{\sqrt{2}}$ $y^{p1} = \frac{-x^*(16)}{\sqrt{2}}$ |
| 2 | $y^{p0} = \frac{x(23)}{\sqrt{2}}$ $y^{p1} = \frac{x^*(22)}{\sqrt{2}}$ | | $y^{p0} = \frac{x(24)}{\sqrt{2}}$ $y^{p1} = \frac{-x^*(25)}{\sqrt{2}}$ |
| 3 | $y^{p0} = \frac{x(32)}{\sqrt{2}}$ $y^{p1} = \frac{x^*(31)}{\sqrt{2}}$ | | $y^{p0} = \frac{x(33)}{\sqrt{2}}$ $y^{p1} = \frac{-x^*(34)}{\sqrt{2}}$ |
| ... | | ... | |
| $M_{sc}^{PSSCH} - 1$ | $y^{p0} = \frac{x(Z+5)}{\sqrt{2}}$ $y^{p1} = \frac{x^*(Z+4)}{\sqrt{2}}$ $Z = (M_{sc}^{PSSCH} - 1) \times 9$ | | $y^{p0} = \frac{x(Z+6)}{\sqrt{2}}$ $y^{p1} = \frac{-x^*(Z+7)}{\sqrt{2}}$ $Z = (M_{sc}^{PSSCH} - 1) \times 9$ |

TABLE 5D

| Subcarrier index | PSSCH codeword OFDM symbol index | | | |
|---|---|---|---|---|
| | 10 | 11 | 12 | 13 |
| 0 | $y^{p_0} = \frac{x(7)}{\sqrt{2}}$<br>$y^{p_1} = \frac{x^*(6)}{\sqrt{2}}$ | DMRS symbol | $y^{p_0} = x(8)$ | |
| 1 | $y^{p_0} = \frac{x(16)}{\sqrt{2}}$<br>$y^{p_1} = \frac{x^*(15)}{\sqrt{2}}$ | | $y^{p_0} = x(17)$ | |
| 2 | $y^{p_0} = \frac{x(25)}{\sqrt{2}}$<br>$y^{p_1} = \frac{x^*(24)}{\sqrt{2}}$ | | $y^{p_0} = x(26)$ | |
| 3 | $y^{p_0} = \frac{x(34)}{\sqrt{2}}$<br>$y^{p_1} = \frac{x^*(33)}{\sqrt{2}}$ | | $y^{p_0} = x(35)$ | |
| ... | | | | |
| $M_{sc}^{PSSCH} - 1$ | $y^{p_0} = \frac{x(Z+7)}{\sqrt{2}}$<br>$y^{p_1} = \frac{x^*(Z+6)}{\sqrt{2}}$<br>$Z = (M_{sc}^{PSSCH} - 1) \times 9$ | | $y^{p_0} = x(M_{sc}^{PSSCH} \times 9 - 1)$ | |

Then on each of antenna ports of PSSCH, $p_0$ and $p_1$, pre-coder cycling can be applied. The pre-coder cycling for antenna ports $p_0$ and $p_1$ can be one of the followings.

In one example, the transmitter UE has two pre-coder sets, pre-coder set 1 $\{w_{1,1}, w_{1,2}, \ldots, w_{1,N_1}\}$ and pre-coder set 2 $\{w_{2,1}, w_{2,2}, \ldots, w_{2,N_2}\}$. The pre-coder set 1 can be applied to PSSCH data OFDM symbols $\{0, 1, 3, 4\}$ and the pre-coder set 2 can be applied to PSSCH data OFDM symbols $\{6, 7, 9, 10, 12\}$. In each symbol of PSCCH data OFDM symbols, the pre-coders in corresponding pre-coder set can be cycled in frequency domain and across every 2/4/6/12/24/48 subcarriers.

In another example, the transmitter UE has four pre-coder sets, pre-coder set 1 $\{w_{1,1}, w_{1,2}, \ldots, w_{1,N_1}\}$ pre-coder set 2 $\{w_{2,1}, w_{2,2}, \ldots, w_{2,N_2}\}$, pre-coder set 3 $\{w_{3,1}, w_{3,2}, \ldots, w_{3,N_3}\}$, and pre-coder set 4 $\{w_{4,1}, w_{4,2}, \ldots, w_{4,N_4}\}$. The pre-coder set 1 can be applied to PSSCH data OFDM symbols $\{0, 1\}$. The pre-coder set 2 can applied to PSSCH data OFDM symbols $\{3, 4\}$. The pre-coder set 3 can applied to PSSCH data OFDM symbols $\{6, 7\}$. The pre-coder set 4 can applied to PSSCH data OFDM symbols $\{9, 10, 12\}$. In each symbol of PSCCH data OFDM symbols, the pre-coders in corresponding pre-coder set can be cycled in frequency domain and across every 1/2/3/4/6/12/24/48 subcarriers.

In yet another example, the transmitter UE has one pre-coder set, pre-coder set 1 $\{w_{1,1}, w_{1,2}, \ldots, w_{1,N_1}\}$ as illustrated in FIG. 21C. The pre-coder set 1 can be applied to all PSSCH data OFDM symbols $\{0, 1, 3, 4, 6, 7, 9, 10, 12\}$ in one subframe. In each symbol of PSCCH data OFDM symbols $\{0, 1, 3, 4, 6, 7, 9, 10, 12\}$, the pre-coders in pre-coder set 1 $\{w_{1,1}, w_{1,2}, \ldots, w_{1,N_1}\}$ can be cycled in frequency domain and across every 1/2/3/4/6/12/24/48 subcarriers.

In yet another example, the transmitter applies pre-coder $w_{1,1}$ on PSSCH transmitted on OFDM symbols $\{0, 1, 3, 4\}$ and DMRS on symbols $\{2, 5\}$ of antenna port $p_0$. The transmitter UE applies pre-coder $w_{1,2}$ on PSSCH transmitted on OFDM symbols $\{6, 7, 9, 10, 12\}$ and DMRS on symbols $\{8, 11\}$ of antenna port $p_0$. The receiver UE can be requested to assume pre-coders $w_{1,1}$ and $w_{1,2}$ are different. The transmitter applies pre-coder $w_{2,1}$ on PSSCH transmitted on OFDM symbols $\{0, 1, 3, 4\}$ and DMRS on symbols $\{2, 5\}$ of antenna port $p_1$. The transmitter UE applies pre-coder $w_{3,2}$ on PSSCH transmitted on OFDM symbols $\{6, 7, 9, 10\}$ and DMRS on symbols $\{8, 11\}$ of antenna port $p_1$. The receiver UE can be requested to assume pre-coders $w_{2,1}$ and $w_{2,2}$ are different.

In yet another example, the transmitter applies pre-coder $w_{1,1}$ on PSSCH transmitted on OFDM symbols $\{0, 1, 3, 4\}$ and DMRS on symbols $\{2, 5\}$ of antenna port $p_0$. The transmitter UE applies pre-coder $w_{1,2}$ on PSSCH transmitted on OFDM symbols $\{6, 7, 9, 10, 12\}$ and DMRS on symbols $\{8, 11\}$ of antenna port $p_0$. The receiver UE can be requested to assume pre-coders $w_{1,1}$ and $w_{1,2}$ are different. The transmitter applies pre-coder $w_2$ on PSSCH transmitted on OFDM symbols $\{0, 1, 3, 4, 6, 7, 9, 10\}$ and DMRS on symbols $\{2, 5, 8, 11\}$ of antenna port $p_1$.

In yet another example, the transmitter applies pre-coder $w_1$ on PSSCH transmitted on OFDM symbols $\{0, 1, 3, 4, 6,$ 7, 9, 10, 12} and DMRS on symbols {2, 5, 8, 11} of antenna port $p_0$. The receiver UE can be requested to assume pre-coders $w_{1,1}$ and $w_{1,2}$ are different. The transmitter applies pre-coder $w_{2,1}$ on PSSCH transmitted on OFDM symbols {0, 1, 3, 4} and DMRS on symbols {2, 5} of antenna port $p_1$. The transmitter UE applies pre-coder $w_{3,2}$ on PSSCH transmitted on OFDM symbols {6, 7, 9, 10} and DMRS on symbols {8, 11} of antenna port $p_1$. The receiver UE can be requested to assume pre-coders $w_{2,1}$ and $w_{2,2}$ are different.

One of the aforementioned embodiments can be used for antenna port $p_0$. One of the above methods can be used for antenna port $p_1$. Different or same pre-coder cycling method can be applied to the antenna ports $p_0$ and $p_1$.

In one embodiment, the SBTC scheme over two antenna ports can be transmitted on OFDM symbol pairs {1, 3}, {4, 6}, {7, 9} and {10, 12}. One OFDM symbol 0, only antenna port $p_0$ is mapped. An example of transmitting PSSCH codeword $\{x(0), x(1), x(2), \ldots, x(M_{sc}^{PSSCH} \times 9 - 1)\}$ is shown in TABLE 5E through 5H.

TABLE 5E

| Subcarrier index | PSSCH codeword OFDM symbol index | | |
|---|---|---|---|
| | 0 | 1 | 2 |
| 0 | $y^{p0} = x(0)$ | $y^{p0} = \frac{x(1)}{\sqrt{2}}$ <br> $y^{p1} = \frac{-x^*(2)}{\sqrt{2}}$ | DMRS symbol |
| 1 | $y^{p0} = x(9)$ | $y^{p0} = \frac{x(10)}{\sqrt{2}}$ <br> $y^{p1} = \frac{-x^*(11)}{\sqrt{2}}$ | |
| 2 | $y^{p0} = x(18)$ | $y^{p0} = \frac{x(19)}{\sqrt{2}}$ <br> $y^{p1} = \frac{-x^*(20)}{\sqrt{2}}$ | |
| 3 | $y^{p0} = x(27)$ | $y^{p0} = \frac{x(28)}{\sqrt{2}}$ <br> $y^{p1} = \frac{-x^*(29)}{\sqrt{2}}$ | |
| . . . | | | |
| $M_{sc}^{PSSCH} - 1$ | $y^{p0} = x((M_{sc}^{PSSCH} - 1) \times 9)$ | $y^{p0} = \frac{x(Z+1)}{\sqrt{2}}$ <br> $y^{p1} = \frac{-x^*(Z+2)}{\sqrt{2}}$ <br> $Z = (M_{sc}^{PSSCH} - 1) \times 9$ | |

TABLE 5F

| Subcarrier index | PSSCH codeword OFDM symbol index | | | |
|---|---|---|---|---|
| | 3 | 4 | 5 | 6 |
| 0 | $y^{p0} = \frac{x(2)}{\sqrt{2}}$ <br> $y^{p1} = \frac{x^*(1)}{\sqrt{2}}$ | $y^{p0} = \frac{x(3)}{\sqrt{2}}$ <br> $y^{p1} = \frac{-x^*(4)}{\sqrt{2}}$ | DMRS symbol | $y^{p0} = \frac{x(4)}{\sqrt{2}}$ <br> $y^{p1} = \frac{x^*(3)}{\sqrt{2}}$ |

TABLE 5F-continued

| | PSSCH codeword | | | |
|---|---|---|---|---|
| Subcarrier | OFDM symbol index | | | |
| index | 3 | 4 | 5 | 6 |
| 1 | $y^{p0} = \frac{x(11)}{\sqrt{2}}$<br>$y^{p1} = \frac{x^*(10)}{\sqrt{2}}$ | $y^{p0} = \frac{x(12)}{\sqrt{2}}$<br>$y^{p1} = \frac{-x^*(13)}{\sqrt{2}}$ | | $y^{p0} = \frac{x(13)}{\sqrt{2}}$<br>$y^{p1} = \frac{x^*(12)}{\sqrt{2}}$ |
| 2 | $y^{p0} = \frac{x(20)}{\sqrt{2}}$<br>$y^{p1} = \frac{x^*(19)}{\sqrt{2}}$ | $y^{p0} = \frac{x(21)}{\sqrt{2}}$<br>$y^{p1} = \frac{-x^*(22)}{\sqrt{2}}$ | | $y^{p0} = \frac{x(22)}{\sqrt{2}}$<br>$y^{p1} = \frac{x^*(21)}{\sqrt{2}}$ |
| 3 | $y^{p0} = \frac{x(29)}{\sqrt{2}}$<br>$y^{p1} = \frac{x^*(28)}{\sqrt{2}}$ | $y^{p0} = \frac{x(30)}{\sqrt{2}}$<br>$y^{p1} = \frac{-x^*(31)}{\sqrt{2}}$ | | $y^{p0} = \frac{x(31)}{\sqrt{2}}$<br>$y^{p1} = \frac{x^*(30)}{\sqrt{2}}$ |
| ... | | | | |
| $M_{sc}^{PSSCH} - 1$ | $y^{p0} = \frac{x(Z+2)}{\sqrt{2}}$<br>$y^{p1} = \frac{x^*(Z+1)}{\sqrt{2}}$<br>$Z = (M_{sc}^{PSSCH} - 1) \times 9$ | $y^{p0} = \frac{x(Z+3)}{\sqrt{2}}$<br>$y^{p1} = \frac{-x^*(Z+4)}{\sqrt{2}}$<br>$Z = (M_{sc}^{PSSCH} - 1) \times 9$ | | $y^{p0} = \frac{x(Z+4)}{\sqrt{2}}$<br>$y^{p1} = \frac{x^*(Z+3)}{\sqrt{2}}$<br>$Z = (M_{sc}^{PSSCH} - 1) \times 9$ |

TABLE 5G

| | PSSCH codeword | | |
|---|---|---|---|
| Subcarrier | OFDM symbol index | | |
| index | 7 | 8 | 9 |
| 0 | $y^{p0} = \frac{x(5)}{\sqrt{2}}$<br>$y^{p1} = \frac{-x^*(6)}{\sqrt{2}}$ | DMRS symbol | $y^{p0} = \frac{x(6)}{\sqrt{2}}$<br>$y^{p1} = \frac{x^*(5)}{\sqrt{2}}$ |
| 1 | $y^{p0} = \frac{x(14)}{\sqrt{2}}$<br>$y^{p1} = \frac{-x^*(15)}{\sqrt{2}}$ | | $y^{p0} = \frac{x(15)}{\sqrt{2}}$<br>$y^{p1} = \frac{x^*(14)}{\sqrt{2}}$ |
| 2 | $y^{p0} = \frac{x(23)}{\sqrt{2}}$<br>$y^{p1} = \frac{-x^*(24)}{\sqrt{2}}$ | | $y^{p0} = \frac{x(24)}{\sqrt{2}}$<br>$y^{p1} = \frac{x^*(23)}{\sqrt{2}}$ |

TABLE 5G-continued

| Subcarrier index | OFDM symbol index 7 | 8 | 9 |
|---|---|---|---|
| 3 | $y^{p0} = \frac{x(32)}{\sqrt{2}}$ $y^{p1} = \frac{-x^*(33)}{\sqrt{2}}$ | | $y^{p0} = \frac{x(33)}{\sqrt{2}}$ $y^{p1} = \frac{x^*(32)}{\sqrt{2}}$ |
| ... | | | |
| $M_{sc}^{PSSCH} - 1$ | $y^{p0} = \frac{x(Z+5)}{\sqrt{2}}$ $y^{p1} = \frac{-x^*(Z+6)}{\sqrt{2}}$ $Z = (M_{sc}^{PSSCH} - 1) \times 9$ | | $y^{p0} = \frac{x(Z+6)}{\sqrt{2}}$ $y^{p1} = \frac{x^*(Z+5)}{\sqrt{2}}$ $Z = (M_{sc}^{PSSCH} - 1) \times 9$ |

TABLE 5H

| Subcarrier index | OFDM symbol index 10 | 11 | 12 | 13 |
|---|---|---|---|---|
| 0 | $y^{p0} = \frac{x(7)}{\sqrt{2}}$ $y^{p1} = \frac{-x^*(8)}{\sqrt{2}}$ | DMRS symbol | $y^{p0} = \frac{x(8)}{\sqrt{2}}$ $y^{p1} = \frac{x^*(7)}{\sqrt{2}}$ | |
| 1 | $y^{p0} = \frac{x(16)}{\sqrt{2}}$ $y^{p1} = \frac{-x^*(17)}{\sqrt{2}}$ | | $y^{p0} = \frac{x(17)}{\sqrt{2}}$ $y^{p1} = \frac{x^*(16)}{\sqrt{2}}$ | |
| 2 | $y^{p0} = \frac{x(25)}{\sqrt{2}}$ $y^{p1} = \frac{-x^*(26)}{\sqrt{2}}$ | | $y^{p0} = \frac{x(26)}{\sqrt{2}}$ $y^{p1} = \frac{x^*(25)}{\sqrt{2}}$ | |
| 3 | $y^{p0} = \frac{x(34)}{\sqrt{2}}$ $y^{p1} = \frac{-x^*(35)}{\sqrt{2}}$ | | $y^{p0} = \frac{x(35)}{\sqrt{2}}$ $y^{p1} = \frac{x^*(34)}{\sqrt{2}}$ | |
| ... | | | | |
| $M_{sc}^{PSSCH} - 1$ | $y^{p0} = \frac{x(Z+7)}{\sqrt{2}}$ $y^{p1} = \frac{-x^*(Z+8)}{\sqrt{2}}$ $Z = (M_{sc}^{PSSCH} - 1) \times 9$ | | $y^{p0} = \frac{x(Z+8)}{\sqrt{2}}$ $y^{p1} = \frac{x^*(Z+7)}{\sqrt{2}}$ $Z = (M_{sc}^{PSSCH} - 1) \times 9$ | |

Then on each of antenna ports of PSSCH, $p_0$ and $p_1$, pre-coder cycling can be applied. The pre-coder cycling for antenna ports $p_0$ and $p_1$ can be one of the followings. In one example, the transmitter UE has two pre-coder sets, pre-coder set 1 $\{w_{1,1}, w_{1,2}, \ldots, w_{1,N_1}\}$ and pre-coder set 2 $\{w_{2,1}, w_{2,2}, \ldots, w_{2,N_2}\}$. The pre-coder set 1 can be applied to PSSCH data OFDM symbols $\{0, 1, 3, 4, 6\}$ and the pre-coder set 2 can be applied to PSSCH data OFDM symbols $\{7, 9, 10, 12\}$. In each symbol of PSCCH data OFDM, the pre-coders in corresponding pre-coder set can be cycled in frequency domain and across every 1/2/3/4/6/12/24/48 subcarriers.

In one example, the transmitter UE has four pre-coder sets, pre-coder set 1 $\{w_{1,1}, w_{1,2}, \ldots, w_{1,N_1}\}$ pre-coder set 2 $\{w_{2,1}, w_{2,2}, \ldots, w_{2,N_2}\}$, pre-coder set 3 $\{w_{3,1}, w_{3,2}, \ldots, w_{3,N_3}\}$, and pre-coder set 4 $\{w_{4,1}, w_{4,2}, \ldots, w_{4,N_4}\}$. The pre-coder set 1 can be applied to PSSCH data OFDM symbols $\{0, 1, 3\}$. The pre-coder set 2 can applied to PSSCH data OFDM symbols $\{4, 6\}$. The pre-coder set 3 can applied to PSSCH data OFDM symbols $\{7, 9\}$. The pre-coder set 4 can applied to PSSCH data OFDM symbols $\{10, 12\}$. In each symbol of PSCCH data OFDM symbols, the pre-coders in corresponding pre-coder set can be cycled in frequency domain and across every 1/2/3/4/6/12/24/48 subcarriers.

In one example, the transmitter UE has one pre-coder set, pre-coder set 1 $\{w_{1,1}, w_{1,2}, \ldots, w_{1,N_1}\}$ as illustrated in FIG. 21C. The pre-coder set 1 can be applied to all PSSCH data OFDM symbols $\{0, 1, 3, 4, 6, 7, 9, 10, 12\}$ in one subframe. In each symbol of PSCCH data OFDM symbols $\{0, 1, 3, 4, 6, 7, 9, 10, 12\}$, the pre-coders in pre-coder set 1 $\{w_{1,1}, w_{1,2}, \ldots, w_{1,N_1}\}$ can be cycled in frequency domain and across every 1/2/3/4/6/12/24/48 subcarriers.

In one example, the transmitter applies pre-coder $w_{1,1}$ on PSSCH transmitted on OFDM symbols $\{0, 1, 3, 4, 6\}$ and DMRS on symbols $\{2, 5\}$ of antenna port $p_0$. The transmitter UE applies pre-coder $w_{1,2}$ on PSSCH transmitted on OFDM symbols $\{7, 9, 10, 12\}$ and DMRS on symbols $\{8, 11\}$ of antenna port $p_0$. The receiver UE can be requested to assume pre-coders $w_{1,1}$ and $w_{1,2}$ are different. The transmitter applies pre-coder $w_{2,1}$ on PSSCH transmitted on OFDM symbols $\{1, 3, 4, 6\}$ and DMRS on symbols $\{2, 5\}$ of antenna port $p_1$. The transmitter UE applies pre-coder $w_{3,2}$ on PSSCH transmitted on OFDM symbols $\{7, 9, 10, 12\}$ and DMRS on symbols $\{8, 11\}$ of antenna port $p_1$. The receiver UE can be requested to assume pre-coders $w_{2,1}$ and $w_{2,2}$ are different.

In one example, the transmitter applies pre-coder $w_{1,1}$ on PSSCH transmitted on OFDM symbols $\{0, 1, 3, 4, 6\}$ and DMRS on symbols $\{2, 5\}$ of antenna port $p_0$. The transmitter UE applies pre-coder $w_{1,2}$ on PSSCH transmitted on OFDM symbols $\{7, 9, 10, 12\}$ and DMRS on symbols $\{8, 11\}$ of antenna port $p_0$. The receiver UE can be requested to assume pre-coders $w_{1,1}$ and $w_{1,2}$ are different. The transmitter applies pre-coder $w_2$ on PSSCH transmitted on OFDM symbols $\{1, 3, 4, 6, 7, 9, 10, 12\}$ and DMRS on symbols $\{2, 5, 8, 11\}$ of antenna port $p_1$.

In one example, the transmitter applies pre-coder $w_1$ on PSSCH transmitted on OFDM symbols $\{0, 1, 3, 4, 6, 7, 9, 10, 12\}$ and DMRS on symbols $\{2, 5, 8, 11\}$ of antenna port $p_0$. The transmitter applies pre-coder $w_{2,1}$ on PSSCH transmitted on OFDM symbols $\{1, 3, 4, 6\}$ and DMRS on symbols $\{2, 5\}$ of antenna port $p_1$. The transmitter UE applies pre-coder $w_{3,2}$ on PSSCH transmitted on OFDM symbols $\{7, 9, 10, 12\}$ and DMRS on symbols $\{8, 11\}$ of antenna port $p_1$. The receiver UE can be requested to assume pre-coders $w_{2,1}$ and $w_{2,2}$ are different.

One of the aforementioned embodiments can be used for antenna port $p_0$. One of the above methods can be used for antenna port $p_1$. Different or same pre-coder cycling method can be applied to the antenna ports $p_0$ and $p_1$.

If transmit diversity scheme is applied to PSSCH, the corresponding control information sent in PSCCH may indicate the related information to a UE so that the UE can decode the PSSCH correctly. The control information can indicate one or more of the following information: whether non-transmit diversity (i.e., single port transmission defined in LTE specification) or transmission diversity scheme is used in the indicated PSSCH allocation; and which transmit diversity scheme is used in the indicated PSSCH allocation.

In one embodiment, N bits in the reserved information bits of SCI format 1 can be used to indicate the information of transmit diversity. The advantage of that embodiment is that a UE can still decode the SCI format 1 sent for PSSCH with transmit diversity and obtain the allocation information of PSSCH.

In one example, 1 bit $b_0$ in the reserved information bits of SCI format 1 can be used to indicate the information of transmit diversity in corresponding PSSCH. The value of 1 bit can indicate whether non-transmit diversity transmission (i.e., single port transmission defined in LTE specification) or transmit diversity scheme is used in the indicated PSSCH as shown in TABLE 6A.

TABLE 6A

| | Bit value |
|---|---|
| $b_0$ Bit value | Usage |
| 0 | single port transmission scheme defined in LTE specification in used in the indicated PSSCH |
| 1 | Transmit diversity scheme is used in the indicated PSSCH |

The transmit diversity can be predefined in the specification or configured through system information or high layer signaling (e.g., RRC). The transmit diversity indicated $b_0=1$ can be one of the followings: SFBC; STBC; slot-level pre-coder cycling; sub-slot level pre-coder cycling; combination of slot-level pre-coder cycling and SFBC or STBC; and/or Combination of sub-slot level pre-coder cycling and SFBC or STBC.

In one example, 2 bit $b_0b_1$ in the reserved information bits of SCI format 1 can be used to indicate the information of transmit diversity in corresponding PSSCH. The value of 2 bit can indicate whether non-transmit diversity transmission (i.e., single port transmission defined in LTE specification) or transmit diversity scheme is used in the indicated PSSCH, and also which transmit diversity scheme is used in the indicated PSSCH as shown in TABLE 6B.

TABLE 6B

| | Bit values | |
|---|---|---|
| $b_0b_1$ Bit value | | Usage |
| 00 | | single port transmission scheme defined in LTE specification is used in the indicated PSSCH |
| 01 | | Transmit diversity scheme 1 is used in the indicated PSSCH |
| 10 | | Transmit diversity scheme 2 is used in the indicated PSSCH |
| 11 | | Transmit diversity scheme 3 is used in the indicated PSSCH |

The transmit diversity schemes 1/2/3 can be predefined in the specification or configured through system information or high layer signaling (e.g., RRC). Each of the transmit diversity scheme configuration can include one or more of the following information: the transmission scheme for PSSCH; and/or the mapping of DMRS.

In one example, $b_0b_1=01$ can indicate that slot-level pre-coder cycling or sub-slot level pre-coder cycling is applied to the indicated PSSCH and DMRS has one antenna port. $b_0b_1=10$ can indicate that SFBC scheme (or STBC) is applied to the indicated PSSCH and the DMRS has two antenna ports. $b_0b_1=11$ can indicate that slot-level pre-coder cycling and SFBC scheme is applied to the indicated PSSCH and the DMRS has two antenna ports, and the UE can be indicated that different pre-coders are applied on the first slot and second slot for each DMRS antenna port. $b_0b_1$=11 can indicate that slot-level pre-coder cycling and SFBC scheme (or STBC) is applied to the indicated PSSCH and the DMRS has two antenna ports.

In one example, 3 bit $b_0b_1b_2$ in the reserved information bits of SCI format 1 can be used to indicate the information of transmit diversity in corresponding PSSCH. The value of 3 bit can indicate whether non-transmit diversity transmission (i.e., single port transmission defined in LTE specification) or transmit diversity scheme is used in the indicated PSSCH, and also which transmit diversity scheme is used in the indicated PSSCH. An example is illustrated in TABLE 6C.

TABLE 6C

Bit values

| $b_0b_1$ Bit value | Usage |
| --- | --- |
| 000 | single port transmission scheme defined in LTE specification is used in the indicated PSSCH |
| 001 | Transmit diversity scheme 1 is used in the indicated PSSCH |
| 010 | Transmit diversity scheme 2 is used in the indicated PSSCH |
| 011 | Transmit diversity scheme 3 is used in the indicated PSSCH |
| ... | |
| 111 | Transmit diversity scheme 7 is used in the indicated PSSCH |

The transmit diversity schemes 1~7 can be predefined in the specification or configured through system information or high layer signaling (e.g., RRC).

A UE can determine the transmit diversity scheme used for a PSSCH transmission based on the configuration from system information or high layer signaling (e.g., RRC) or preconfigured. A UE can be requested to use one transmit diversity scheme for a PSSCH transmission as dynamically indicated by the eNB.

DCI format 5A is used to schedule PSCCH for V2V/V2X. DCI format 5A can be used to schedule PSCCH that indicates a PSSCH with transmit diversity transmission scheme.

In one embodiment, DCI format 5A can be scrambled with SL-V-TX-RNTI to indicate the scheduling of PSCCH. The scheduled PSCCH contains SCI format 1 fields used for the scheduling of PSSCH using transmit diversity scheme. A UE is requested to use SL-V-TX-RNTI to decode one DCI format 5A and then can transmit PSSCH as configured by the SCI format 1 fields in the decoded DCI format 5A. In one example, when the DCI format 5A is scrambled with SL-V-TX-RNTI, one filed can be present in DCI format 5A to indicate the transmit diversity scheme for PSSCH: transmit diversity scheme—N bits. N can be 1, 2, or 3.

In one example, when the DCI format 5A is scrambled with SL-V-TX-RNTI, the same fields in DCI format A scrambled by SL-V-RNTI are present. Scrambling with SL-V-TX-RNTI can indicate that the scheduled PSSCH can use transmit diversity scheme, where the transmit diversity scheme can be configured through system information, RRC signaling or preconfigured.

In one embodiment, DCI format 5A scrambled with SL-SPS-V-TX-RNTI can be used by eNB to schedule SPS transmission with transmit diversity. In one example, when the DCI format 5A is scrambled with SL-SPS-V-TX-RNTI, same fields in DCI format A scrambled by SL-SPS-V-RNTI are present. Scrambling with SL-SPS-V-TX-RNTI can indicate the PSSCH in the scheduled SPS transmission can use transmit diversity scheme, where the transmit diversity scheme can be configured through system information, RRC signaling or preconfigured. In one example, when the DCI format 5A is scrambled with SL-SPS-V-TX-RNTI, one field can be present in DCI format 5A to indicate the transmit diversity scheme for PSSCH: transmit diversity scheme—N bits. N can be 1, 2, or 3.

TABLES 6A, 6B, and 6C can be used here for the N bits in DCI format 5A to indicate the transmit diversity scheme. The V2X UE can be configured to use the transmit diversity indicated in the DCI format 5A to transmit the corresponding PSSCH and can also fill the corresponding fields in SCI format 1.

In one embodiment, a mode-3 UE can be configured with the transmission scheme for PSSCH by the NW semi-statically. In one method, the NW can signal one transmission scheme to a mode-3 UE. The NW schedules the PSSCH transmission and SCI format content through DCI format 5A. Then the UE may fill be transmit diversity scheme field in SCI format transmitted in the scheduled PSSCH according to the NW configuration and also choose the transmit scheme for PSSCH according.

In one embodiment, a mode-3 UE can choose the transmission scheme for PSSCH autonomously. In one method, the NW schedules PSCCH and also the SCI format 1 content through a DCI format 5A. The UE can be requested to determine the transmission scheme for scheduled PSSCH and then fill the SCI format 1 accordingly.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
 a transceiver; and
 at least one processor operably coupled to the transceiver and configured to:
  receive, from a base station (BS), configuration information on a set of preambles configured for a beam failure recovery,
  receive, from the BS, a first set of reference signals (RSs) through a first set of RS resources for detecting a beam failure,
  receive, from the BS, a second set of RSs through a second set of RS resources for identifying a candidate beam,
  transmit, to the BS, a first signal for requesting the beam failure recovery and informing the candidate beam through a preamble using a physical random access channel (PRACH) if the beam failure is detected, wherein the preamble is identified from the set of preambles configured for the beam failure recovery request, and
  receive, from the BS, a second signal in response to the first signal, wherein the set of preambles configured for the beam failure recovery is associated with the second set of RS resources for identifying the candidate beam, and wherein the preamble is identified from the configuration information on the set of preambles configured for the beam failure recovery according to the candidate beam.

2. The UE of claim 1, wherein the at least one processor is further configured to:

identify the first set of RS resources based on quasi co-located (QCL) information related to a control resource set of physical downlink control channel (PDCCH) for the UE or information regarding a configuration of the first set of RS resources.

3. The UE of claim 1, wherein the information on the set of preambles configured for the beam failure recovery is transmitted based on system information or radio resource control (RRC) signaling.

4. The UE of claim 1, wherein the at least one processor is further configured to:

receive, from the BS, information regarding a RS received power (RSRP) threshold that is used to determine the candidate beam, obtain at least one RSRP measurement by using the second set of RS resources, and identify the candidate beam by determining whether the at least one RSRP measurement is larger than or equal to the RSRP threshold.

5. The UE of claim 1, wherein the at least one processor is further configured to receive, from the BS, information on a window for monitoring the second signal and information regarding a control resource set (CORESET) for monitoring the second signal, the CORESET dedicated to the UE for the beam failure recovery.

6. The UE of claim 1, wherein the second signal includes an identifier of the identified preamble, and wherein the second signal comprises a downlink control information (DCI) that is scrambled by a cell radio network temporary identifier (C-RNTI) of the UE.

7. The UE of claim 1, wherein the at least one processor is further configured to:

monitor the second signal according to a quasi co-located parameter associated with the candidate beam.

8. A base station (BS) in a wireless communication system, the BS comprising:

a transceiver; and at least one processor operably coupled to the transceiver and configured to:

transmit, to a user equipment (UE), configuration information on a set of preambles configured for a beam failure recovery, transmit, to the UE, a first set of reference signals (RSs) through a first set of RS resources for detecting a beam failure, transmit, to the UE, a second set of RSs through a second set of RS resources for identifying a candidate beam, receive, from the UE, a first signal for requesting the beam failure recovery and informing the candidate beam through a preamble using a physical random access channel (PRACH) if the beam failure is detected, wherein the preamble is identified from the set of preambles configured for the beam failure recovery request, and transmit, to the UE, a second signal responsive to the first signal, wherein the set of preambles configured for the beam failure recovery is associated with the second set of RS resources for identifying the candidate beam, and wherein the preamble is identified from the configuration information on the set of preambles configured for the beam failure recovery according to the candidate beam.

9. The BS of claim 8, wherein the first set of RS resources are identified based on quasi co-located (QCL) information related to a control resource set of physical downlink control channel (PDCCH) for the UE or information regarding a configuration of the first set of RS resources.

10. The BS of claim 8, wherein the information on the set of preambles configured for the beam failure recovery is transmitted based on system information or radio resource control (RRC) signaling.

11. The BS of claim 8, wherein the at least one processor is further configured to:

transmit, to the UE, information regarding a RS received power (RSRP) threshold that is used to determine the candidate beam, wherein at least one RSRP measurement is obtained by using the second set of RS resources, and wherein the candidate beam is identified by determining whether the at least one RSRP measurement is larger than or equal to the RSRP threshold.

12. The BS of claim 8, wherein the at least one processor is further configured to transmit, to the UE, information on a window for monitoring the second signal and information regarding a control resource set (CORESET) for monitoring the second signal, the CORESET dedicated to the UE for the beam failure recovery.

13. The BS of claim 8, wherein the second signal includes an identifier of the identified preamble, and wherein the second signal comprises a downlink control information (DCI) that is scrambled by a cell radio network temporary identifier (C-RNTI) of the UE.

14. The BS of claim 8, wherein the second signal is monitored according to a quasi co-located parameter associated with the candidate beam.

15. A method of a user equipment (UE) in a wireless communication system, the method comprising:

receiving, from a base station (BS), configuration information on a set of preambles configured for a beam failure recovery;

receiving, from the BS, a first set of reference signals (RSs) through a first set of RS resources for detecting a beam failure;

receiving, from the BS, a second set of RSs through a second set of RS resources for identifying a candidate beam;

transmitting, to the BS, a first signal for requesting the beam failure recovery and informing the candidate beam through a preamble using a physical random access channel (PRACH) if the beam failure is detected, wherein the preamble is identified from the set of preambles configured for the beam failure recovery request; and receiving, from the BS, a second signal in response to the first signal, wherein the set of preambles configured for the beam failure recovery is associated with the second set of RS resources for identifying the candidate beam, and wherein the preamble is identified from the configuration information on the set of preambles configured for the beam failure recovery according to the candidate beam.

16. The method of claim 15, further comprising:

identifying the first set of RS resources based on quasi co-located (QCL) information related to a control resource set of physical downlink control channel (PDCCH) for the UE or information regarding a configuration of the first set of RS resources.

17. The method of claim 15, wherein the information on the set of preambles configured for the beam failure recovery is transmitted based on system information or radio resource control (RRC) signaling.

18. The method of claim 15, further comprising:
receiving, from the BS, information regarding a RS received power (RSRP) threshold that is used to determine the candidate beam;
obtaining at least one RSRP measurement by using the second set of RS resources; and
identifying the candidate beam by determining whether the at least one RSRP measurement is larger than or equal to the RSRP threshold.

19. The method of claim 15, further comprising:
receiving, from the BS, information on a window for monitoring the second signal and information regarding a control resource set (CORESET) for monitoring the second signal, the CORESET dedicated to the UE for the beam failure recovery.

20. The method of claim 15, wherein the second signal includes an identifier of the identified preamble, and
wherein the second signal comprises a downlink control information (DCI) that is scrambled by a cell radio network temporary identifier (C-RNTI) of the UE.

21. The method of claim 15, further comprising:
monitoring the second signal according to a quasi co-located parameter associated with the candidate beam.

* * * * *